(12) United States Patent
Fujishiro et al.

(10) Patent No.: US 10,631,243 B2
(45) Date of Patent: Apr. 21, 2020

(54) BASE STATION, RADIO TERMINAL, AND MOBILITY MANAGEMENT APPARATUS

(71) Applicant: KYOCERA CORPORATION, Kyoto (JP)

(72) Inventors: Masato Fujishiro, Yokohama (JP); Henry Chang, San Diego, CA (US); Kugo Morita, Higashiomi (JP); Susumu Kashiwase, Machida (JP); Fangwei Tong, Machida (JP); Chiharu Yamazaki, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 213 days.

(21) Appl. No.: 15/691,430

(22) Filed: Aug. 30, 2017

(65) Prior Publication Data
US 2017/0367047 A1 Dec. 21, 2017

Related U.S. Application Data

(63) Continuation of application No. PCT/JP2016/054704, filed on Feb. 18, 2016.
(Continued)

(30) Foreign Application Priority Data

Mar. 3, 2015 (JP) .................................. 2015-041266
Mar. 3, 2015 (JP) .................................. 2015-041683

(51) Int. Cl.
*H04W 52/02* (2009.01)
*H04W 8/22* (2009.01)
(Continued)

(52) U.S. Cl.
CPC ......... *H04W 52/0216* (2013.01); *H04W 8/22* (2013.01); *H04W 36/0055* (2013.01);
(Continued)

(58) Field of Classification Search
CPC .. H04W 52/0212; H04W 8/22; H04W 52/288
See application file for complete search history.

(56) References Cited

U.S. PATENT DOCUMENTS

2001/0024444 A1    9/2001  Asai
2012/0088454 A1*   4/2012  Stanforth .......... H04W 52/0212
                                                      455/67.11
(Continued)

FOREIGN PATENT DOCUMENTS

JP    2001-256162 A    9/2001
JP    2004-341718 A    12/2004
(Continued)

OTHER PUBLICATIONS

Samsung, "Implication of current UE assistance information for power optimisation in eDDA scenario", 3GPP TSG-RAN WG2 #79, R2-123623, Aug. 13-Aug. 17, 2012, 3 pages. (Year: 2012).*
(Continued)

*Primary Examiner* — Hoon J Chung
(74) *Attorney, Agent, or Firm* — Studebaker & Brackett PC

(57) ABSTRACT

A base station according to a first feature is used in a mobile communication system in which a plurality of functions related to radio communication are specified. The base station includes a receiver that receives processor information related to a load state or an attribute of an processor included in a radio terminal from the radio terminal, a controller that selects at least one function to be executed by the radio terminal on the basis of the processor information, and a transmitter that transmits information indicating the selected function to the radio terminal.

3 Claims, 31 Drawing Sheets

Related U.S. Application Data

(60) Provisional application No. 62/127,425, filed on Mar. 3, 2015, provisional application No. 62/126,791, filed on Mar. 2, 2015.

(51) Int. Cl.

| | | |
|---|---|---|
| *H04W 76/10* | (2018.01) | |
| *H04W 36/00* | (2009.01) | |
| *H04W 36/32* | (2009.01) | |
| *H04W 8/20* | (2009.01) | |
| *H04W 72/04* | (2009.01) | |
| *H04W 88/06* | (2009.01) | |

(52) U.S. Cl.
CPC ....... *H04W 36/32* (2013.01); *H04W 52/0219* (2013.01); *H04W 76/10* (2018.02); *H04W 8/20* (2013.01); *H04W 72/048* (2013.01); *H04W 88/06* (2013.01); *Y02D 70/00* (2018.01); *Y02D 70/1242* (2018.01); *Y02D 70/1262* (2018.01); *Y02D 70/21* (2018.01)

(56) References Cited

U.S. PATENT DOCUMENTS

2014/0121898 A1* 5/2014 Diab ............... G11B 20/00086
701/36
2016/0094976 A1 3/2016 Enomoto et al.

FOREIGN PATENT DOCUMENTS

| JP | 2011-166636 A | 8/2011 |
|---|---|---|
| WO | 2014/188957 A1 | 11/2014 |

OTHER PUBLICATIONS

International Search Report issued in PCT/JP2016/054704; dated May 10, 2016.
Qualcomm Incorporated; "Limitations of Current UE E-UTRA Capability Handling"; 3GPP TSG RAN Meeting #65; RP-141404; Sep. 9-12, 2014; pp. 1-2; Edinburgh, Scotland.
China Unicom; "Enhanced RRM of HSPA Networks with UE Assistant Information"; 3GPP TSG-RAN WG2 Meeting #78; R2-122440; May 21-25, 2012; pp. 1-3; Prague, Czechia.
Philips; "Capabilities of Multi-Transceiver UEs"; 3GPP TSG RAN WG2 #70bis; R2-103922; Jun. 28-Jul. 2, 2010; pp. 1-3; Stockholm, Sweden.
LG Electronics Inc.; "Discussion on Assistance Information"; 3GPP TSG-RAN WG2 #77bis; R2-121313; Mar. 26-30, 2012; pp. 1-3; Jeju, South Korea.
Qualcomm Incorporated; "Limitations of Current UE E-UTRA Capability Handling"; 3GPP TSG-RAN WG2 meeting #87; R2-143285; Aug. 18-22, 2014; pp. 1-2; Dresden, Germany.
CATT; "UE Capability Coordination"; 3GPP TSG RAN WG2 Meeting #85; R2-140176; Feb. 10-14, 2014; pp. 1-3; Prague, Czechia.
Qualcomm Incorporated; "Control Plane Consideration for Dual Connectivity"; 3GPP TSG-RAN WG2 Meeting #85; R2-140087; Feb. 10-14, 2014; pp. 1-2; Prague, Czechia.
Samsung; "E-UTRA RRC TP on RRC Information Transfer Between Entwork Nodes"; 3GPP TSG-RAN2 RRC Ad Hoc; R2-075530; Dec. 13-14, 2007; pp. 1-5; Vienna, Austria.
CATT; "UE Capability Transfer"; 3GPP TSG RAN WG2 LTE RRC adhoc; R2-075533; Dec. 13-14, 2007; pp. 1-5; Vienna, Austria.

* cited by examiner

FIG. 5

| FEATURE | PROCESSING LOAD |
|---|---|
| NAICS | 50 |
| CATEGORY 10 | 30 |
| DUAL CONNECTIVITY | 35 |
| ... | ... |

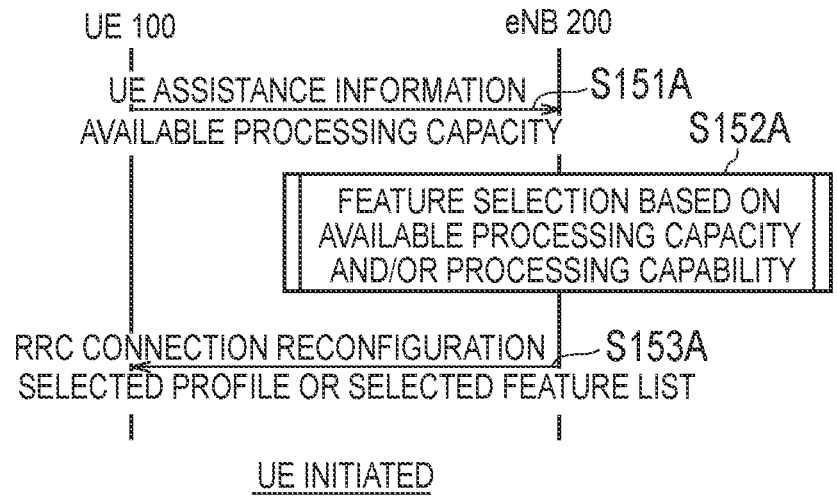
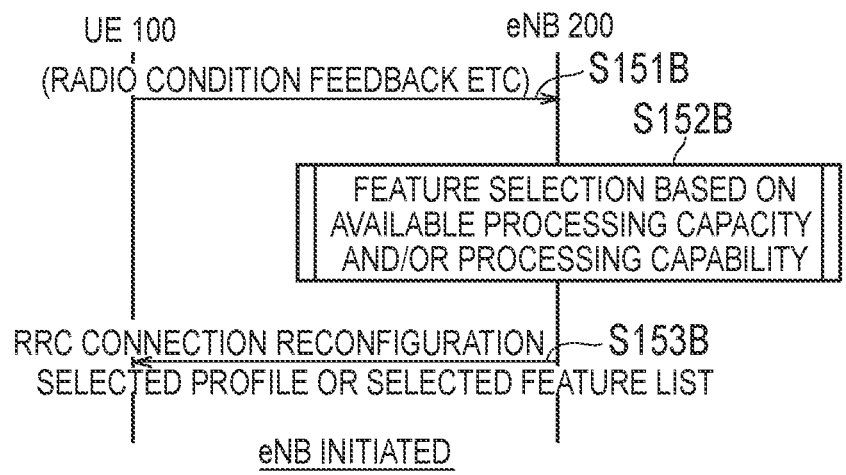

FIG. 8

| IE | | SAMPLE |
|---|---|---|
| SELECTED FEATURE LIST | M | DUAL CONNECTIVITY<br>CATEGORY 6<br>PROFILE 3<br>BAND-X(UNLICENSED)<br>... |
| NON-GUARANTEED FEATURE LIST | O | NAICS<br>D2D<br>... |

FIG. 9A

| PROFILE | PROFILED FEATURES |
|---|---|
| 1 | DUAL CONNECTIVITY<br>D2D |
| 2 | NAICS<br>D2D |
| 3 | DUAL CONNECTIVITY<br>NAICS |

FIG. 9B

| NON-PROFILED FEATURES | PROCESSING LOAD |
|---|---|
| IDC INDICATION | 2 |
| MBMS SERVICE CONTINUITY | 7 |
| SYSTEM INFORMATION BLOCK TYPE 16 | 3 |

FIG. 11A

| IE | | SAMPLE |
|---|---|---|
| DSP AVAILABLE CAPACITY | M | 60% |
| CPU AVAILABLE CAPACITY | M | 30% |
| OVERALL AVAILABLE CAPACIT | O | 45% |

FIG. 11B

| FEATURE | DSP PROCESSING LOAD | CPU PROCESSING LOAD |
|---|---|---|
| NAICS | 80 | 20 |
| CATEGORY 10 | 20 | 40 |
| DUAL CONNECTIVITY | 15 | 40 |
| ... | ... | |

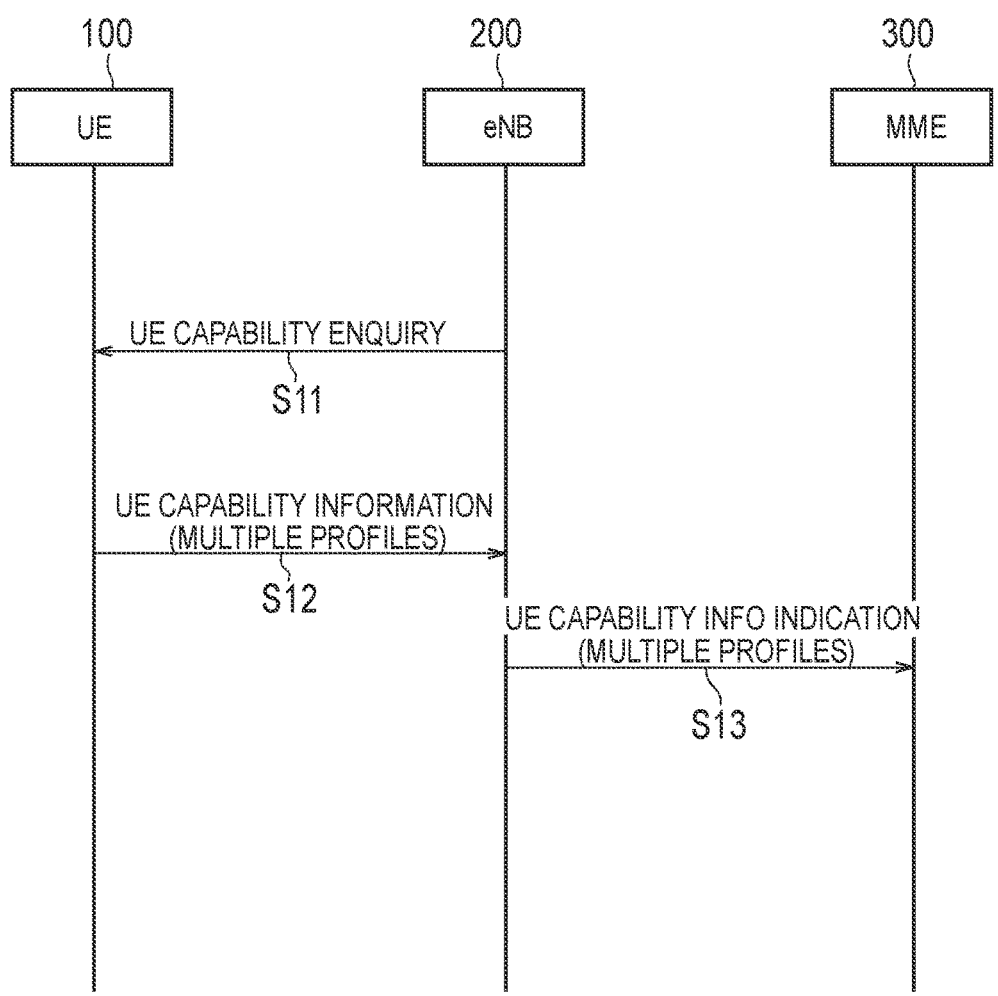

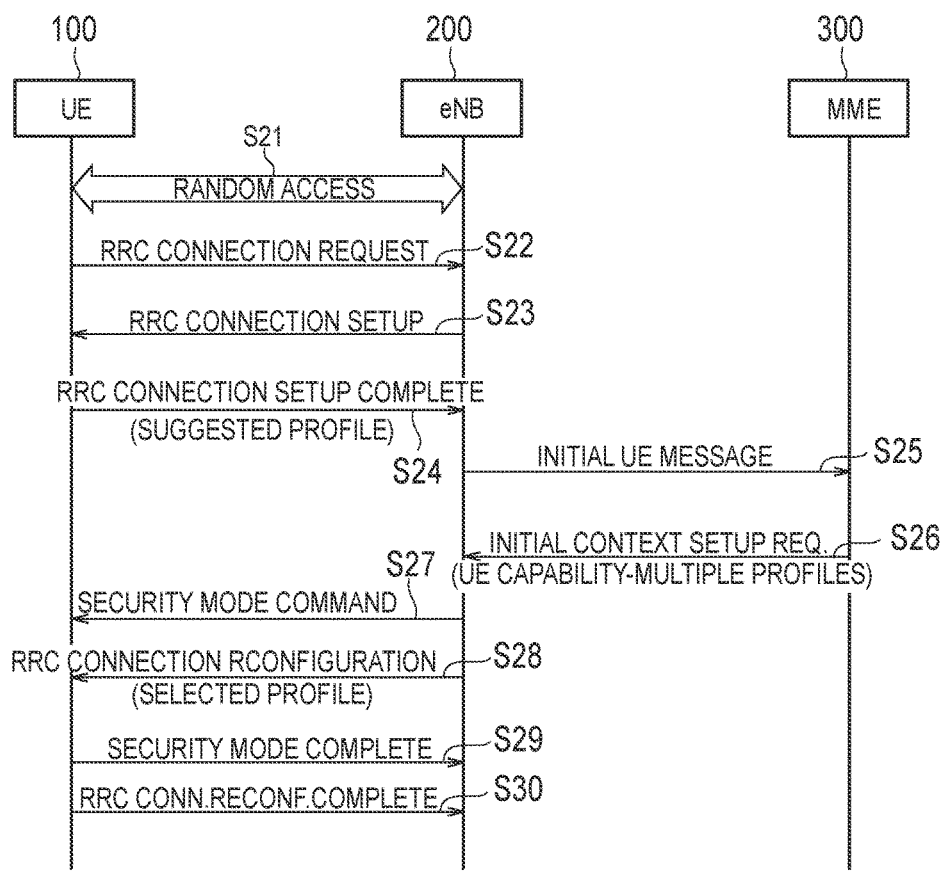

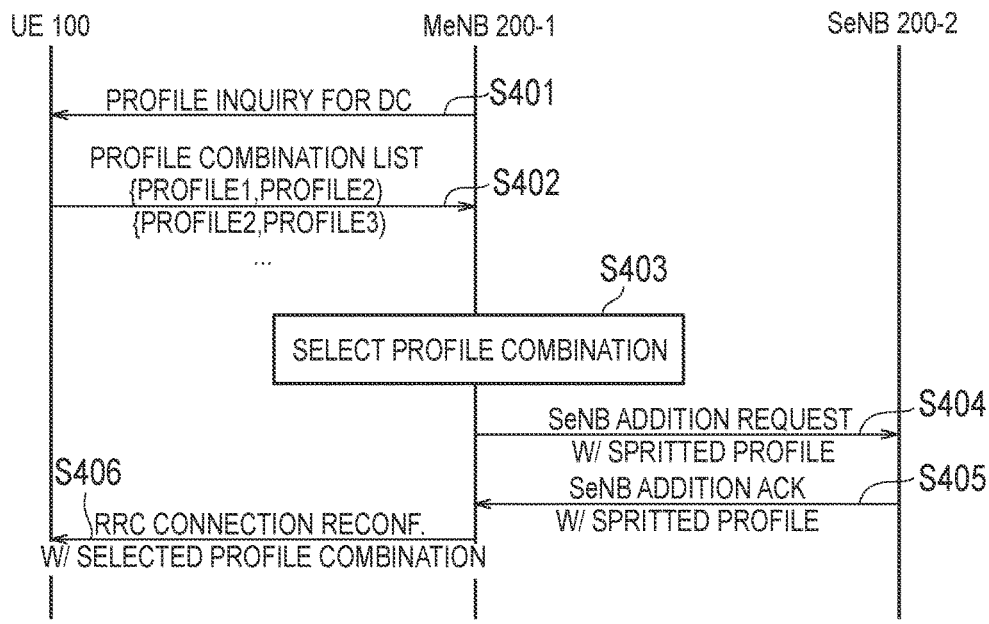
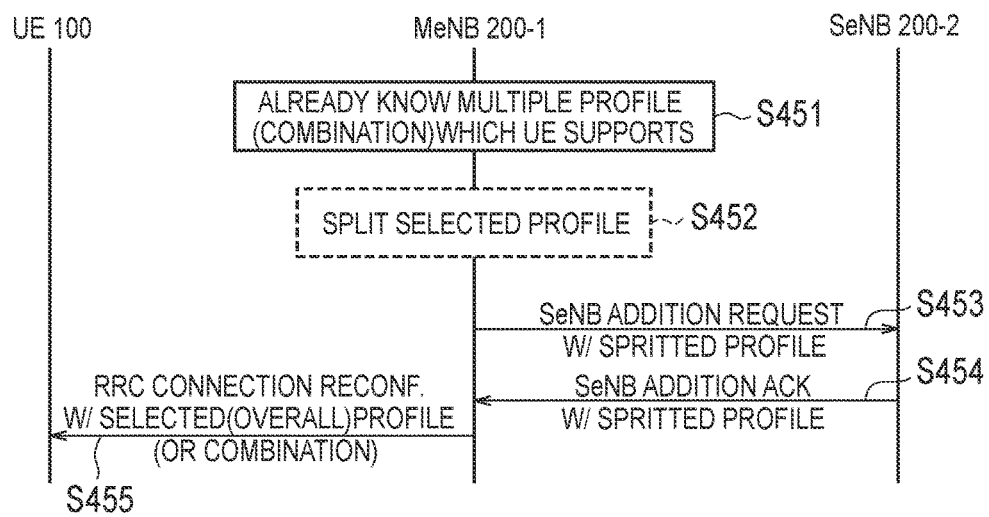

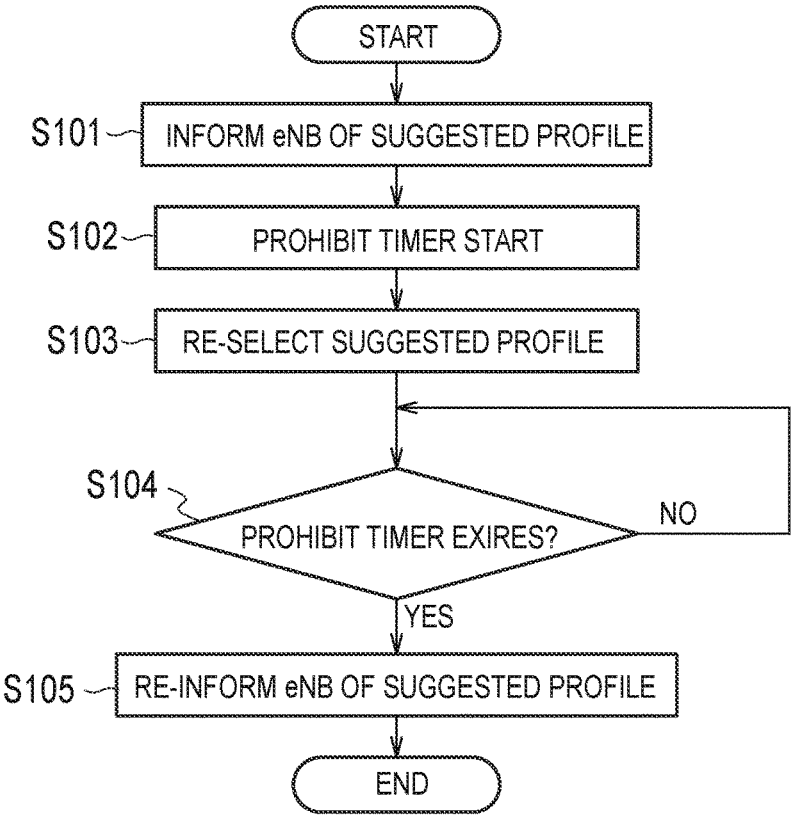
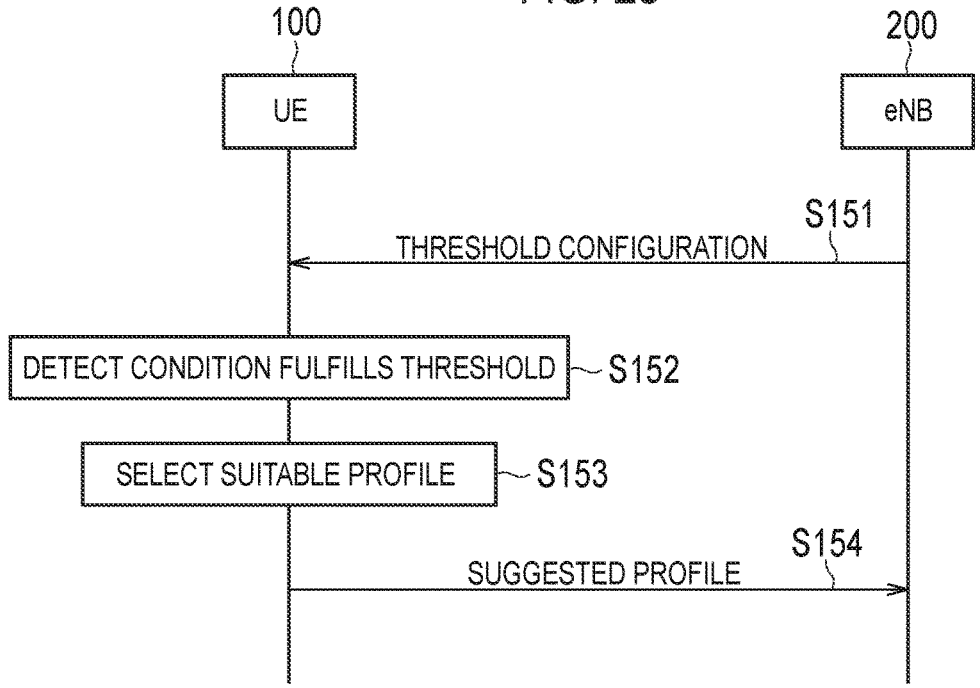

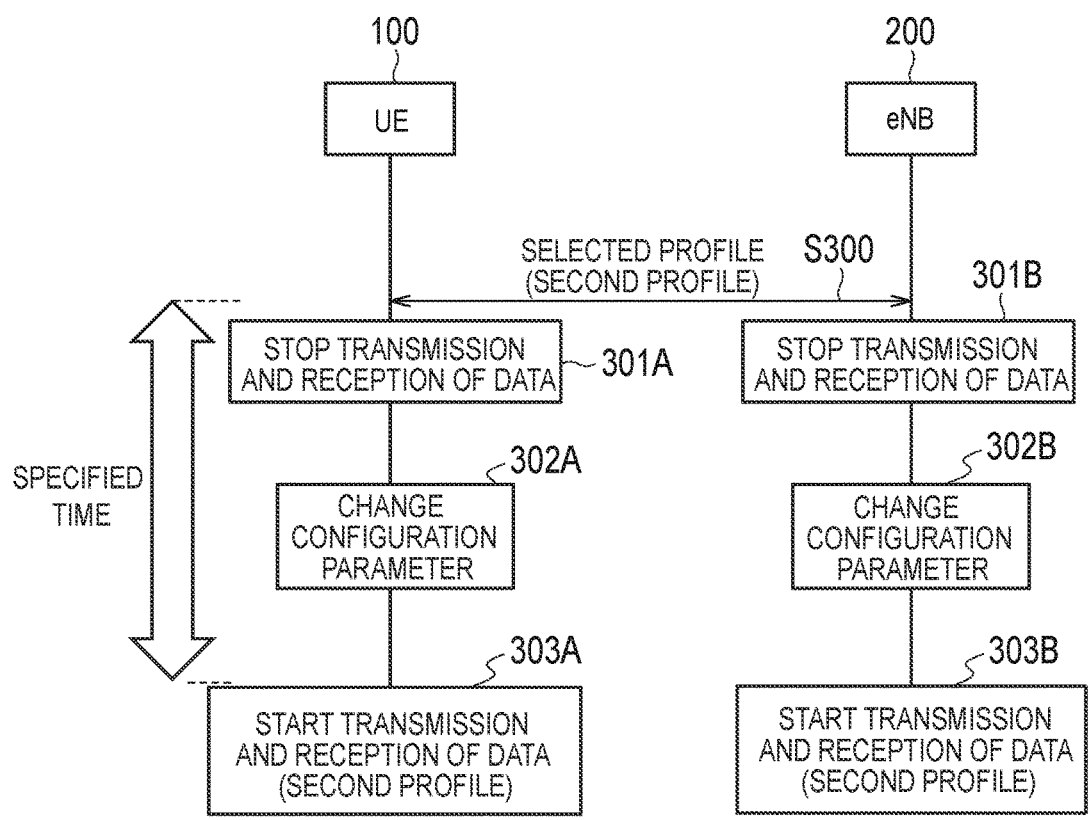

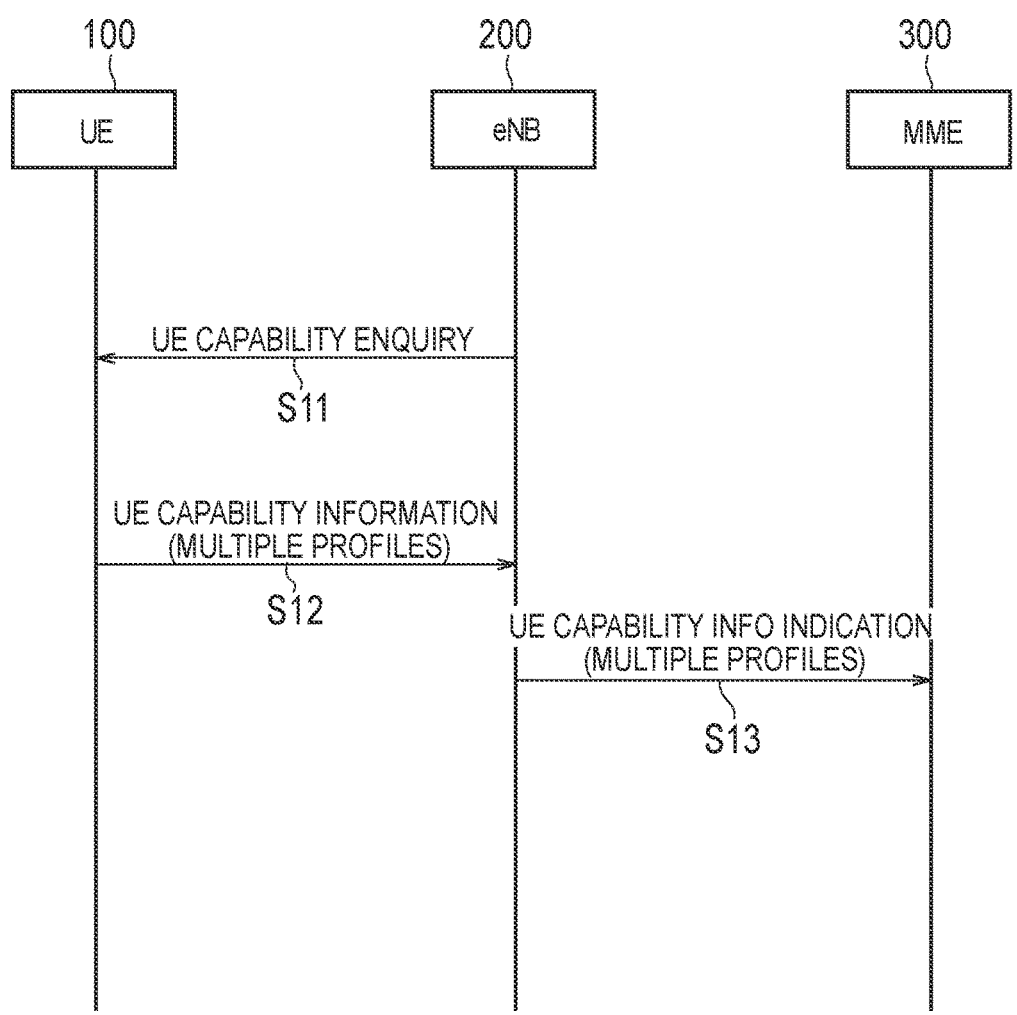

BASE STATION, RADIO TERMINAL, AND MOBILITY MANAGEMENT APPARATUS

CROSS REFERENCE

This application claims the benefit of U.S. Provisional Application No. 62/126,791 filed Mar. 2, 2015, U.S. Provisional Application No. 62/127,425 filed Mar. 3, 2015, Japanese Patent Application No. 2015-041266 filed Mar. 3, 2015, and Japanese Patent Application No. 2015-041683 filed Mar. 3, 2015, the entire contents of which are incorporated herein by reference.

TECHNICAL FIELD

The present disclosure relates to a base station, a radio terminal, and a mobility management apparatus which are used in a mobile communication system in which a plurality of functions related to radio communication are specified.

BACKGROUND ART

In a 3rd Generation Partnership Project (3GPP) standard which is a mobile communication system standardization project, a radio terminal is specified to notify a network of all functions supported by the radio terminal. The network selects at least one function among all the functions supported by the radio terminal and configures the selected function in the radio terminal.

In a case in which a radio terminal supports a plurality of functions requiring an advanced operation process, a radio terminal is commonly designed to have high processing performance on the premise of a state in which all of a plurality of functions are configured from a network (that is, a peak load state).

However, in an actual environment, since a combination of functions which are able to be simultaneously executed by the radio terminal is limited, if the radio terminal is designed on the premise of the state in which a processing load is peak, the processing performance of the radio terminal is likely to be excessive.

Therefore, in order to use the processing performance of the radio terminal maximally, a technique of specifying a combination of functions that are able to be executed practically at the same time as a "profile" in a specification and performing flexible switching of a function to be executed by a radio terminal in units of profiles is under review.

SUMMARY

A base station according to a first aspect is used in a mobile communication system in which a plurality of functions related to radio communication are specified. The base station includes: a receiver configured to receive processor information related to a load state or an attribute of a processor included in a radio terminal, from the radio terminal; a controller configured to select at least one function to be executed by the radio terminal on the basis of the processor information; and a transmitter configured to transmit information indicating the selected function, to the radio terminal.

A radio terminal according to a second aspect is used in a mobile communication system in which a plurality of functions related to radio communication are specified. The radio terminal includes: a processor configured to execute a function selected by a base station; a transmitter configured to transmit processor information related to a load state or an attribute of the processor; and a receiver configured to receive information indicating a function selected by the selected function, from the base station.

A radio terminal according to a third aspect is used in a mobile communication system in which a profile including a plurality of functions related to radio communication is specified. The radio terminal includes: a controller configured to select a specific profile corresponding to a power saving mode among a plurality of profiles supported by the radio terminal; and a transmitter configured to transmit suggested profile information indicating the specific profile to the base station.

A base station according to a fourth aspect is used in a mobile communication system in which a plurality of functions related to radio communication are specified. The base station includes: a receiver configured to receive battery information related to a remaining battery of a radio terminal, from the radio terminal; and a controller configured to select a function to be configured in the radio terminal from among a plurality of profiles supported by the radio terminal on the basis of the battery information.

A radio terminal according to a fifth aspect is used in a mobile communication system in which a profile including a plurality of functions related to radio communication is specified, the plurality of functions including a terminal category indicating performance of the radio communication. The radio terminal includes: a controller configured to select a terminal category common to a plurality of profiles supported by the radio terminal; and a transmitter configured to transmit suggested category information indicating the common terminal category.

A base station according to a sixth aspect is used in a mobile communication system in which a profile including a plurality of functions related to radio communication is specified, the plurality of functions including a terminal category indicating performance of the radio communication. The base station includes: a receiver configured to receive suggested category information indicating a terminal category common to a plurality of profiles supported by the radio terminal, from the radio terminal; and a controller configured to select a profile to be configured in the radio terminal from the plurality of profiles including the common terminal category on the basis of the suggested category information.

A base station according to a seventh aspect is used in a mobile communication system in which a profile including a plurality of functions related to radio communication is specified. The base station includes: a controller configured to notify another base station of some of one or more profiles to be configured in a radio terminal in a case in which the radio terminal performs dual connectivity communication of establishing a connection with the base station and the another base station.

A radio terminal according to an eighth aspect is used in a mobile communication system in which a profile including a plurality of functions related to radio communication is specified. The radio terminal includes a controller configured to notify a first base station of a plurality of profile groups in a case in which the radio terminal performs dual connectivity communication of establishing a connection with the first base station and a second base station. Each of the plurality of profile groups includes a plurality of profiles supported by the radio terminal.

A radio terminal according to a ninth aspect is used in a mobile communication system in which a profile including a plurality of functions related to radio communication is specified. The radio terminal includes: a transmitter configured to transmit function information indicating all functions supported by the radio terminal and profile information indicating a profile supported by the radio terminal, to the base station. The profile information includes only functions that are not included in the profile among all the functions supported by the radio terminal.

A radio terminal according to a tenth aspect is used in a mobile communication system in which a profile including a plurality of functions related to radio communication is specified. The radio terminal includes: a transmitter configured to transmit a plurality of pieces of profile information indicating a plurality of profiles supported by the radio terminal and function information indicating a function common to the plurality of profiles, to a base station. Each of the plurality of pieces of profile information includes a function different from the common function.

A radio terminal according to an eleventh aspect is used in a mobile communication system in which a plurality of profiles are specified, each of the profile including a plurality of functions related to radio communication. The radio terminal includes: a transmitter configured to transmit a profile change request for changing a profile to a profile selected by the radio terminal, to a base station; and a controller configured to maintain a prohibition state in which transmission of the profile change request is prohibited until a predetermined condition is satisfied, and release the prohibition state if the predetermined condition is satisfied.

A base station according to a twelfth aspect is used in a mobile communication system in which a plurality of profiles are specified, each of the profile including a plurality of functions related to radio communication. The base station includes: a transmitter configured to transmit a threshold that defines a predetermined condition; and a receiver configured to receive a profile change request for changing a profile to a profile selected by the radio terminal, from the radio terminal. The predetermined condition is a condition for releasing prohibition state in which transmission of the profile change request is prohibited.

A radio terminal according to a thirteenth aspect is used in a mobile communication system in which a plurality of profiles are specified, each of the profile including a plurality of functions related to radio communication. The radio terminal includes: a communication unit configured to, in a case in which a first profile is configured, transmit a change request for changing a profile to a second profile, to a base station, or receive a change request for changing a profile to the second profile, from the base station; and a controller configured to change the profile to the second profile at a second timing after a specified time elapses from a first timing at which the change request is transmitted or received.

A base station according to a fourteenth aspect is used in a mobile communication system in which a plurality of profiles are specified, each of the profile including a plurality of functions related to radio communication. The base station includes: a communication unit configured to transmit a change request for changing a profile to a second profile, to a radio terminal in which a first profile is configured, or receive a change request for changing a profile to the second profile, from the radio terminal; and a controller configured to change the profile to the second profile at a second timing after a specified time elapses from a first timing at which the change request is transmitted or received.

A radio terminal according to a fifteenth aspect is used in a mobile communication system in which a plurality of profiles are specified, each of the profile including a plurality of functions related to radio communication. The radio terminal includes: a communication unit configured to, in a case in which a first profile is configured, transmit a response to a change request for changing a profile to a second profile, to a base station, or receive a response to a change request for changing a profile to the second profile, from the base station; and a controller configured to change the profile to the second profile at a second timing after a specified time elapses from a first timing at which the response is transmitted or received.

A base station according to a sixteenth aspect is used in a mobile communication system in which a plurality of profiles are specified, each of the profile including a plurality of functions related to radio communication. The base station includes: a communication unit configured to transmit a response to a change request for changing a profile to a second profile, to a radio terminal in which a first profile is configured, or receive a response to a change request for changing a profile to the second profile, from the radio terminal; and a controller configured to change the profile to the second profile at a second timing after a specified time elapses from a first timing at which the response is transmitted or received.

A radio terminal according to a seventeenth aspect is used in a mobile communication system in which a plurality of profiles are specified, each of the profile including a plurality of functions related to radio communication. The radio terminal includes: a controller configured to select a second profile different from a first profile in a case in which the first profile is configured; and a transmitter configured to transmit a profile change request for changing a profile to the second profile, to a base station. The controller is configured to select the second profile so that at least some communication states are maintained on the basis of the first profile.

A base station according to an eighteenth aspect is used in a mobile communication system in which a plurality of profiles are specified, each of the profile including a plurality of functions related to radio communication. The base station includes: a controller configured to notify another base station of a profile supported by a radio terminal without going through a mobility management apparatus or via the mobility management apparatus in a case in which a handover of the radio terminal is performed from the base station to the another base station.

A mobility management apparatus according to a nineteenth aspect is used in a mobile communication system in which a plurality of profiles are specified, each of the profile including a plurality of functions related to radio communication. The mobility management apparatus includes: a controller configured to notify a second base station of a profile supported by a radio terminal in a case in which a handover of the radio terminal is performed from a first base station to the second base station.

A base station according to a twelfth aspect is used in a mobile communication system in which a plurality of profiles are specified, each of the profile including a plurality of functions related to radio communication. The base station includes: a controller configured to acquire a profile supported by a radio terminal from another base station or a mobility management apparatus in a case in which a handover of the radio terminal is performed from the another base station to the base station.

A radio terminal according to a twenty-first aspect is used in a mobile communication system in which a plurality of profiles are specified, each of the profile including a plurality of functions related to radio communication. The radio terminal includes: a controller configured to acquire a profile used by a second base station to communicate with the radio terminal, from the first base station, in a case in which a handover of the radio terminal is performed from the first base station to the second base station.

A base station according to a twenty-second aspect is used in a mobile communication system in which a plurality of profiles are specified, each of the profile including a plurality of functions related to radio communication. The base station includes: a transmitter configured to transmit information indicating whether or not the base station supports a profile, to a radio terminal in a broadcast manner.

A radio terminal according to a twenty-third aspect is used in a mobile communication system in which a plurality of profiles are specified, each of the profile including a plurality of functions related to radio communication. The radio terminal includes: a controller configured to notify a non-profile-supported base station of only some functions among functions supported by the radio terminal when the radio terminal is connected with the non-profile-supported base station.

A radio terminal according to a twenty-fourth aspect is used in a mobile communication system in which a plurality of profiles are specified, each of the profile including a plurality of functions related to radio communication. The radio terminal includes: a controller configured to be detached from a network and attached to the network before establishing a connection with a non-profile-supported base station.

A radio terminal according to a twenty-fifth aspect is used in a mobile communication system in which a plurality of profiles are specified, each of the profile including a plurality of functions related to radio communication. The radio terminal includes: a controller configured to notify a mobility management apparatus of any one of profiles supported by the radio terminal as a specified profile.

BRIEF DESCRIPTION OF DRAWINGS

FIG. 5 is a diagram illustrating a specific example of a load estimation value according to a first embodiment.
FIGS. 7A and 7B are diagrams illustrating an operation sequence during an RRC connection according to the first embodiment.
FIG. 8 is a diagram for describing a second modified example of the first embodiment.
FIGS. 9A and 9B are diagrams for describing a main function and a sub function according to a second embodiment.
FIGS. 11A and 11B are diagrams for describing an operation according to a third embodiment.
FIG. 14 is a diagram illustrating an example of an initial profile acquisition sequence.

FIG. 15 is a diagram illustrating an example of an initial profile setting sequence.
FIG. 22 is a diagram illustrating an example of an operation sequence according to a ninth embodiment.
FIG. 23 is a diagram illustrating an example of an operation sequence according to a modified example of the ninth embodiment.
FIG. 27 is a diagram illustrating an operation flow of a UE (radio terminal) according to a twelfth embodiment.
FIG. 28 is a diagram illustrating an operation sequence according to a modified example of the twelfth embodiment.
FIG. 29 is a diagram illustrating an example of an operation sequence according to a thirteenth embodiment.
FIG. 30 is a diagram illustrating an example of an operation sequence related to initial profile acquisition.

DESCRIPTION OF EMBODIMENTS

Overview of First to Fifth Embodiments

Figure 1:
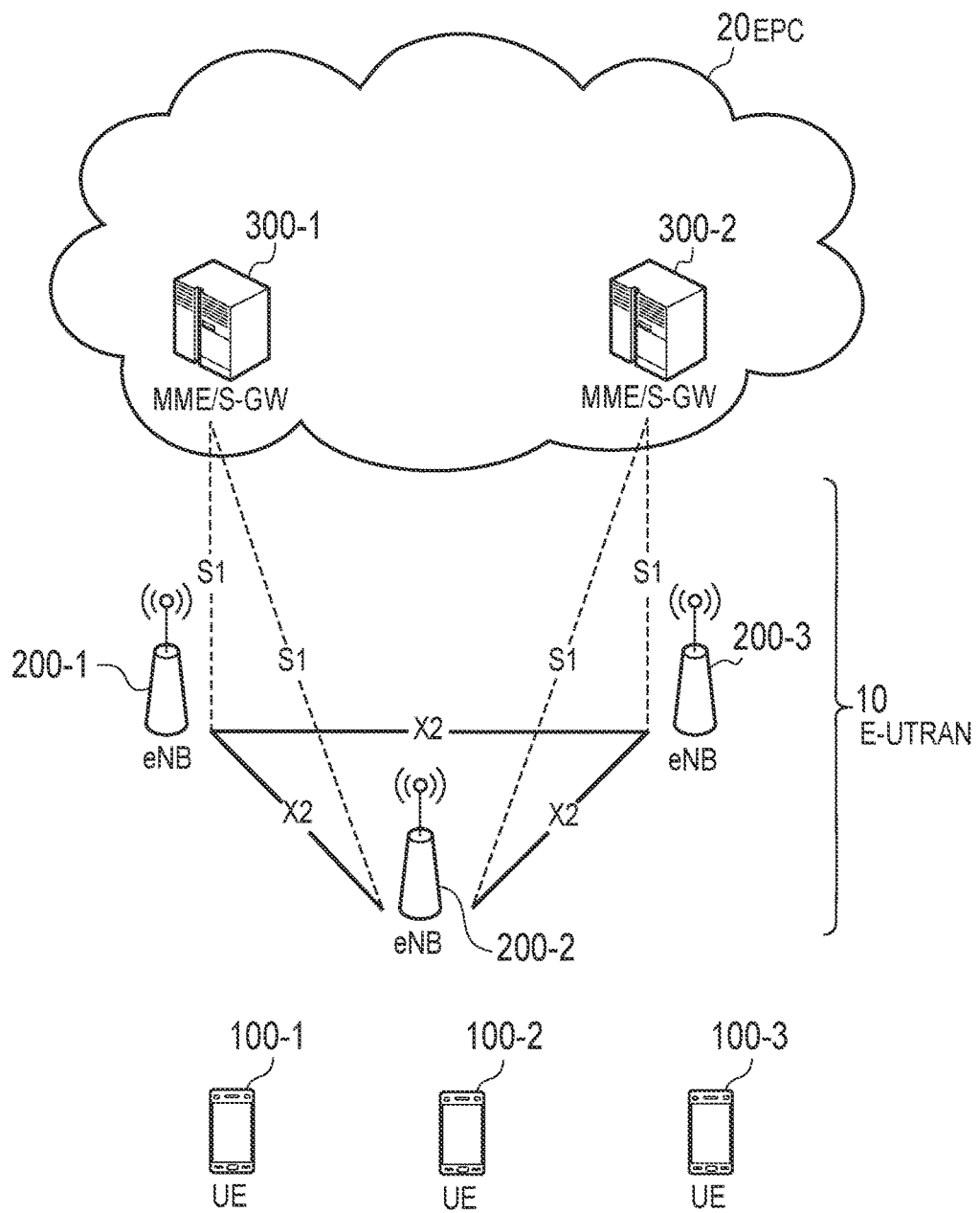
FIG. 1 is a configuration diagram of an LTE system.

In recent years, in the 3GPP standard, functions requiring an advanced operation process have been standardized one after another, and functions have increased and subdivided for each release.

In the technique using the "profile" described above, it is necessary to define a new profile each time a new function is standardized. Therefore, standardization works for specifying new profiles may be increased.

In this regard, it is an object of the first to fifth embodiments to provide a base station and a radio terminal which are capable of flexibly switching a function to be executed by a radio terminal while preventing the standardization works from being increased.

A base station according to first to fifth embodiments is used in a mobile communication system in which a plurality of functions related to radio communication are specified. The base station includes: a receiver configured to receive processor information related to a load state or an attribute of a processor included in a radio terminal, from the radio terminal; a controller configured to select at least one function to be executed by the radio terminal on the basis of the processor information; and a transmitter configured to transmit information indicating the selected function, to the radio terminal.

In the first to fifth embodiments, the processor information includes information indicating a processing capacity which is currently available in the processor.

In the first to fifth embodiments, the processor information includes information indicating processing performance of the processor.

In the first to third embodiments, a load estimation value which is an estimation value of a processing load necessary for execution is specified for each of the plurality of functions. The controller is configured to select the at least one function further on the basis of the load estimation value.

In the second embodiment, the plurality of functions include a plurality of main functions which are classified into any one of a plurality of profiles, and a plurality of sub functions which are not classified into any of the plurality of profiles. The controller is configured to select one profile and at least one sub function as the at least one function to be executed by the radio terminal.

In the third embodiment, in a case in which the radio terminal includes a plurality of processors, the receiver is configured to receive the processor information for each of the plurality of processors, from the radio terminal.

In the fourth and fifth embodiments, the processor information includes information indicating a chip model number of the processor.

In the fourth embodiment, the transmitter is configured to transmit a program for executing the selected function to the radio terminal.

A radio terminal according to first to fifth embodiments is used in a mobile communication system in which a plurality of functions related to radio communication are specified. The radio terminal includes: a processor configured to execute a function selected by a base station; a transmitter configured to transmit processor information related to a load state or an attribute of the processor; and a receiver configured to receive information indicating a function selected by the selected function, from the base station.

In the first to fifth embodiments, the processor information includes information indicating a processing capacity which is currently available in the processor.

In the first to fifth embodiments, the processor information includes information indicating processing performance of the processor.

In the second embodiment, the plurality of functions include a plurality of main functions which are classified into any one of a plurality of profiles, and a plurality of sub functions which are not classified into any of the plurality of profiles. The receiver is configured to receive one profile and at least one sub function from the base station.

In the third embodiment, in a case in which the radio terminal includes a plurality of processors, the transmitter is configured to transmit the processor information for each of the plurality of processors, to the base station.

In the fourth and fifth embodiments, the processor information includes information indicating a chip model number of the processor.

In the fourth embodiment, the receiver is configured to receive a program for executing the selected function to the radio terminal.

In the fifth embodiment, the transmitter is configured to transmit the processor information to a server via the base station. The receiver is configured to receive a plurality of profiles from the server via the base station.

First Embodiment (Mobile Communication System)

Hereinafter, an LTE system which is a mobile communication system according to the first embodiment will be described. FIG. 1 is a diagram illustrating a configuration of the LTE system.

The LTE system includes a user equipment (UE) 100, an evolved-UMTS terrestrial radio access network (E-UTRAN) 10, and an evolved packet core (EPC) 20 as illustrated in FIG. 1.

The UE 100 corresponds to a radio terminal. The UE 100 is a mobile communication apparatus and performs radio communication with a cell (a serving cell). A configuration of the UE 100 will be described later.

The E-UTRAN 10 corresponds to a radio access network. The E-UTRAN 10 includes an evolved Node-B (eNB) 200. The eNB 200 corresponds to a base station. The eNBs 200 are connected to each other via an X2 interface. A configuration of the eNB 200 will be described later.

The eNB 200 manages one or more cells and performs radio communication with the UE 100 that has established a connection with a cell thereof. The eNB 200 has a radio resource management (RRM) function, a user data routing function (hereinafter referred to simply as "data"), a measurement control function for mobility control/scheduling, and the like. In addition to a term indicating a minimum unit of a radio communication area, "cell" is also used as a term indicating a function performing radio communication with the UE 100.

The EPC 20 corresponds to a core network. The EPC 20 includes a mobility management entity (MME)/serving-gateway (S-GW) 300. The MME performs various kinds of mobility control or the like on the UE 100. The S-GW performs data transfer control. The MME/S-GW 300 is connected to the eNB 200 via an S1 interface. The E-UTRAN 10 and the EPC 20 constitute a network.

Figure 2:
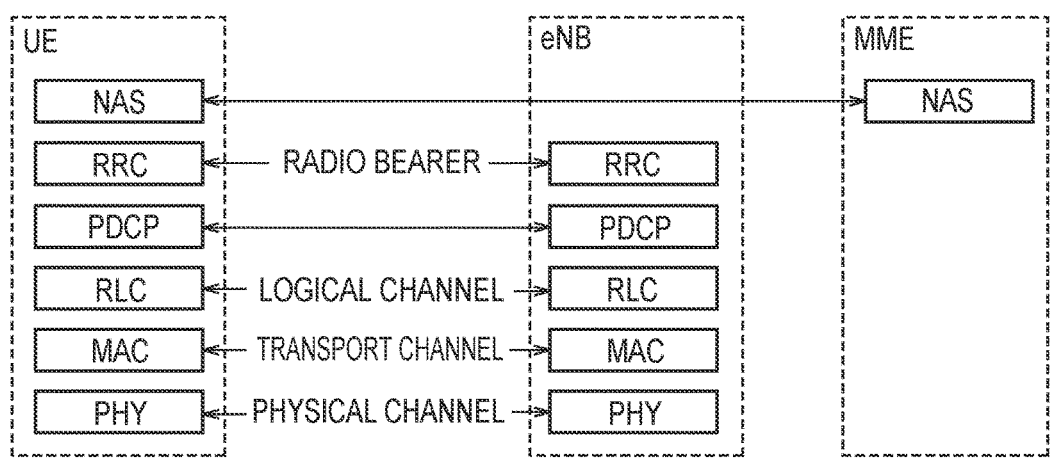
FIG. 2 is a protocol stack diagram of a radio interface.

FIG. 2 is a protocol stack diagram of a radio interface in the LTE system. As illustrated in FIG. 2, the radio interface protocol is divided into first to third layers of an OSI reference model, and the first layer is a physical (PHY) layer. The second layer includes a medium access control (MAC) layer, a radio link control (RLC) layer, and a packet data convergence protocol (PDCP) layer. The third layer includes a radio resource control (RRC) layer.

The physical layer performs encoding/decoding, modulation/demodulation, antenna mapping/demapping, and resource mapping/demapping. Data and a control signal are transmitted between the physical layer of the UE 100 and the physical layer of the eNB 200 via the physical channel.

The MAC layer performs priority control of data, a retransmission process by hybrid ARQ (HARQ), a random access procedure, and the like. Data and a control signal are transmitted between the MAC layer of the UE 100 and the MAC layer of the eNB 200 via the transport channel. The MAC layer of the eNB 200 includes a scheduler that decides uplink and downlink transport formats (a transport block size and a modulation and coding scheme (MCS)) and an allocated resource block for the UE 100.

The RLC layer transmits data to the RLC layer on a reception side using the functions of the MAC layer and the physical layer. Data and a control signal are transmitted between the RLC layer of the UE 100 and the RLC layer of the eNB 200 via a logical channel.

The PDCP layer performs header compression/decompression and encryption/decryption.

The RRC layer is defined only on a control plane for dealing with a control signal. A message (RRC message) for various kinds of settings is transmitted between the RRC layer of the UE 100 and the RRC layer of the eNB 200. The RRC layer controls logical channels, transport channels, and physical channels in accordance with establishment, re-establishment, and release of a radio bearer. In a case in which there is a connection (RRC connection) between the RRC of the UE 100 and the RRC of the eNB 200, the UE 100 is in an RRC connected mode (connected mode), and otherwise, the UE 100 is in an RRC idle mode (idle mode).

A non-access stratum (NAS) layer located above the RRC layer performs session management, mobility management, and the like.

(Functions Related to Radio Communication)

The UE 100 supports functions related to radio communication. The functions related to the radio communication refer to functions specified in a specification such as "dual connectivity," device to device (D2D), and network-assisted interference cancellation and suppression (NAICS). The functions related to the radio communication may include "UE category." Hereinafter, the functions related to the radio communication are referred to appropriately as "features."

The UE 100 notifies the network of a "UE capability" message including all functions which are supported by the UE 100. For example, the eNB 200 transmits an inquiry about the "UE capability" to the UE 100, and notifies the MME 300 of the "UE capability" acquired from the UE 100 by the eNB 200. Accordingly, the eNB 200 and the MME 300 detect all the functions (UE capabilities) supported by the UE 100. The "UE capability" is held in the MME 300 while the UE 100 is being attached to the network. The "UE capability" is transferred from a source eNB to a target eNB when the UE 100 performs the handover. In order to change the "UE capability," it is necessary for the UE 100 to be detached from the network and re-attached to the network.

The eNB 200 selects at least one function among the functions supported by the UE 100 on the basis of the "UE capability." Then, the eNB 200 configures the selected function in the UE 100 through an individual RRC message or the like. Specifically, the eNB 200 transmits configuration information related to the selected function to the UE 100 in order to perform a configuration related to the selected function on the UE 100.

(Radio Terminal)

Figure 3:
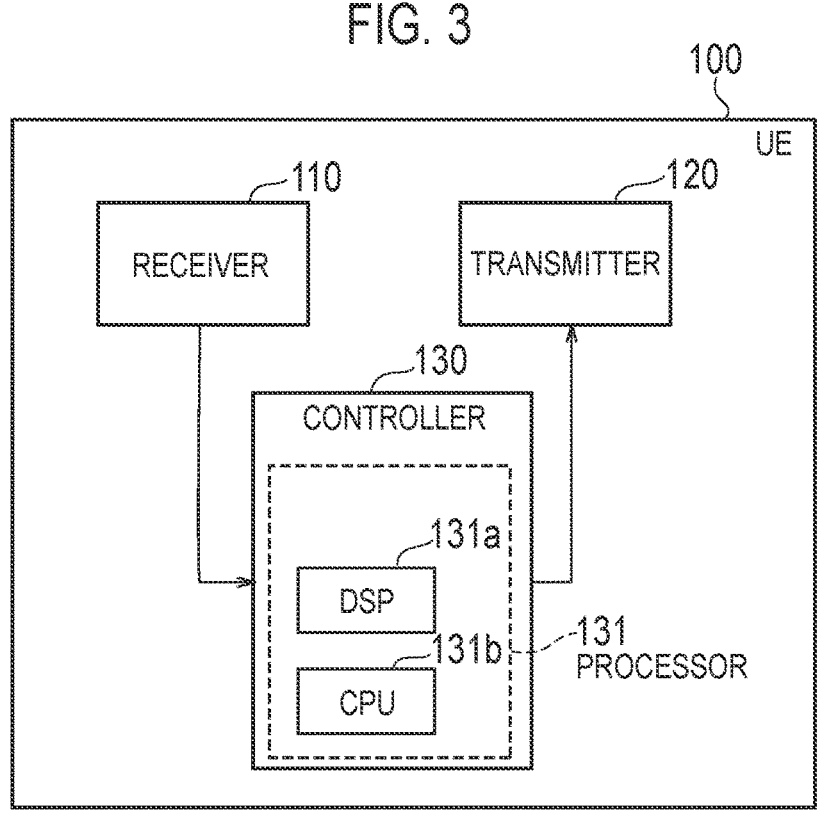
FIG. 3 is a block diagram of a UE.

A UE 100 (radio terminal) according to a first embodiment will be described below. FIG. 3 is a block diagram of the UE 100. The UE 100 includes a receiver 110, a transmitter 120, and a controller 130 as illustrated in FIG. 3.

The receiver 110 performs various types of receptions under the control of the controller 130. The receiver 110 includes an antenna and a receiving device. The receiving device converts a radio signal received through the antenna into a baseband signal (reception signal) and outputs the baseband signal to the controller 130.

The transmitter 120 performs various kinds of transmissions under the control of the controller 130. The transmitter 120 includes an antenna and a transmitting device. The transmitting device converts a baseband signal (transmission signal) output from the controller 130 into a radio signal and transmits the radio signal through the antenna.

The controller 130 performs various kinds of controls in the UE 100. The controller 130 includes a processor 131. The controller 130 further includes a memory (not illustrated).

The processor 131 includes a digital signal processor (DSP) 131a that perform modulation/demodulation, encoding/decoding, and the like of the baseband signal and a central processing unit (CPU) 131b that executes a program stored in the memory and performs various kinds of processes. The processor 131 may further include a codec that encodes and decodes audio/video signals. The processor 131 executes various kinds of processes and various kinds of communication protocols.

The processor 131 performs an operation process of executing a function selected by the eNB 200. The transmitter 120 transmits the processor information related to a load state or an attribute of the processor 131 to the eNB 200. The transmitter 120 may transmit the processor information to the eNB 200 when the load state of the processor 131 changes.

In the first embodiment, the processor information includes information (available processing capacity) indicating a processing capacity which is currently available in the processor 131. The "available processing capacity" refers to information related to the load state of the processor 131. The "Available processing capacity" may be indicated by a percentage (proportion). For example, the "available processing capacity" is a percentage of operation process resources (that is, a processing load) being used or a percentage of unused operation process resources (that is, a processing margin). Alternatively, the "available processing capacity" may be an amount of unused operation process resources.

Further, the processor information may include information (processing capability) indicating processing performance of the processor 131. The "available processing capacity" is information related to an attribute of the processor 131. Unlike the "available processing capacity," the "processing capability" is constant regardless of the load state of the processor 131.

As will be described later, the eNB 200 selects a function to be executed by the UE 100 from the "UE capability" on the basis of the "available processing capacity" and/or the "processing capability."

The receiver 110 receives information indicating the function selected by the eNB 200 from the eNB 200. For example, the receiver 110 receives a "RRC Connection Reconfiguration" message including the configuration information (configuration) of the function selected by the eNB 200. The processor 131 executes the function selected by the eNB 200 on the basis of the configuration information (configuration).

(Base Station)

Figure 4:
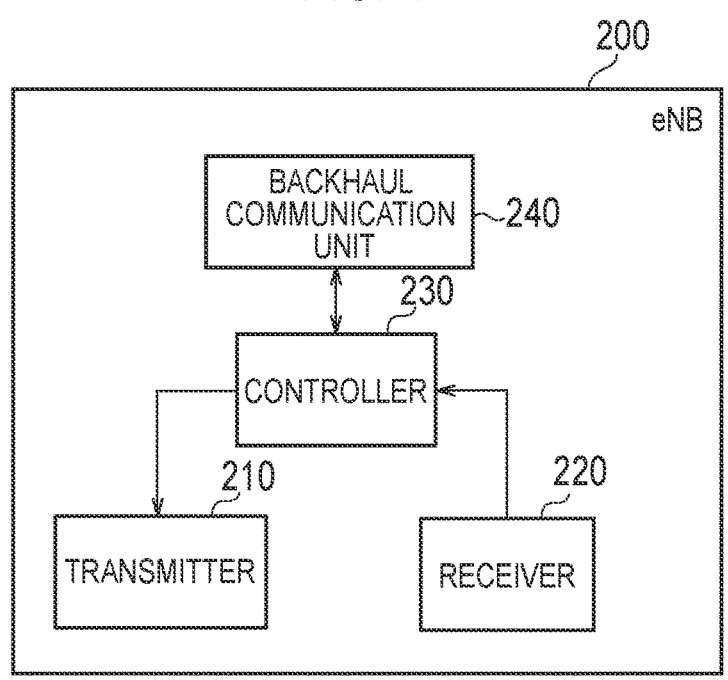
FIG. 4 is a block diagram of an eNB.

A configuration of the eNB 200 (base station) according to the first embodiment will be described below. FIG. 4 is a block diagram of the eNB 200. The eNB 200 includes a transmitter 210, a receiver 220, a controller 230, and a backhaul communication unit 240 as illustrated in FIG. 4.

The transmitter 210 performs various types of transmissions under the control of the controller 230. The transmitter 210 includes an antenna and a transmitting device. The transmitting device converts a baseband signal (transmission signal) output from the controller 230 into a radio signal and transmits the radio signal from the antenna.

The receiver 220 performs various types of receptions under the control of the controller 230. The receiver 220 includes an antenna and a receiving device. The receiving device converts a radio signal received by the antenna into a baseband signal (reception signal) and outputs the baseband signal to the controller 230.

The controller 230 performs various kinds of controls in the eNB 200. The controller 230 includes a processor (not illustrated) and a memory. The memory stores programs executed by the processor and information used for processes performed by the processor. The processor includes a DSP that performs modulation/demodulation, encoding/decoding, and the like of the baseband signal and a CPU that executes a program stored in the memory and performs various kinds of processes. The processor executes various kinds of processes and various kinds of communication protocols.

The backhaul communication unit 240 is connected to a neighbor eNB 200 via the X2 interface and connected to the MME/S-GW 300 via the S1 interface. The backhaul communication unit 240 is used for communication performed via the X2 interface, communication to be performed via the S1 interface, and the like.

Further, the receiver 220 receives the processor information related to the load state or the attribute of the processor 131 included in the UE 100 from the UE 100. In the first embodiment, the processor information includes the "available processing capacity." The processor information may include the "processing capability."

The controller 230 selects at least one function to be executed by the UE 100 on the basis of the processor information. In the first embodiment, a load estimation value which is an estimation value of the processing load necessary for execution is specified for each of a plurality of functions. Specifically, the processing load when the function is executed is modeled and specified by a specification. The controller 230 selects at least one function to be executed by the UE 100 further on the basis of the load estimation value (the modeled value).

FIG. 5 is a diagram illustrating a specific example of the load estimation value according to the first embodiment. As illustrated in FIG. 5, "50" is specified as the load estimation value of NAICS, "30" is specified as the load estimation value of "Category 10," and "50" is specified as the load estimation value of the "dual connectivity." The table as illustrated in FIG. 5 may be set in the eNB 200 in advance or may be appropriately set in the eNB 200 from the core network (EPC 20).

For example, the controller 230 selects at least one function to be executed by the UE 100 not to exceed the "available processing capacity" on the basis of the "available processing capacity" and the load estimation value. Specifically, the controller 230 extracts at least one candidate of the function to be executed by the UE 100 from the functions in the "UE capability," and acquires the load estimation value corresponding to the extracted candidate. Then, the controller 230 selects the function so that a sum of the acquired load estimation values falls within the "available processing capacity." At that time, the controller 230 may also calculate the processing margin of the UE 100 or the amount of unused operation process resources in view of the "processing capability."

The transmitter 210 transmits information indicating the function selected by the controller 230 to the UE 100. For example, the transmitter 210 transmits the "RRC Connection Reconfiguration" message including the configuration information (configuration) of the function selected by the controller 230 to the UE 100.

(Operation Sequence)

An operation sequence according to the first embodiment will be described below.

(1) Operation Sequence at Time of Establishment of RRC Connection

Figure 6:
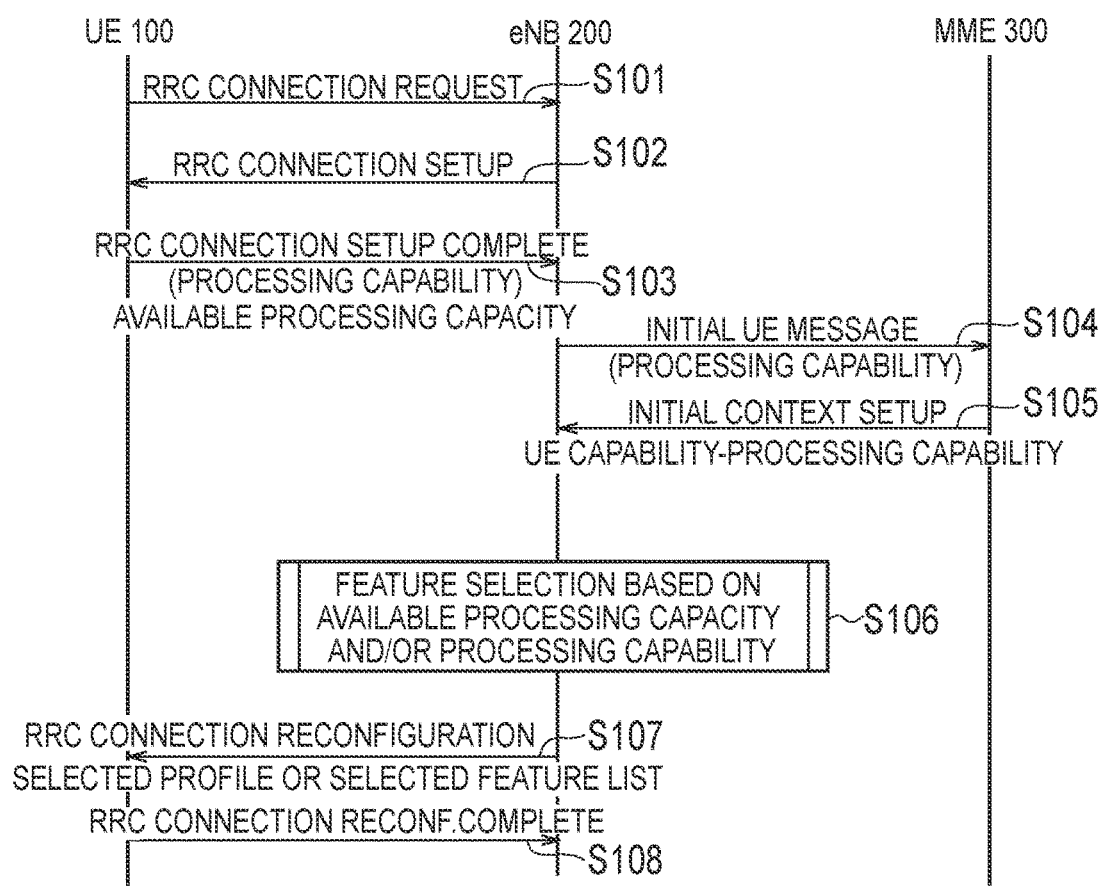
FIG. 6 is a diagram illustrating an operation sequence at the time of establishment of an RRC connection according to the first embodiment.

FIG. 6 is a diagram illustrating an operation sequence at the time of establishment of the RRC connection. In an initial state of the present sequence, the UE 100 is in the idle mode.

As illustrated in FIG. 6, in step S101, the UE 100 transmits an "RRC Connection Request" message to the eNB 200.

In step S102, the eNB 200 transmits an "RRC Connection Setup" message to the UE 100 in response to reception of the "RRC Connection Request" message.

In step S103, the UE 100 transmits an "RRC Connection Setup Complete" message to the eNB 200 in response to reception of the "RRC Connection Setup" message. The UE 100 includes the "available processing capacity" in the "RRC Connection Setup Complete" message. Further, the UE 100 may include the "processing capability" in the "RRC Connection Setup Complete" message. The eNB 200 stores the "available processing capacity" and the "processing capability" included in the received "RRC Connection Setup Complete" message.

The "processing capability" may be managed in association with subscriber information in the EPC 20 (the HSS or the like). Therefore, the UE 100 may not include the "processing capability" in the "RRC Connection Setup Complete" message.

As a result of step S103, the UE 100 transits from the idle mode to the connected mode.

In step S104, the eNB 200 transmits an "INITIAL UE MESSAGE" to the MME 300 in response to reception of the "RRC Connection Setup Complete" message. The eNB 200 may include the "processing capability" in the "INITIAL UE MESSAGE."

In step S105, the MME 300 transmits an "INITIAL CONTEXT SETUP" message to the eNB 200 in response to reception of the "INITIAL UE MESSAGE." The "INITIAL CONTEXT SETUP" message includes the "UE capability." Further, the MME 300 includes the "processing capability" in the "INITIAL UE MESSAGE."

In step S106, the eNB 200 selects at least one function (feature) to be executed by the UE 100 on the basis of the "available processing capacity" and/or the "processing capability."

In step S107, the eNB 200 transmits an "RRC Connection Reconfiguration" message including a list (feature list) of at least one selected function to the UE 100. As will be described later, the eNB 200 may include the "feature list" in the "RRC Connection Reconfiguration" message together with a profile including a main function.

In step S108, the UE 100 transmits an "RRC Connection Reconfiguration Complete" message to the eNB 200 in response to reception of the "RRC Connection Reconfiguration" message.

(2) Operation Sequence During RRC Connection

FIGS. 7A and 7B are diagrams illustrating an operation sequence during the RRC connection. In the initial state of FIGS. 7A and 7B, the UE 100 is in the connected mode. FIG. 7A illustrates a function switching pattern which is initiated by the UE 100, and FIG. 7B illustrates a function switching pattern which is initiated by the eNB 200.

As illustrated in FIG. 7A, in step S151A, the UE 100 transmits "UE Assistance information" including the "available processing capacity" to the eNB 200. The UE 100 may transmit the "UE Assistance information" including the "available processing capacity" at the present point in time to the eNB 200 in response to a change in the "available processing capacity."

In step S152A, the eNB 200 selects at least one function (feature) to be executed by the UE 100 on the basis of the "available processing capacity" and/or the "processing capability."

In step S153A, the eNB 200 transmits the "RRC Connection Reconfiguration" message including the list (feature list) including at least one selected function to the UE 100.

As illustrated in FIG. 7B, in step S151B, the UE 100 transmits information such as feedback of the radio state to the eNB 200. The eNB 200 decides that the function to be executed by the UE 100 is changed on the basis of the information received from the UE 100.

In step S152B, the eNB 200 selects at least one function (feature) to be executed by the UE 100 on the basis of the "available processing capacity" and/or the "processing capability" previously received from the UE 100.

In step S153B, the eNB 200 transmits the "RRC Connection Reconfiguration" message including the list (feature list) including at least one selected function to the UE 100.

Conclusion of First Embodiment

According to the first embodiment, it is possible to cause the UE 100 to execute an appropriate function in accordance with the load state or the attribute of the processor 131 included in the UE 100 without depending on the profile. Therefore, it is possible to flexibly switch the function to be executed by the UE 100 while preventing the standardization works from being increased.

First Modified Example of First Embodiment

In the first embodiment described above, the eNB 200 transmits the list including all the functions (selected features) selected on the basis of the "available processing capacity" and/or the "processing capability" to the UE 100.

However, the eNB 200 may transmit a difference between the functions currently configured in the UE 100 and the "selected features" to the UE 100. For example, the eNB 200 may transmit a list (Add list) including functions which are currently not configured in the UE 100 among the functions selected by the "selected features" to the UE 100. The eNB 200 may transmit a list (Delete list) including functions which are not included in the "selected features" among the functions which are currently configured in the UE 100 to the UE 100.

Second Modified Example of First Embodiment

In the above first embodiment, the eNB 200 selects the function (feature) not to exceed the "available processing capacity."

However, the eNB 200 may select a function whose processing load exceeds the "available processing capacity." In this case, the UE 100 may decide whether or not the configuration information of the function whose processing load exceeds the "available processing capacity" is used in accordance with a predetermined priority.

Alternatively, as illustrated in FIG. 8, the eNB 200 may configure a function selected so as not to exceed the "available processing capacity" or the "processing capability" and a function exceeding the "available processing capacity" as a guaranteed feature and a non-guaranteed feature distinctively. FIG. 8 illustrates an example in which a list (a selected feature list) including the "selected features" corresponding to the guarantees feature and a list (a non-guaranteed feature list) including guaranteed features are transmitted from the eNB 200 to the UE 100.

Second Embodiment

The second example will be described focusing on a difference with the first embodiment.

In the second embodiment, a plurality of functions related to the radio communication include a plurality of main functions classified into any one of a plurality of profiles and a plurality of sub functions which are not classified into any of a plurality of profiles. FIGS. 9A and 9B are diagrams for describing the main function and the sub function.

As illustrated in FIG. 9A, each profile is configured with a combination of main functions. Here, an example in which a profile 1 is configured with a combination of the "dual connectivity" and D2D, a profile 2 is configured with a combination of "NAILS" and D2D, and a profile 3 is configured with a combination of the "dual connectivity" and D2D is illustrated. The load estimation value which is an estimation value of the processing load necessary for execution is specified for each of a plurality of profiles. Specifically, the processing load when the profile is executed is modeled and specified in a specification.

As illustrated in FIG. 9B, the sub function is a function which is not classified into a profile. Here, "IDC indication," "MBMS service continuity," and "System Information Block Type 16" are illustrated as the sub functions. The load estimation value that is an estimation value of the processing load necessary for execution is specified for each of a plurality of sub functions. Specifically, the processing load when the sub function is executed is modeled and specified in a specification.

In the present modified example, the eNB 200 selects one profile and at least one sub function as at least one function to be executed by the UE 100. The UE 100 receives information indicating one profile and information indicating at least one sub function from the eNB 200.

Figure 10:
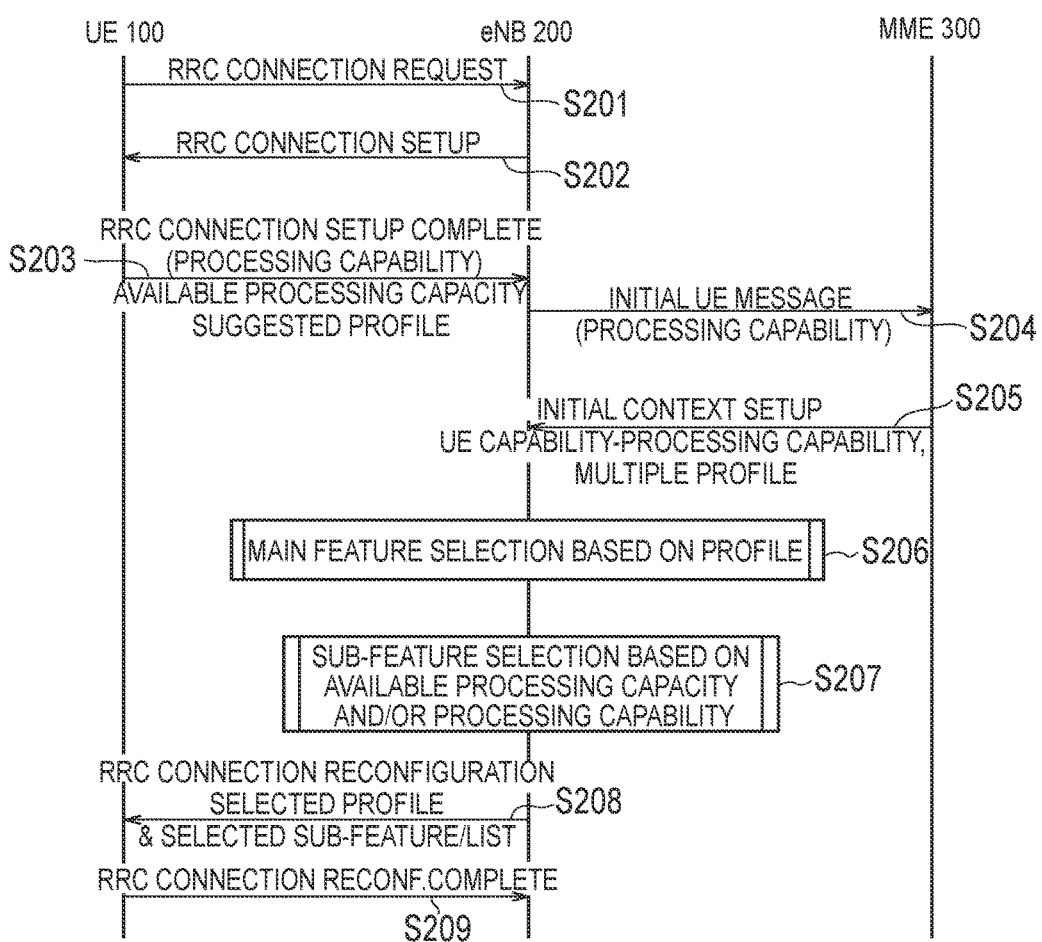
FIG. 10 is a diagram illustrating an operation sequence according to the second embodiment.

FIG. 10 is a diagram illustrating an operation sequence according to the second embodiment. In the initial state of the present sequence, the UE 100 is in the idle mode.

As illustrated in FIG. 10, in step S201, the UE 100 transmits the "RRC Connection Request" message to the eNB 200.

In step S202, the eNB 200 transmits the "RRC Connection Setup" message to the UE 100 in response to reception of the "RRC Connection Request" message.

In step S203, the UE 100 transmits the "RRC Connection Setup Complete" message to the eNB 200 in response to reception of the "RRC Connection Setup" message. The UE 100 includes the "available processing capacity" and a "suggested profile" in the "RRC Connection Setup Complete" message. The "suggested profile" is a profile which is desired (suggested) by the UE 100 among a plurality of profiles specified in a specification. Further, the UE 100 may include the "processing capability" in the "RRC Connection Setup Complete" message. As a result of step S203, the UE 100 transits from the idle mode to the connected mode. The eNB 200 stores the "available processing capacity" and the "suggested profile."

In step S204, the eNB 200 transmits the "INITIAL UE MESSAGE" to the MME 300 in response to reception of the "RRC Connection Setup Complete" message. The eNB 200 may include the "processing capability" in the "INITIAL UE MESSAGE."

In step S205, the MME 300 transmits the "INITIAL CONTEXT SETUP" message to the eNB 200 in response to reception of "INITIAL UE MESSAGE." The "INITIAL CONTEXT SETUP" message includes the "UE capability," the "processing capability," a "multiple profile." The "multiple profile" refers to a plurality of profiles specified in a specification.

In step S206, the eNB 200 selects a profile desired by the UE 100 among a plurality of profiles specified in a specification on the basis of the "suggested profile" and the "multiple profile." Here, it is preferable that the load estimation value of the selected profile do not exceed the "available processing capacity."

In step S207, the eNB 200 selects at least one sub function to be executed by the UE 100 on the basis of the "available processing capacity" and/or the "processing capability."

In step S208, the eNB 200 transmits an "RRC Connection Reconfiguration" message including the selected profile and the list (sub-feature list) of the selected sub function to the UE 100.

In step S209, the UE 100 transmits the "RRC Connection Reconfiguration Complete" message to the eNB 200 in response to reception of the "RRC Connection Reconfiguration" message.

The present modified example is not limited to the operation sequence at the time of establishment of the RRC connection but applicable to the sequence during the RRC connection illustrated in FIGS. 7A and 7B.

Third Embodiment

The third embodiment will be described focusing on a difference with the first and second embodiments.

In the first embodiment, the processing load of each function is modeled for the entire processor 131 of the UE 100. However, in a case in which an operation apparatus is different, modeling is unlikely to be performed unconditionally.

In this regard, in the third embodiment, the processing load is able to be determined for the individual processors of the UE 100 (that is, the DSP 131a and the CPU 131b). For example, the DSP 131a is assumed to execute processing of the physical layer, and the CPU 131b is assumed to execute processing of the RRC layer. FIGS. 11A and 11B are diagrams for describing an operation according to the third embodiment.

As illustrated in FIG. 11A, the UE 100 transmits the "available processing capacity" to the eNB 200 for each of the DSP 131a and the CPU 131b. Specifically, a "DSP available processing capacity" corresponding to the DSP 131a and a "CPU available processing capacity" corresponding to the CPU 131b are transmitted to the eNB 200. The UE 100 may also transmit an "overall available capacity" which is the "available processing capacity" of the entire processor 131 to the eNB 200.

The eNB 200 selects at least one function to be executed by the UE 100 on the basis of the "DSP available processing capacity" and the "CPU available processing capacity." In the third embodiment, the load estimation value which is the estimation value of the processing load necessary for execution for each of the plurality of functions is specified for each of the DSP ad the CPU. Specifically, for each of the DSP and the CPU, the processing load when the function is executed is modeled and specified in a specification.

As illustrated in FIG. 11B, for NAICS, for example, "80" is specified as the load estimation value of the DSP, and "20" is specified as the processing load of the CPU. For "Category 10," "20" is specified as the load estimation value of the DSP, and "40" is specified as the processing load of the CPU. For the "dual connectivity," "15" is specified as the load estimation value of the DSP, and "40" is specified as the processing load of the CPU.

On the basis of the table as illustrated in FIG. 11B, the eNB 200 selects at least one function to be executed by the UE 100 not to exceed the "DSP available processing capacity" and the "CPU available processing capacity." The other operations are similar to those of the first embodiment.

The third embodiment may be combined with the first and second modified examples of the first embodiment or the second embodiment.

Fourth Embodiment

The fourth example will be described focusing on a difference with the first to third embodiments.

In the fourth embodiment, the UE 100 transmits information indicating a chip model number of the processor 131 (chip model number information). The chip model number information is the processor information related to the attribute of the processor 131. The eNB 200 selects at least one function to be executed by the UE 100 on the basis of the chip model number information.

Figure 12:
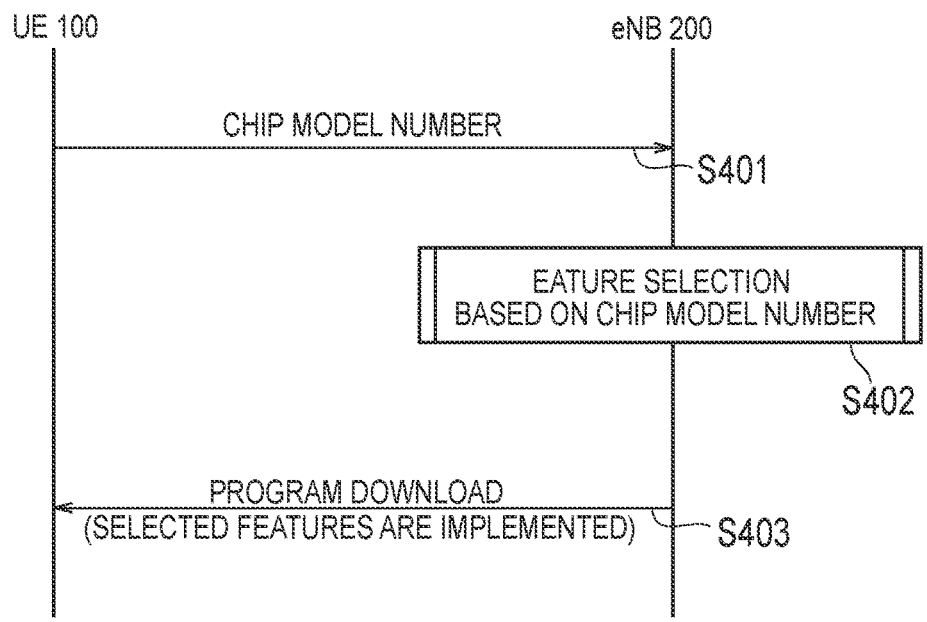
FIG. 12 is a diagram illustrating an operation sequence according to a fourth embodiment.

FIG. 12 is a diagram illustrating an operation sequence according to the fourth embodiment.

As illustrated in FIG. 12, in step S401, the UE 100 transmits the chip model number information (chip model number) to the eNB 200.

In step S402, the eNB 200 selects at least one function to be executed by the UE 100 on the basis of the "chip model number." Specifically, a correspondence relation between the "chip model number" and the function is specified, and a function corresponding to the "chip model number" is selected.

In step S403, the eNB 200 transmits a program for executing at least one selected function to the UE 100. The program implements only necessary functions. The UE 100 receives the program. The UE 100 executes a program through the processor 131 and executes the function selected by the eNB 200.

Alternatively, in a case in which the program is set in the UE 100 in advance, the eNB 200 may transmit only information (identifier) indicating at least one selected function to the UE 100.

Fifth Embodiment

The fifth example will be described focusing on a difference with the first to fourth embodiments.

Figure 13:
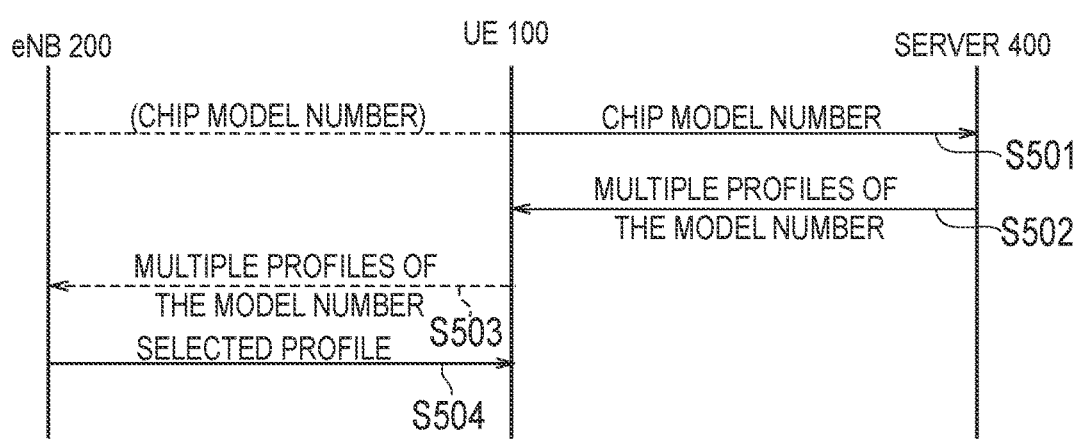
FIG. 13 is a diagram illustrating an operation sequence according to a fifth embodiment.

FIG. 13 is a diagram illustrating an operation sequence according to the fifth embodiment.

As illustrated in FIG. 13, in step S501, the UE 100 transmits the chip model number information (chip model number) to a server 400 (via the eNB 200). Alternatively, the eNB 200 that has acquired the "chip model number" may transmit the "chip model number" to the server 400. The server 400 may be not a node which is managed by an operator (a node in an operator network) but a server which is managed by a chip vendor or the like.

The server 400 selects a profile (multiple profile) to be executed by the UE 100 on the basis of the "chip model number." Specifically, a correspondence relation between the "chip model number" and the profile is specified, and the "multiple profile" corresponding to the "chip model number" is selected. The correspondence relation between the "chip model number" and the profile may be updated.

In step S502, the server 400 transmits the selected "multiple profile" to the UE 100 (via the eNB 200). The UE 100 stores the "multiple profile" corresponding to its own chip (the processor 131). The eNB 200 may acquire the "multiple profile."

In step S503, the UE 100 transmits the "multiple profile" to the eNB 200. However, step S503 may be omitted.

In step S504, the eNB 200 selects at least one profile from the "multiple profile" and transmits information indicating the selected profile to the UE 100.

Overview of Sixth to Eleventh Embodiment

In the technique using the "profile" described above, it is not clear how to select or notify of the profile.

In this regard, it is an object of the sixth to eleventh embodiments to provide a radio terminal and a base station which are capable of appropriately selecting or notifying of the profile.

A radio terminal according to the sixth embodiment is used in a mobile communication system in which a profile including a plurality of functions related to radio communication is specified. The radio terminal includes: a controller configured to select a specific profile corresponding to a power saving mode among a plurality of profiles supported by the radio terminal; and a transmitter configured to transmit suggested profile information indicating the specific profile to the base station.

In the sixth embodiment, the controller is configured to select the specific profile in accordance with a user input indicating an instruction to apply the power saving mode.

In the sixth embodiment, in a case in which the radio terminal is an in-vehicle terminal mounted on a vehicle, the controller is configured to select the specific profile in accordance with a state of the vehicle.

In the sixth embodiment, the controller is configured to select a profile having the lowest power consumption among the plurality of profiles as the specific profile.

In the sixth embodiment, the transmitter is configured to transmit identification information indicating the power saving mode to the base station together with the suggested profile information.

A base station according to a seventh embodiment is used in a mobile communication system in which a plurality of functions related to radio communication are specified. The base station includes: a receiver configured to receive battery information related to a remaining battery of a radio terminal, from the radio terminal; and a controller configured to select a function to be configured in the radio terminal from among a plurality of profiles supported by the radio terminal on the basis of the battery information.

In the seventh embodiment, the controller is configured to select a specific profile corresponding to a power saving mode as a profile to be configured in the radio terminal on the basis of the battery information.

A radio terminal according to an eighth embodiment is used in a mobile communication system in which a profile including a plurality of functions related to radio communication is specified, the plurality of functions including a terminal category indicating performance of the radio communication. The radio terminal includes: a controller configured to select a terminal category common to a plurality of profiles supported by the radio terminal; and a transmitter configured to transmit suggested category information indicating the common terminal category.

In the eighth embodiment, in a case in which there are a plurality of common terminal categories, the transmitter is configured to transmit a list including the common terminal category as the suggested category information.

A base station according to an eighth aspect is used in a mobile communication system in which a profile including a plurality of functions related to radio communication is specified, the plurality of functions including a terminal category indicating performance of the radio communication. The base station includes: a receiver configured to receive suggested category information indicating a terminal category common to a plurality of profiles supported by the radio terminal, from the radio terminal; and a controller configured to select a profile to be configured in the radio terminal from the plurality of profiles including the common terminal category on the basis of the suggested category information.

In the eighth embodiment, in a case in which there are a plurality of common terminal categories, the receiver is configured to receive a list including the common terminal category as the suggested category information.

A base station according to a ninth embodiment is used in a mobile communication system in which a profile including a plurality of functions related to radio communication is specified. The base station includes: a controller configured to notify another base station of some of one or more profiles to be configured in a radio terminal in a case in which the radio terminal performs dual connectivity communication of establishing a connection with the base station and the another base station.

In the ninth embodiment, the base station includes a receiver configured to receive a plurality of profile groups from the radio terminal. Each of the plurality of profile groups includes a plurality of profiles. The controller is configured to select a profile group to be configured in the radio terminal from among the plurality of profile groups, and notify some profiles included in the selected profile group to the another base station in a case in which the dual connectivity communication is performed.

In the modification of the ninth embodiment, the controller is configured to select a profile to be configured in the radio terminal from a plurality of profiles supported by the radio terminal, and notify the another base station of some functions included in the selected profile in a case in which the dual connectivity communication is performed.

A radio terminal according to a ninth embodiment is used in a mobile communication system in which a profile including a plurality of functions related to radio communication is specified. The radio terminal includes a controller configured to notify a first base station of a plurality of profile groups in a case in which the radio terminal performs dual connectivity communication of establishing a connection with the first base station and a second base station. Each of the plurality of profile groups includes a plurality of profiles supported by the radio terminal.

A radio terminal according to a tenth embodiment is used in a mobile communication system in which a profile including a plurality of functions related to radio communication is specified. The radio terminal includes: a transmitter configured to transmit function information indicating all functions supported by the radio terminal and profile information indicating a profile supported by the radio terminal, to the base station. The profile information includes only functions that are not included in the profile among all the functions supported by the radio terminal.

A radio terminal according to an eleventh embodiment is used in a mobile communication system in which a profile including a plurality of functions related to radio communication is specified. The radio terminal includes: a transmitter configured to transmit a plurality of pieces of profile information indicating a plurality of profiles supported by the radio terminal and function information indicating a function common to the plurality of profiles, to a base station. Each of the plurality of pieces of profile information includes a function different from the common function.

Sixth Embodiment (Multiple Profiles UE Capability)

The UE 100 supports a plurality of functions related to radio communication. The functions related to the radio communication refer to functions specified in a specification such as the "dual connectivity," device to device (D2D), and Network-Assisted Interference Cancellation and Suppression (NAICS). The functions related to the radio communication may include "UE category." Further, the functions related to the radio communication may include "Support Band Combination." Hereinafter, the functions related to the radio communication are referred to appropriately as "features."

In the sixth embodiment, in order to use the processing performance of the UE 100 maximally, it is assumed that a combination of functions that are able to be executed practically at the same time is specified as a "profile" in a specification, and a function to be executed by the UE 100 is able to be switched flexibly. For example, a profile #1 is configured with a combination of "Category 6" and NAICS, a profile #2 is configured with a combination of "Category 7" and the "dual connectivity," and a profile #3 is configured with a combination of "Category 10" and D2D.

FIG. 14 is a diagram illustrating an example of an initial profile acquisition sequence. In the initial information of the present sequence, the UE 100 is in the connected mode.

As illustrated in FIG. 14, in step S11, the eNB 200 transmits a "UE Capability Enquiry" message to the UE 100.

In step S12, the UE 100 transmits a "UE Capability information" message including a plurality of profiles (multiple profiles) supported by the UE 100 to the eNB 200 in response to reception of the "UE Capability Enquiry" message.

In step S13, the eNB 200 transmits a "UE Capability info Indication" message including a plurality of profiles (multiple profiles) supported by the UE 100 to the MME 300 in response to reception of the "UE Capability information" message. The MME 300 holds information of a plurality of profiles (multiple profiles) supported by the UE 100 until the UE 100 is detached from the network. Further, if the UE 100 is detached from the network, the MME 300 discards the information of a plurality of profiles (multiple profiles) supported by the UE 100.

FIG. 15 is a diagram illustrating an example of an initial profile setting sequence. In the initial state of the present sequence, the UE 100 is in the idle mode.

As illustrated in FIG. 15, in step S21, the UE 100 performs random access to the eNB 200.

In step S22, the UE 100 transmits the "RRC Connection Request" message to the eNB 200.

In step S23, the eNB 200 transmits the "RRC Connection Setup" message to the UE 100 in response to reception of the "RRC Connection Request" message.

In step S24, the UE 100 transmits the "RRC Connection Setup Complete" message to the eNB 200 in response to reception of the "RRC Connection Setup" message. Here, the UE 100 selects one profile from a plurality of profiles (multiple profiles) supported by the UE 100 as the suggested profile, and includes the "suggested profile" in the "RRC Connection Setup Complete" message. As a result of step S24, the UE 100 transits from the idle mode to the connected mode.

In step S25, the eNB 200 transmits the "INITIAL UE MESSAGE" to the MME 300 in response to reception of the "RRC Connection Setup Complete" message.

In step S26, the MME 300 transmits the "INITIAL CONTEXT SETUP REQ." message to the eNB 200 in response to reception of the "INITIAL UE MESSAGE." Here, the MME 300 includes information of a plurality of profiles (multiple profiles) supported by the UE 100 in the "INITIAL CONTEXT SETUP REQ." message. The eNB 200 holds the information of a plurality of profiles (multiple profiles) supported by the UE 100.

In step S27, the eNB 200 transmits a "Security Mode Command" message to the UE 100.

In step S28, the eNB 200 transmits the "RRC Connection Reconfiguration" message to the UE 100. Here, the eNB 200 includes the configuration information (Configuration) of the profile (selected profile) selected from a plurality of profiles (multiple profiles) supported by the UE 100 in the "RRC Connection Reconfiguration" message. The UE 100 holds the configuration information (Configuration) of the "selected profile," and then starts the radio communication according to the "selected profile."

In step S29, the UE 100 transmits a "Security Mode Complete" message to the eNB 200.

In step S30, the UE 100 transmits an "RRC Conn. Reconf. Complete" message to the eNB 200.

Figure 16A:
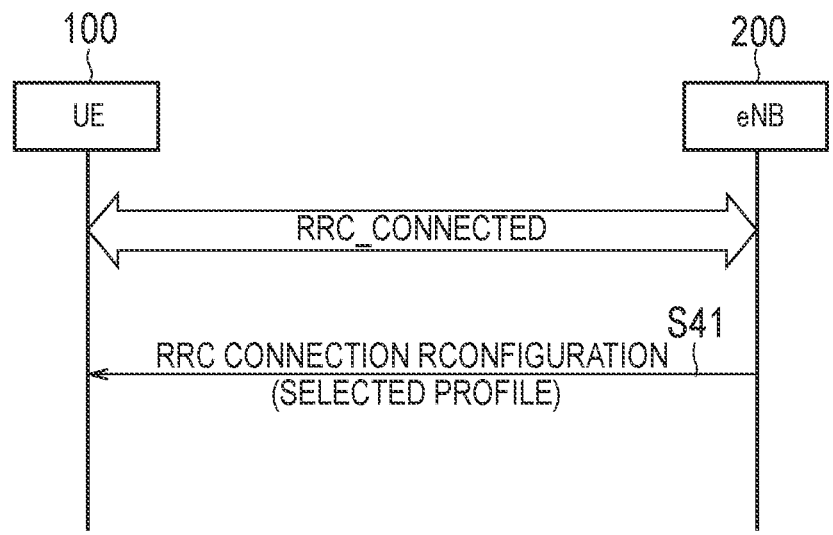
FIGS. 16A and 16B are diagrams illustrating an example of an operation sequence related to a profile change during an RRC connection.
Figure 16B:
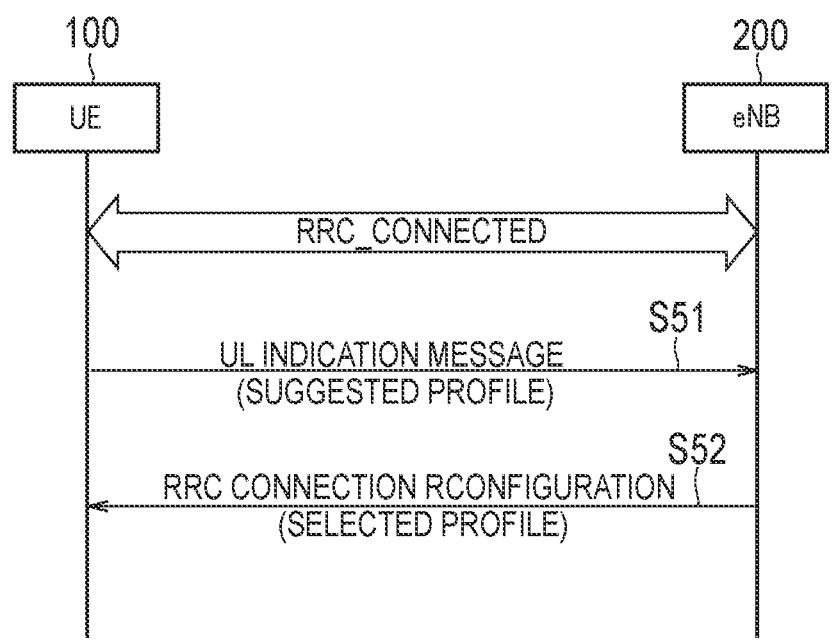

FIGS. 16A and 16B are diagrams illustrating an example of an operation sequence related to a profile change during the RRC connection. FIG. 16A illustrates a profile change sequence initiated by the eNB 200, and FIG. 16B illustrates a profile change sequence initiated by the UE 100.

As illustrated in FIG. 16A, in step S41, the eNB 200 selects one profile from a plurality of profiles (multiple profiles) supported by the UE 100. Then, the eNB 200 transmits the configuration information (Configuration) of the selected profile to the UE 100 through the "RRC Connection Reconfiguration" message. The UE 100 changes the profile on the basis of the Configuration of the "selected profile."

As illustrated in FIG. 16B, in step S51, the UE 100 transmits an "UL Indication" message including the profile selected by the UE 100 as the suggested profile to the eNB 200.

In step S52, the eNB 200 transmits the configuration information (configuration) of the profile (selected profile) selected on the basis of the "suggested profile" to the UE 100 through the "RRC Connection Reconfiguration" message. The UE 100 changes the profile on the basis of the Configuration of the "selected profile."

(Radio Terminal)

Figure 17:
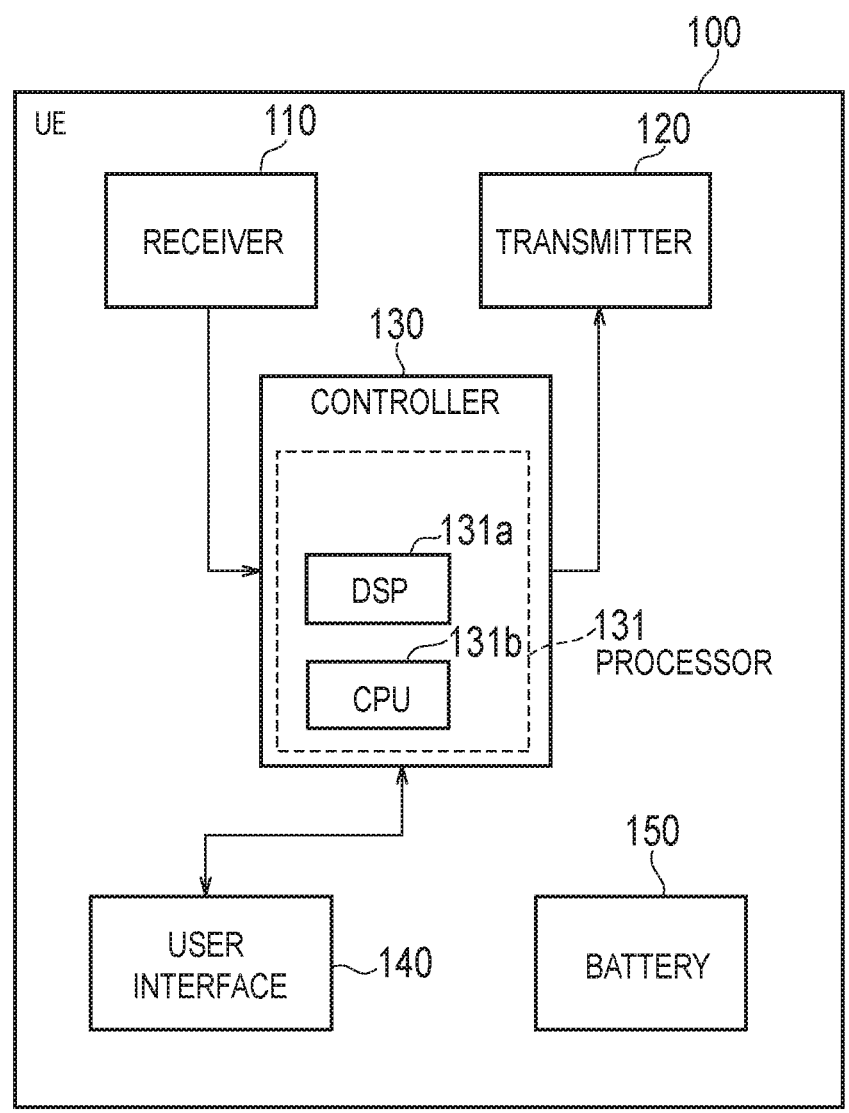
FIG. 17 is a block diagram of a UE.

A UE 100 (radio terminal) according to a sixth embodiment will be described below. FIG. 17 is a block diagram of the UE 100. As illustrated in FIG. 17, the UE 100 includes a receiver 110, a transmitter 120, a controller 130, a user interface 140, and a battery 150.

The receiver 110 performs various types of receptions under the control of the controller 130. The receiver 110 includes an antenna and a receiving device. The receiving device converts a radio signal received through the antenna into a baseband signal (reception signal) and outputs the baseband signal to the controller 130.

The transmitter 120 performs various kinds of transmissions under the control of the controller 130. The transmitter 120 includes an antenna and a transmitting device. The transmitting device converts a baseband signal (transmission signal) output from the controller 130 into a radio signal and transmits the radio signal through the antenna.

The controller 130 performs various kinds of controls in the UE 100. The controller 130 includes a processor 131. The controller 130 further includes a memory (not illustrated). The processor 131 includes a digital signal processor (DSP) 131a that perform modulation/demodulation, encoding/decoding, and the like of the baseband signal and a central processing unit (CPU) 131b that executes a program stored in the memory and performs various kinds of processes. The processor 131 may further include a codec that encodes and decodes audio/video signals. The controller 130 executes various kinds of processes and various kinds of communication protocols.

The user interface 140 is an interface with a user who carries the UE 100, and includes, for example, a display, a microphone, a speaker, various kinds of buttons, and the like. The user interface 140 receives an operation from the user and outputs a signal indicating content of the operation to the controller 130.

The battery 150 stores electric power to be supplied to the blocks of the UE 100. An amount or a proportion of the electric power stored in the battery 150 is referred to as a "remaining battery level."

The UE 100 having the configuration is used in the LTE system in which a profile including a plurality of functions related to radio communication is specified.

In the UE 100 according to the sixth embodiment, the controller 130 selects a specific profile corresponding to a power saving mode from a plurality of profiles supported by the UE 100. The transmitter 120 transmits suggested profile information (suggested profile) indicating the selected specific profile to the eNB 200. Then, the receiver 110 receives the configuration information (Configuration) of the profile (selected profile) from the eNB 200. The controller 130 initially configures or changes the profile on the basis of the Configuration of the "selected profile."

In the sixth embodiment, the controller 130 selects a specific profile in accordance with a user input indicating an instruction to apply the power saving mode. For example, in a case in which the user interface 140 receives the user input indicating the instruction to apply the power saving mode, the specific profile corresponding to the power saving mode is selected. The controller 130 may cause the user interface 140 to execute a display for urging the instruction to apply the power saving mode on the basis of the remaining battery level.

Alternatively, in a case in which the UE 100 is an in-vehicle terminal mounted on a vehicle, the controller 130 selects a specific profile in accordance with a state of the vehicle. For example, in a case in which an engine of a vehicle is stopped, the specific profile corresponding to the power saving mode is selected. Further, in a case in which the UE 100 is an in-vehicle terminal, the UE 100 may not include the user interface 140 and the battery 150.

In the sixth embodiment, the controller 130 selects a profile having the lowest power consumption among a plurality of profiles as the specific profile. Alternatively, the controller 130 may select a profile which is previously set as a profile for the power saving mode as the specific profile. Identification information indicating the power saving mode may be allocated to the profile for the power saving mode.

In the sixth embodiment, the transmitter 120 may transmit the identification information indicating the power saving mode to the eNB 200 together with the suggested profile information (suggested profile). For example, the transmitter 120 includes the identification information indicating the "power saving mode" in the "UL Indication" message including the "suggested profile." Further, the transmitter 120 may transmit information indicating urgency (priority). Alternatively, the transmitter 120 may transmit the information through a message (an application request message) that is more enforceable than the "UL Indication" message. The information or the message may indicate, for example, whether it is a request given from an upper layer (the NAS or the user). The eNB 200 is able to decide the applied profile (selected profile) in view of the communication state with the UE 100 and/or other UEs on the basis of the information or the message.

(Base Station)

Figure 18:
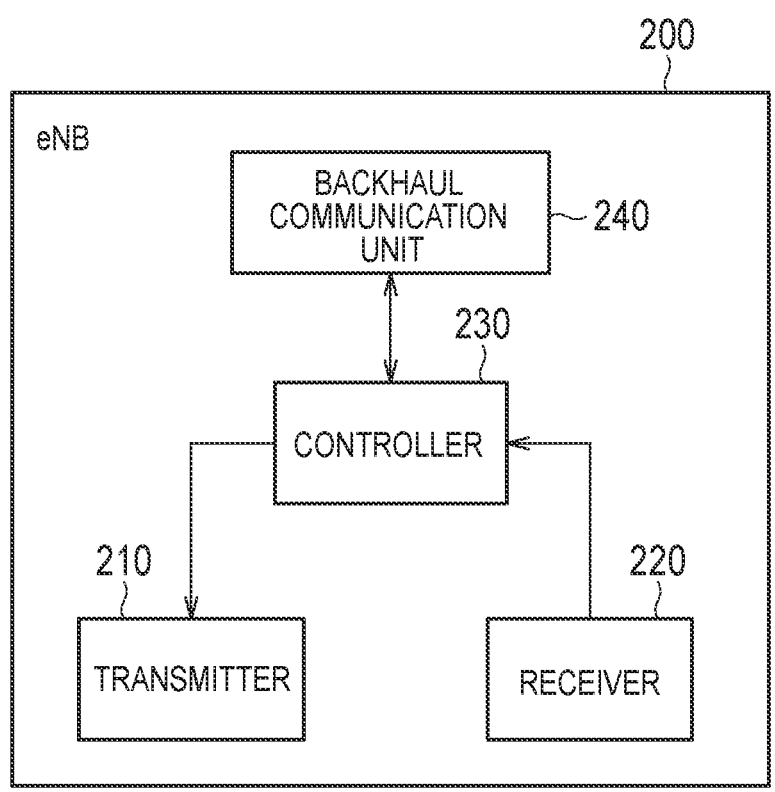
FIG. 18 is a block diagram of an eNB.

A configuration of the eNB 200 (base station) according to the sixth embodiment will be described below. FIG. 18 is a block diagram of the eNB 200. The eNB 200 includes a transmitter 210, a receiver 220, a controller 230, and a backhaul communication unit 240 as illustrated in FIG. 18.

The transmitter 210 performs various types of transmissions under the control of the controller 230. The transmitter 210 includes an antenna and a transmitting device. The transmitting device converts a baseband signal (transmission signal) output from the controller 230 into a radio signal and transmits the radio signal from the antenna.

The receiver 220 performs various types of receptions under the control of the controller 230. The receiver 220 includes an antenna and a receiving device. The receiving device converts a radio signal received by the antenna into a baseband signal (reception signal) and outputs the baseband signal to the controller 230.

The controller 230 performs various kinds of controls in the eNB 200. The controller 230 includes a processor (not illustrated) and a memory. The memory stores programs executed by the processor and information used for processes performed by the processor. The processor includes a DSP that performs modulation/demodulation, encoding/decoding, and the like of the baseband signal and a CPU that executes a program stored in the memory and performs various kinds of processes. The processor executes various kinds of processes and various kinds of communication protocols.

The backhaul communication unit 240 is connected to a neighbor eNB 200 via the X2 interface and connected to the MME/S-GW 300 via the S1 interface. The backhaul communication unit 240 is used for communication performed via the X2 interface, communication to be performed via the S1 interface, and the like.

In the eNB 200 having the above configuration, the receiver 220 receives the "UL Indication" message including the "suggested profile" from the UE 100. The controller 230 selects a profile to be configured in the UE 100 on the basis of "suggested profile." In a case in which the identification information indicating the power saving mode" is allocated to the "suggested profile," it is preferable that the controller 130 select the "suggested profile" as the profile to be configured in the UE 100. The transmitter 210 transmits the configuration information (Configuration) of the selected profile to the UE 100.

(Example of Operation Flow of Radio Terminal)

Figure 19:
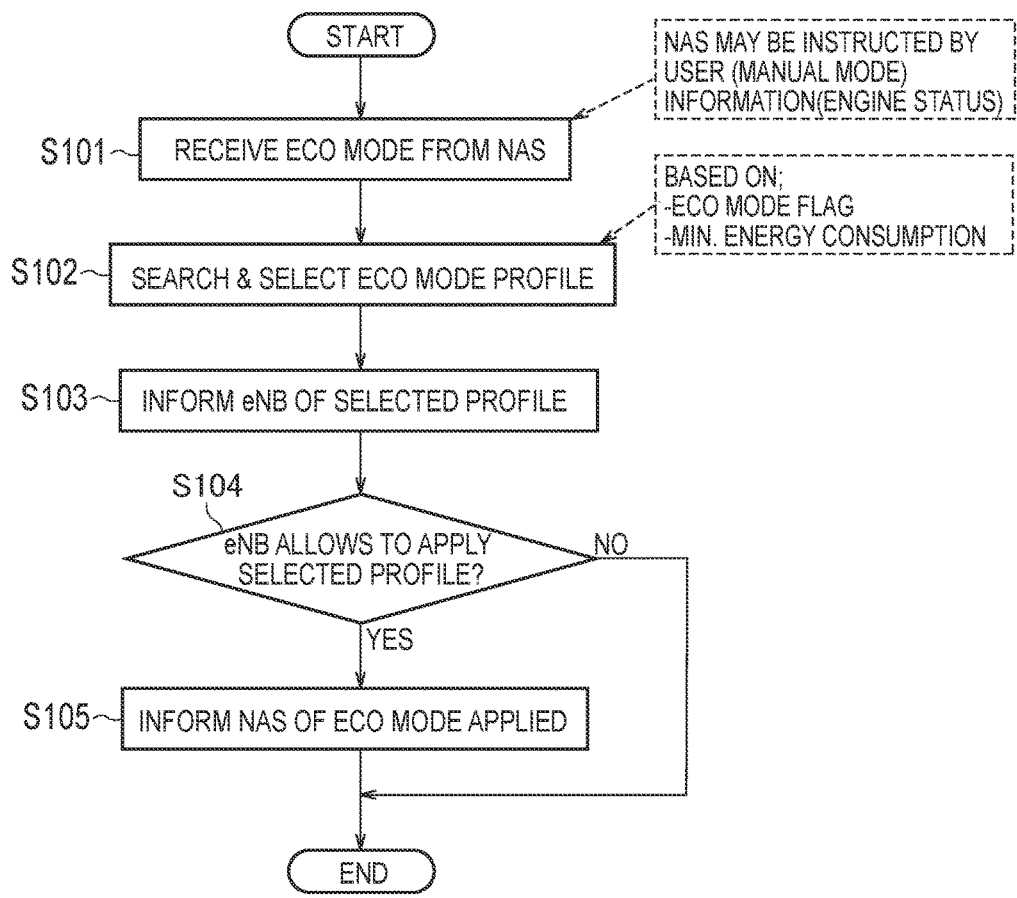
FIG. 19 is a diagram illustrating an example of an operation flow of a UE according to a sixth embodiment.

FIG. 19 is a diagram illustrating an example of an operation flow of the UE 100 according to the sixth embodiment. In the present operation flow, an operation centering an AS entity of the UE 100 is described. A function of the AS entity is executed by the controller 130.

As illustrated in FIG. 19, in step S101, the AS entity receives the instruction to apply the power saving mode (ECO mode) from, for example, the NAS entity. An instruction to apply the "ECO mode" is based on the user input, the state of the vehicle, or the like.

In step S102, the AS entity selects a specific profile corresponding to the "ECO mode." The specific profile corresponding to the "ECO mode" is a profile to which identification information (ECO mode flag) indicating the power saving mode is allocated. Alternatively, the specific profile corresponding to the "ECO mode" is a profile having the lowest power consumption among a plurality of profiles supported by the UE 100.

In step S103, the AS entity notifies the eNB 200 of the specific profile corresponding to the "ECO mode."

In a case in which a response (the RRC Connection Reconfiguration or the like) indicating that the specific profile corresponding to the "ECO mode" is applicable is received from the eNB 200 (Yes in step S104), in step S105, the AS entity gives a notification indicating that the "ECO mode" is applied to the NAS entity.

As described above, according to the sixth embodiment, it is possible to reduce the power consumption of the UE 100 using the profile.

Seventh Embodiment

The seventh embodiment will be described focusing on a difference with the sixth embodiment will.

(Radio Terminal)

The transmitter 120 of the UE 100 according to the seventh embodiment transmits battery information related to the remaining battery level to the eNB 200. The battery information may be a value indicating the remaining battery level or may be information indicating that the remaining battery level is below a threshold value.

(Base Station)

The receiver 220 of the eNB 200 according to the seventh embodiment receives the battery information related to the remaining battery level of the UE 100 from the UE 100. The controller 230 selects a profile to be configured in the UE 100 from a plurality of profiles supported by the UE 100 on the basis of the battery information. The controller 230 selects the specific profile corresponding to the power saving mode (ECO mode) as the profile to be configured in the UE 100 on the basis of the battery information. As described above, the specific profile corresponding to the "ECO mode" is a profile to which the identification information (ECO mode flag) indicating the power saving mode is allocated or a profile having the lowest power consumption among a plurality of profiles supported by the UE 100.

(Example of Operation Sequence)

Figure 20:
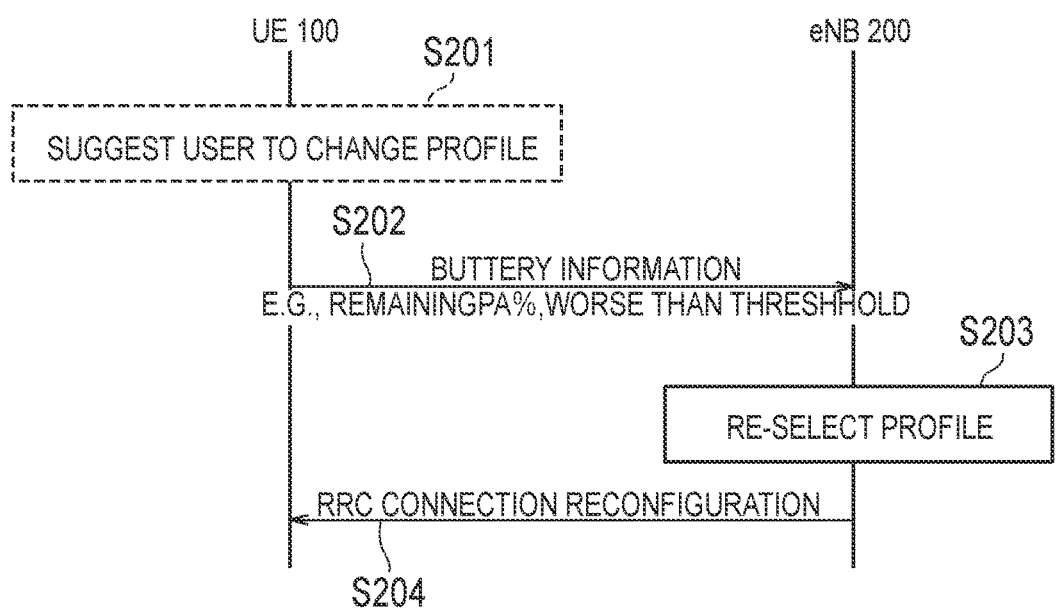
FIG. 20 is a diagram illustrating an example of an operation sequence according to a seventh embodiment.

FIG. 20 is a diagram illustrating an example of an operation sequence according to the seventh embodiment.

As illustrated in FIG. 20, in step S201, the UE 100 displays a message for urging the user to change the profile on the basis of the battery information. However, step S201 is not essential and may be omitted.

In step S202, the UE 100 transmits the battery information related to the remaining battery level to the eNB 200.

In step S203, the eNB 200 selects a profile to be configured in the UE 100 among a plurality of profiles supported by the UE 100 on the basis of the battery information. Here, the case in which the profile is changed is assumed, but the present sequence is applicable even when the profile is initially configured. In a case in which the profile initially configured, the battery information may be included in the "RRC Connection Setup Complete" message.

In step S204, the eNB 200 transmits the "RRC Connection Reconfiguration" message including the configuration information (Configuration) of the selected profile to the UE 100.

As described above, according to the seventh embodiment, it is possible to reduce the power consumption of the UE 100 using the profile.

Eighth Embodiment

The eighth embodiment will be described focusing on a difference with the sixth and seventh embodiments.

(Radio Terminal)

In the UE 100 according to the eighth embodiment, the controller 230 selects the "UE category" (terminal category) common to a plurality of profiles supported by the UE 100. The "UE category" is information indicating performance of the radio communication. The transmitter 120 transmits suggested category information (suggested category) indicating the common "UE category" to the eNB 200.

For example, the UE 100 is assumed to supports at least profiles #1 to #3. A profile #1 includes "UE category 10" and the "dual connectivity," a profile #2 includes "UE category 10" and NAICS, and a profile #3 includes the "dual connectivity" and NAICS. In this case, the controller 230 selects "UE category 10" which is the "UE category" common to the profile #1 and the profile #2. Then, the transmitter 120 transmits "UE category 10" to the eNB 200 as the "suggested category."

In a case in which there are a plurality of common "UE categories," the controller 130 may select a plurality of common "UE categories." In this case, the transmitter 120 transmits a list (suggested category list) including a plurality of common "UE categories" as the suggested category information. Further, the transmitter 120 may further transmit information which can be referred to when the eNB 200 selects the profile to the eNB 200. For example, the information is a type of application being executed in the UE 100 (the controller 130), a quality of service (QoS), the load state or the processing performance of the UE 100 (the controller 130), or the like.

Alternatively, in a case in which there are a plurality of common "UE categories," the controller 130 may select one "UE category" among a plurality of common "UE categories." For example, one "UE category" is selected on the basis of the type of application being executed in the UE 100 (the controller 130), the QoS (Quality of Service), or the like. In this case, the transmitter 120 transmits the selected one "UE category" to the eNB 200 as the "suggested category."

(Base Station)

In the eNB 200 according to the eighth embodiment, the receiver 220 receives the suggested category information (suggested category) indicating the "UE category" common to a plurality of profiles supported by the UE 100 from the UE 100. The controller 230 selects a profile to be configured in the UE 100 among a plurality of profiles including the common "UE category" on the basis of the "suggested category." In the above example, since the "suggested category" is "UE category 10," the controller 230 selects the profile to be configured in the UE 100 from the profiles #1 and #2 including "UE category 10."

Alternatively, the receiver 220 may receive the list (suggested category list) including a plurality of common "UE categories" as the suggested category information. The controller 230 selects a profile to be configured in the UE 100 among a plurality of profiles including any of a plurality of common "UE categories" on the basis of the "suggested category list."

(Example of Operation Sequence)

Figure 21A:
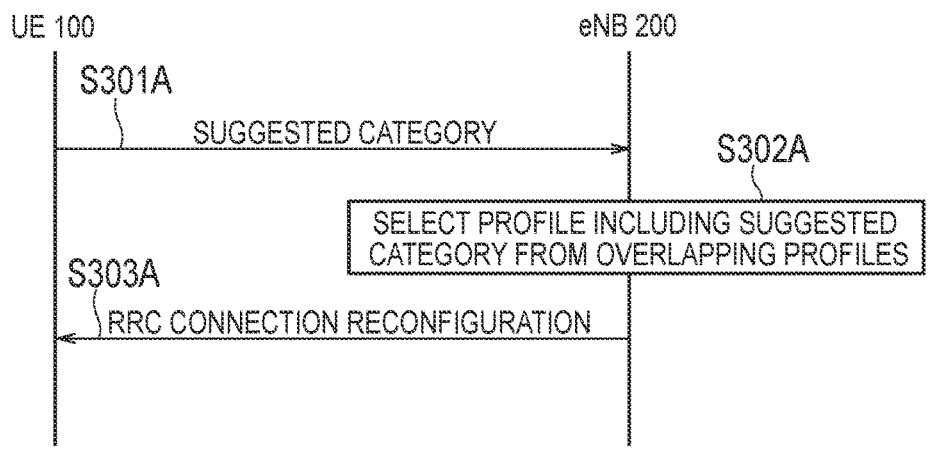
FIGS. 21A and 21B are diagrams illustrating an example of an operation sequence according to an eighth embodiment.
Figure 21B:
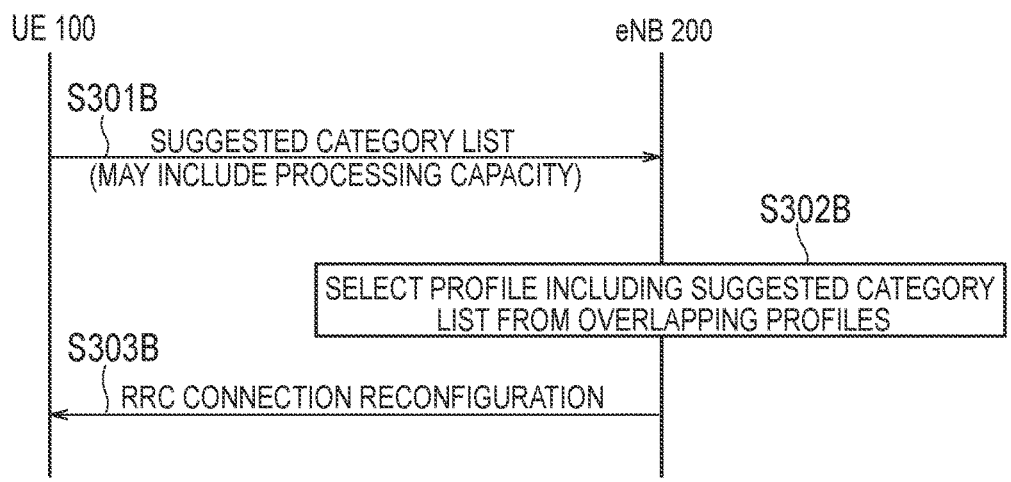

FIGS. 21A and 21B are diagrams illustrating an example of an operation sequence according to the eighth embodiment. FIG. 21A illustrates a pattern 1 of an operation sequence according to the eighth embodiment.

As illustrated in FIG. 21A, in step S301A, the UE 100 transmits the "suggested category" to the eNB 200.

In step S302A, the eNB 200 selects a profile to be configured in the UE 100 on the basis of the "suggested category."

In step S303A, the eNB 200 transmits the "RRC Connection Reconfiguration" message including the configuration information (Configuration) of the selected profile to the UE 100. The UE 100 initially configures or changes the profile on the basis of the Configuration of the "selected profile."

FIG. 21B illustrates a pattern 2 of the operation sequence according to the eighth embodiment.

In step S301B, the UE 100 transmits the "suggested category list" to the eNB 200.

In step S302B, the eNB 200 selects a profile to be configured in the UE 100 on the basis of the "suggested category list."

In step S303B, the eNB 200 transmits the "RRC Connection Reconfiguration" message including the configuration information (Configuration) of the selected profile to the UE 100. The UE 100 initially configures or changes the profile on the basis of the Configuration of the "selected profile."

As described above, the UE 100 transmits the "UE category" common to a plurality of profiles supported by the UE 100 to the eNB 200 as the suggested category information. It is difficult to select the individual function such as the "dual connectivity" or NAICS in the UE 100, whereas it is relatively easy to select desired radio communication performance (UE category). Therefore, it is possible to smoothly select the profile in the UE 100 by transmitting the "UE category" common to a plurality of profiles to the eNB 200 as the suggested category information. Further, it is possible to increase a degree of freedom of selection on the eNB 200 side.

Ninth Embodiment

The ninth embodiment will be described focusing with differences with the sixth to eighth embodiments. In the ninth embodiment, dual connectivity communication (dual connectivity) in which the UE 100 establishes connection with two eNBs 200 is performed.

(Dual Connectivity)

In the "dual connectivity," only a master eNB (MeNB) among a plurality of eNBs 200 establishing a connection with the UE 100 establishes the RRC connection with the UE 100. On the other hand, a secondary eNB (SeNB) among a plurality of eNBs 200 does not establish the RRC connection with the UE 100 but provides additional radio resources to the UE 100. In other words, the MeNB establishes a control plane connection with the UE 100 in addition to user plane connection. On the other hand, the SeNB establishes the user plane connection with the UE 100 without establishing the control plane connection with the UE 100. The X2 interface is used for communication between the MeNB and the SeNB.

The UE 100 is able to perform carrier aggregation in which N cells which are managed by the MeNB and M cells which are managed by the SeNB are used at the same time. A maximum of the number of serving cells of the UE 100, that is, a maximum number of (N+M) is, for example, 5. A group composed of N cells which are managed by the MeNB is referred to as a master cell group (MCG). Further, a group composed of M cells which are managed by the SeNB is referred to as a secondary cell group (SCG).

(Base Station)

In the eNB 200 according to the ninth embodiment, in a case in which the UE 100 performs the "dual connectivity" of establishing a connection with its own eNB 200 and another eNB 200, the controller 230 notifies another eNB 200 of one or more profiles to be set in the UE 100. In the ninth embodiment, its own eNB 200 is the MeNB, and another eNB 200 is the SeNB.

Specifically, the receiver 220 receives a plurality of profile groups from the UE 100. Each of a plurality of profile groups includes a plurality of profiles. In the case in which the "dual connectivity" is performed, the controller 230 selects a profile group to be configured in the UE 100 among a plurality of profile groups and notifies another eNB 200 (SeNB) of some profiles included in the selected profile group. In the selected profile group, some profiles which are reported to another eNB 200 (SeNB) are used by another eNB 200 (SeNB).

(Radio Terminal)

In the UE 100 according to the ninth embodiment, in a case in which its own UE 100 performs the "dual connectivity" of establishing a connection with a first eNB 200 (MeNB) and a second eNB 200 (SeNB), the controller 130 notifies the first eNB 200 (MeNB) of a plurality of profile groups.

(Example of Operation Sequence)

FIG. 22 is a diagram illustrating an example of an operation sequence according to the ninth embodiment.

As illustrated in FIG. 22, in step S401, an MeNB 200-1 transmits a profile inquiry about the "dual connectivity" to the UE 100.

In step S402, the UE 100 transmits a list (profile combination list) including a plurality of profile groups to the MeNB 200-1 in response to reception of the "profile inquiry." In the example of FIG. 22, the "profile combination list" includes a first profile group including the "profile 1" and the "profile 2" and a second profile group including the "profile 2" and the "profile 3."

In step S403, the MeNB 200-1 selects one profile group (profile combination) in the "profile combination list." Further, the MeNB 200-1 decides to cause an SeNB 200-2 to execute some profiles included in the selected "profile combination," and decides that other profiles included in the selected "profile combination" are executed by its own eNB (MeNB 200-1). In other words, it is decided that the selected "profile combination" is divided into two and shared by the MeNB 200-1 and the SeNB 200-2.

In step S404, the MeNB 200-1 transmits an "SeNB Addition Request" message including some profiles included in the selected "profile combination" to the SeNB 200-2. The "SeNB Addition Request" message is a message for requesting the SeNB 200-2 to allocate resources to the UE 100.

In step S405, the SeNB 200-2 transmits an "SeNB Addition Request Ack" message to the MeNB 200-1 in response to reception of the "SeNB Addition Request" message.

Further, the SeNB 200-2 uses the profiles included in the "SeNB Addition Request" message for communication with the UE 100.

In step S406, the MeNB 200-1 transmits the "RRC Connection Reconfiguration" message including the configuration information (Configuration) of the "profile combination" selected in step S403 to the UE 100 in response to reception of the "SeNB Addition Request Ack" message. The UE 100 communicates with the MeNB 200-1 and the SeNB 200-2 using the "profile combination" on the basis of the Configuration.

In the present sequence, an "SeNB Modification Request" message may be used instead of the "SeNB Addition Request" message, and an "SeNB Addition Modification Ack" message may be used instead of the "SeNB Addition Request Ack." The "SeNB Modification Request" message is a message for requesting the SeNB 200-2 to change a resource configuration for the UE 100.

As described above, according to the ninth embodiment, it is possible to implement the "dual connectivity" in which different profiles are used in the MeNB 200-1 and the SeNB 200-2.

Modified Example of Ninth Embodiment

In a modified example of the ninth embodiment, in the case in which the "dual connectivity" is performed, the controller 230 of the eNB 200 (the MeNB 200-1) selects a profile to be configured in the UE 100 among a plurality of profiles supported by the UE 100 and notifies another eNB 200 (the SeNB 200-2) of some functions (features) included in the selected profile.

FIG. 23 is a diagram illustrating an example of an operation sequence according to the modified example of the ninth embodiment.

As illustrated in FIG. 23, in step S451, the MeNB 200-1 detects a plurality of profiles (multiple profiles) supported by the UE 100. The MeNB 200-1 selects a profile to be configured in the UE 100 among a plurality of profiles supported by the UE 100.

In step S452, the MeNB 200-1 decides to cause another eNB (the SeNB 200-2) to execute some functions included in the selected profile, and decides that its own eNB (the MeNB 200-1) executes other functions included in the "selected profile." In other words, it is decided that the "selected profile" is split into two and shared to the MeNB 200-1 and the SeNB 200-2.

In step S453, the MeNB 200-1 transmits the "SeNB Addition Request" message including some functions included in the "selected profile" to the SeNB 200-2.

In step S454, the SeNB 200-2 transmits the "SeNB Addition Request Ack" message to the MeNB 200-1 in response to reception of the "SeNB Addition Request" message. Further, the SeNB 200-2 uses the functions included in the "SeNB Addition Request" message for communication with the UE 100.

In step S455, the MeNB 200-1 transmits the "RRC Connection Reconfiguration" message including the configuration information (Configuration) of the "selected profile" to the UE 100 in response to reception of the "SeNB Addition Request Ack" message. The UE 100 communicates with the MeNB 200-1 and the SeNB 200-2 using the "selected profile" on the basis of the Configuration.

In the present sequence, the "SeNB Modification Request" message may be used instead of the "SeNB Addition Request" message, and the "SeNB Addition Modification Ack" message may be used instead of the "SeNB Addition Request Ack." The "SeNB Modification Request" message is a message for requesting the SeNB 200-2 to change the resource configuration for the UE 100.

As described above, according to the ninth embodiment, it is possible to implement the "dual connectivity" in which different functions (features) are used in the MeNB 200-1 and SeNB 200-2.

Tenth Embodiment

The tenth embodiment will be described focusing on a difference with the sixth to ninth embodiments. The tenth embodiment relates to a profile expression format.

(Radio Terminal)

In the UE 100 according to the tenth embodiment, the transmitter 120 transmits function information indicating all the functions supported by the UE 100 and the profile information indicating the profile supported by the UE 100 to the eNB 200. The profile information includes only functions which are not included in the profile among all the functions supported by the UE 100.

For example, the function information (UE-EUTRA-Capability) indicating all the functions supported by the own UE 100 is assumed to include functions A, B, C, D, E, F, and G The profile #1 is assumed to include the functions A, B, C, and D, and the profile #2 is assumed to include the functions B, E, F, and G In this case, the profile information indicating the profile #1 includes the functions E, F, and G which are not included in the profile #1 among all the functions supported by its own UE 100. Further, the profile information indicating the profile #2 includes the functions A, C, and D which are not included in the profile #2 among all the functions supported by its own UE 100.

It is possible to reduce an information amount of the profile information by give a notification indicating the profile from the UE 100 to the eNB 200 in this format. Particularly, it is useful in a case in which there are few unnecessary functions in each profile, and a large number of profiles are reported to the eNB 200 (for example, the initial profile acquisition sequence illustrated in FIG. 14).

(Base Station)

In the eNB 200 according to the tenth embodiment, the receiver 220 receives the function information (UE-EUTRA-Capability) indicating all the functions supported by the UE 100 and the profile information indicating the profile supported by the UE 100 from the UE 100. The profile information includes only functions which are not included in the profile among all the functions supported by the UE 100. The controller 230 specifies (the functions included in) the profile supported by the UE 100 on the basis of the "UE-EUTRA-Capability" and the profile information.

In the above example, since the profile information indicating the profile #1 includes the functions E, F, and G the controller 230 determines that the functions A, B, C, and D other than the functions E, F, and G in the "UE-EUTRA-Capability" are included in the profile #1. Further, since the profile information indicating the profile #2 includes the functions A, C, and D, the controller 230 determines that the functions B, E, F, and G other than the functions A, C, and D in the "UE-EUTRA-Capability" are included in the profile #2.

Eleventh Embodiment

The eleventh embodiment will be described focusing on a difference with the sixth to tenth embodiments. The eleventh embodiment relates to a profile expression format.

(Radio Terminal)

In the UE 100 according to the eleventh embodiment, the transmitter 120 transmits a plurality of pieces of profile information indicating a plurality of profiles supported by the UE 100 and function information indicating a function common to the plurality of profiles to the eNB 200. Each of the plurality of pieces of profile information includes a function different from the common function.

For example, the profile #1 is assumed to include the functions A, B, C, and D, and the profile #2 is assumed to include the functions A, B, F, and G The functions A and B) are common to the profile #1 and the profile #2. The functions are referred to as "baseline capability."

In this case, the function information indicating the function common to a plurality of profiles includes the functions A and B. The profile information indicating the profile #1 includes the functions C and D which are not included in the "baseline capability." Further, the profile information indicating the profile #2 includes the functions F and G which are not included in the "baseline capability."

It is possible to reduce the information amount of the profile information by giving a notification indicating the profile from the UE 100 to the eNB 200 in this format.

(Base Station)

In the eNB 200 according to the eleventh embodiment, the receiver 220 receives a plurality of pieces of profile information indicating a plurality of profiles supported by the UE 100 and the function information indicating a function common to the plurality of profiles from the UE 100. Each of the plurality of profile information includes a function different from the common function.

In the above example, the function information indicating the "baseline capability" includes the functions A and B. The profile information indicating the profile #1 includes the functions C and D which are not included in the "baseline capability." Further, the profile information indicating the profile #2 includes the functions F and G which are not included in the "baseline capability." In this case, the controller 230 determines that A, B, C, and D obtained by combining the functions A and B and the functions C and D are included in the profile #1. Further, A, B, F, and G obtained by combining the functions A and B and the functions F and G are included in the profile #2.

Other Modified Examples

In the ninth embodiment, the operation in the "dual connectivity" has been described, but the operation may be applied to the "Carrier aggregation." For example, in a case in which the functions (features) which can be supported differs according to each component carrier (CC) (frequency), it is possible to cause the function to differ according to each CC. For example, it is useful in a case in which NAICS is possible at 800 MHz, but NAICS is not applicable at 3.5 GHz (however, the "dual connectivity" is applicable).

Overview of Twelfth to Fourteenth Embodiments

If it is possible to change the profile without any restriction, communication is likely to be adversely affected.

In this regard, it is an object of twelfth to fourteenth embodiments to provide a radio terminal and a base station which are capable of reducing adverse influence caused by a profile change.

A radio terminal according to a twelfth embodiment is used in a mobile communication system in which a plurality of profiles are specified, each of the profile including a plurality of functions related to radio communication. The radio terminal includes: a transmitter configured to transmit a profile change request for changing a profile to a profile selected by the radio terminal, to a base station; and a controller configured to maintain a prohibition state in which transmission of the profile change request is prohibited until a predetermined condition is satisfied, and release the prohibition state if the predetermined condition is satisfied.

In the twelfth embodiment, the predetermined condition is a condition that an elapsed time after last transmission of the profile change request exceeds a time threshold value.

In the twelfth embodiment, the time threshold value is designated by the base station.

In the modification of the twelfth embodiment, the predetermined condition is a condition that a load state of the radio terminal exceeds or falls below a load state threshold value.

In the modification of the twelfth embodiment, the load state threshold value is designated by the base station.

In the modification of the twelfth embodiment, the predetermined condition is a condition that a radio state of the radio terminal exceeds or falls below a radio state threshold value.

In the modification of the twelfth embodiment, the radio state threshold value is designated by the base station.

A base station according to a twelfth embodiment is used in a mobile communication system in which a plurality of profiles are specified, each of the profile including a plurality of functions related to radio communication. The base station includes: a transmitter configured to transmit a threshold value that defines a predetermined condition; and a receiver configured to receive a profile change request for changing a profile to a profile selected by the radio terminal, from the radio terminal. The predetermined condition is a condition for releasing prohibition state in which transmission of the profile change request is prohibited.

In the twelfth embodiment, the threshold value is a time threshold value. The predetermined condition is a condition that an elapsed time after last transmission of the profile change request exceeds the time threshold value.

In the first modification of the twelfth embodiment, the threshold value is a load state threshold value. The predetermined condition is a condition that a load state of the radio terminal exceeds or falls below the load state threshold value.

In the second modification of the twelfth embodiment, the threshold value is a radio state threshold value. The predetermined condition is a condition that a radio state of the radio terminal exceeds or falls below the radio state threshold value.

A radio terminal according to a thirteenth embodiment is used in a mobile communication system in which a plurality of profiles are specified, each of the profile including a plurality of functions related to radio communication. The radio terminal includes: a communication unit configured to, in a case in which a first profile is configured, transmit a change request for changing a profile to a second profile, to a base station, or receive a change request for changing a profile to the second profile, from the base station; and a controller configured to change the profile to the second profile at a second timing after a specified time elapses from a first timing at which the change request is transmitted or received.

In the thirteenth embodiment, the controller is configured to perform a necessary process to change the profile to the second profile within the specified time from the first timing.

In the thirteenth embodiment, the necessary process is a parameter change of changing a parameter to a configuration parameter of the second profile. The controller is configured to change the parameter to the configuration parameter of the second profile even when there is no notification indicating the parameter change from the base station.

In the thirteenth embodiment, the controller is configured to stop transmission and reception of data with the base station until the specified time elapses from the first timing.

A base station according to the thirteenth embodiment is used in a mobile communication system in which a plurality of profiles are specified, each of the profile including a plurality of functions related to radio communication. The base station includes: a communication unit configured to transmit a change request for changing a profile to a second profile, to a radio terminal in which a first profile is configured, or receive a change request for changing a profile to the second profile, from the radio terminal; and a controller configured to change the profile to the second profile at a second timing after a specified time elapses from a first timing at which the change request is transmitted or received.

In the thirteenth embodiment, the controller is configured to perform a necessary process to change the profile to the second profile within the specified time from the first timing.

In the thirteenth embodiment, the necessary process is a parameter change of changing a parameter to a configuration parameter of the second profile. The controller is configured to change the parameter to the configuration parameter of the second profile without notifying the radio terminal of the parameter change.

In the thirteenth embodiment, the controller is configured to stop transmission and reception of data with the radio terminal until the specified time elapses from the first timing.

A radio terminal according to the modification of the thirteenth embodiment is used in a mobile communication system in which a plurality of profiles are specified, each of the profile including a plurality of functions related to radio communication. The radio terminal includes: a communication unit configured to, in a case in which a first profile is configured, transmit a response to a change request for changing a profile to a second profile, to a base station, or receive a response to a change request for changing a profile to the second profile, from the base station; and a controller configured to change the profile to the second profile at a second timing after a specified time elapses from a first timing at which the response is transmitted or received.

In the modification of the thirteenth embodiment, the controller is configured to perform a necessary process to change the profile to the second profile within the specified time from the first timing.

In the modification of the thirteenth embodiment, the controller is configured to stop transmission and reception of data with the base station until the specified time elapses from the first timing.

A base station according to the modification of the thirteenth embodiment is used in a mobile communication system in which a plurality of profiles are specified, each of the profile including a plurality of functions related to radio communication. The base station includes: a communication unit configured to transmit a response to a change request for changing a profile to a second profile, to a radio terminal in which a first profile is configured, or receive a response to a change request for changing a profile to the second profile, from the radio terminal; and a controller configured to change the profile to the second profile at a second timing after a specified time elapses from a first timing at which the response is transmitted or received.

In the modification of the thirteenth embodiment, the controller is configured to perform a necessary process to change the profile to the second profile within the specified time from the first timing.

In the modification of the thirteenth embodiment, the controller is configured to stop transmission and reception of data with the radio terminal until the specified time elapses from the first timing.

A radio terminal according to a fourteenth embodiment is used in a mobile communication system in which a plurality of profiles are specified, each of the profile including a plurality of functions related to radio communication. The radio terminal includes: a controller configured to select a second profile different from a first profile in a case in which the first profile is configured; and a transmitter configured to transmit a profile change request for changing a profile to the second profile, to a base station. The controller is configured to select the second profile so that at least some communication states are maintained on the basis of the first profile.

In the fourteenth embodiment, the first profile includes a support frequency band to which a primary cell of the radio terminal belongs. The controller is configured to select a profile including the support frequency band to which the primary cell of the radio terminal belongs as the second profile.

In the modification of the fourteenth embodiment, the first profile includes a first terminal category having a predetermined buffer size. The controller is configured to select a profile including a terminal category having a buffer size equal to or larger than the predetermined buffer size as the second profile.

Twelfth Embodiment (Multiple Profiles UE Capability)

The UE 100 supports a plurality of functions related to radio communication. The functions related to the radio communication refer to functions specified in a specification such as the "dual connectivity," device to device (D2D), and Network-Assisted interference Cancellation and Suppression (NAICS). The functions related to the radio communication may include "UE category." Further, the functions related to the radio communication may include "Support Band Combination." Hereinafter, the functions related to the radio communication are referred to appropriately as "features."

In the twelfth embodiment, in order to use the processing performance of the UE 100 maximally, it is assumed that a combination of functions that are able to be executed practically at the same time is specified as a "profile" in a specification, and a function to be executed by the UE 100 is able to be switched flexibly. For example, a profile #1 is configured with a combination of "Category 6" and NAICS, a profile #2 is configured with a combination of "Category 7" and the "dual connectivity," and a profile #3 is configured with a combination of "Category 10" and D2D.

In a case in which the eNB 200 has an option of selecting the profile to be configured in the UE 100, the UE 100 notifies the network (the eNB 200 or the MME 300) of a plurality of profiles (multiple profiles UE capability) supported by the UE 100, and the network manages the "multiple profiles UE capability." The eNB 200 selects one profile from the "multiple profiles UE capability." Then, the eNB 200 transmits the configuration information (configuration) of the selected profile to the UE 100 through an individual RRC message or the like.

Alternatively, in a case in which the UE 100 has an option of selecting a profile to be configured in the UE 100, the UE 100 selects one profile from the "multiple profiles UE capability." Then, the UE 100 recognizes the selected profile as the suggested profile and transmits a profile change request for changing the profile to the "suggested profile" to the eNB 200. Then, the eNB 200 transmits the configuration information (configuration) of the profile selected on the basis of the "suggested profile" to the UE 100 through an individual RRC message or the like. In the twelfth embodiment, the UE 100 is mainly assumed to have the option of selecting the profile.

Figure 24:
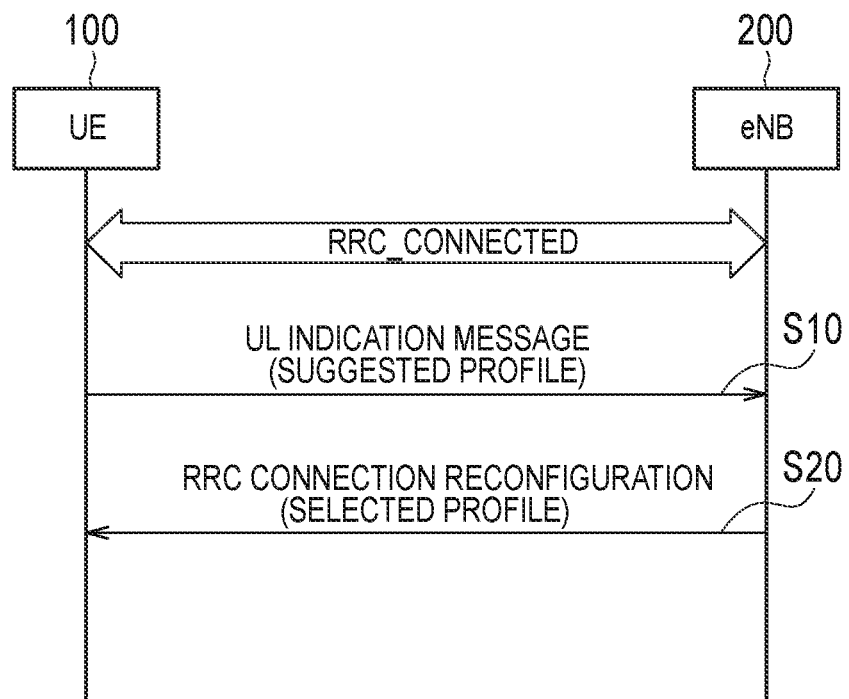
FIG. 24 is a diagram illustrating an example of an operation sequence related to a profile change during an RRC connection.

FIG. 24 is a diagram illustrating an example of an operation sequence related to the profile change during the RRC connection. In the initial state of FIG. 24, UE 100 is in connected mode.

As illustrated in FIG. 24, in step S10, the UE 100 recognizes the selected profile as the suggested profile and transmits the profile change request for changing the profile to the "suggested profile" to the eNB 200. In FIG. 24, an "UL Indication message" including the "suggested profile" corresponds to the profile change request.

In step S20, the eNB 200 transmits the configuration information (configuration) of the profile (selected profile) selected on the basis of the "suggested profile" to the UE 100 through the "RRC Connection Reconfiguration" message. The UE 100 changes the profile on the basis of the "selected profile" configuration.

(Radio Terminal)

Figure 25:
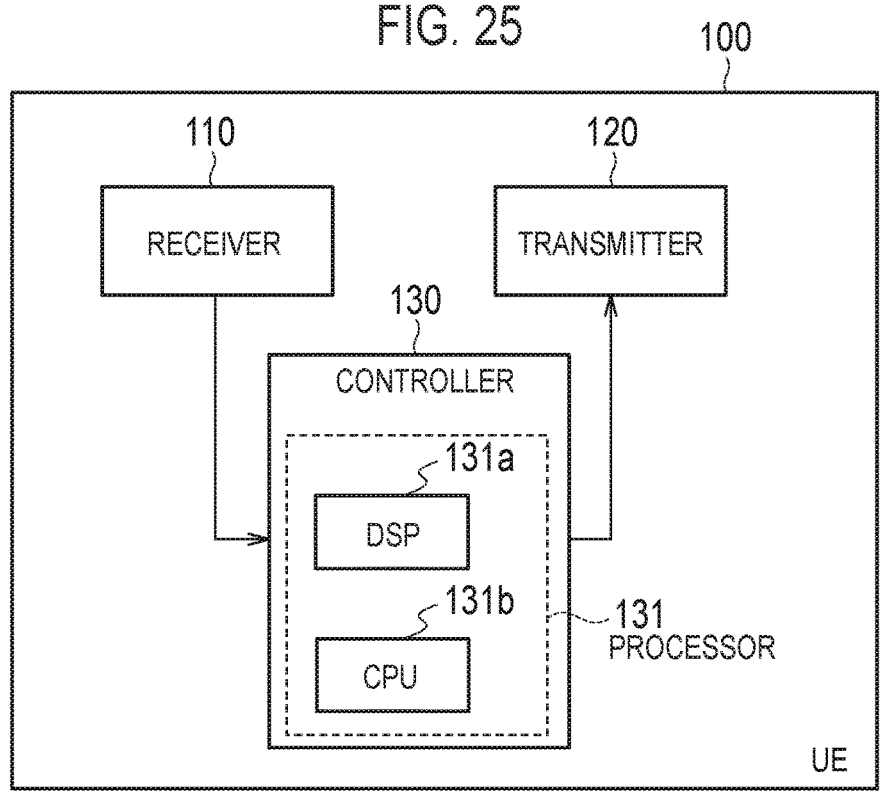
FIG. 25 is a block diagram of a UE.

The UE 100 (radio terminal) according to the twelfth embodiment will be described below. FIG. 25 is a block diagram of the UE 100. As illustrated in FIG. 25, the UE 100 includes a receiver 110, a transmitter 120, and a controller 130.

The receiver 110 performs various types of receptions under the control of the controller 130. The receiver 110 includes an antenna and a receiving device. The receiving device converts a radio signal received through the antenna into a baseband signal (reception signal) and outputs the baseband signal to the controller 130.

The transmitter 120 performs various kinds of transmissions under the control of the controller 130. The transmitter 120 includes an antenna and a transmitting device. The transmitting device converts a baseband signal (transmission signal) output from the controller 130 into a radio signal and transmits the radio signal through the antenna.

The controller 130 performs various kinds of controls in the UE 100. The controller 130 includes a processor 131. The controller 130 further includes a memory (not illustrated). The processor 131 includes a digital signal processor (DSP) 131*a* that perform modulation/demodulation, encoding/decoding, and the like of the baseband signal and a central processing unit (CPU) 131*b* that executes a program stored in the memory and performs various kinds of processes. The processor 131 may further include a codec that encodes and decodes audio/video signals. The controller 130 executes various kinds of processes and various kinds of communication protocols.

In the twelfth embodiment, the transmitter 120 transmits the profile change request for changing the profile to the profile (Suggested profile) selected by the UE 100 to the eNB 200. The controller 130 selects the "suggested profile" among a plurality of profiles (multiple profiles UE capability) supported by the UE 100.

The controller 130 maintains the prohibition state in which the transmission of the profile change request is prohibited until a predetermined condition is satisfied, and releases the prohibition state if the predetermined condition is satisfied. In the twelfth embodiment, the predetermined condition is a condition that an elapsed time after the last transmission of the profile change request exceeds a time threshold value.

If the UE 100 is able to transmit the profile change request frequently, the processing load of the network increases and a consumption amount of the radio resources increases. Therefore, the controller 130 maintains the prohibition state in which the transmission of the profile change request is prohibited until the elapsed time after the last transmission of the profile change request exceeds the time threshold value. Then, the controller 130 releases the prohibition state if the elapsed time since the last transmission of the profile change request exceeds the time threshold value. Therefore, it is possible to temporally limit the transmission of the profile change request and prohibit the frequent transmission of the profile change request.

In the twelfth embodiment, the time threshold value is designated by the eNB 200. However, the time threshold value may be set in the UE 100 in advance. The receiver 110 receives the information indicating the time threshold value from the eNB 200. The information indicating the time threshold value may be cell-specific information which is transmitted from the eNB 200 through a broadcast RRC message (for example, a "System Information Block") or may be UE-specific information which is transmitted from the eNB 200 through an individual RRC message. The controller 130 sets the time threshold value on the basis of the information received from the eNB 200. In the following description, the time threshold value is assumed to be a specified timer value set in the UE 100.

The controller 130 counts the elapsed time after the transmission of the profile change request with a timer and determines whether or not the elapsed time reaches a specified timer value.

In a case in which the handover is performed, the controller 130 may not reset the timer. In other words, the controller 130 may continuously count the elapsed time before and after handover.

Alternatively, the controller 130 may reset the timer in a case in which the handover is performed. For example, the controller 130 may end the counting of the elapsed time in a case in which the profile is changed (initially configured) at the time of the handover.

(Base Station)

Figure 26:
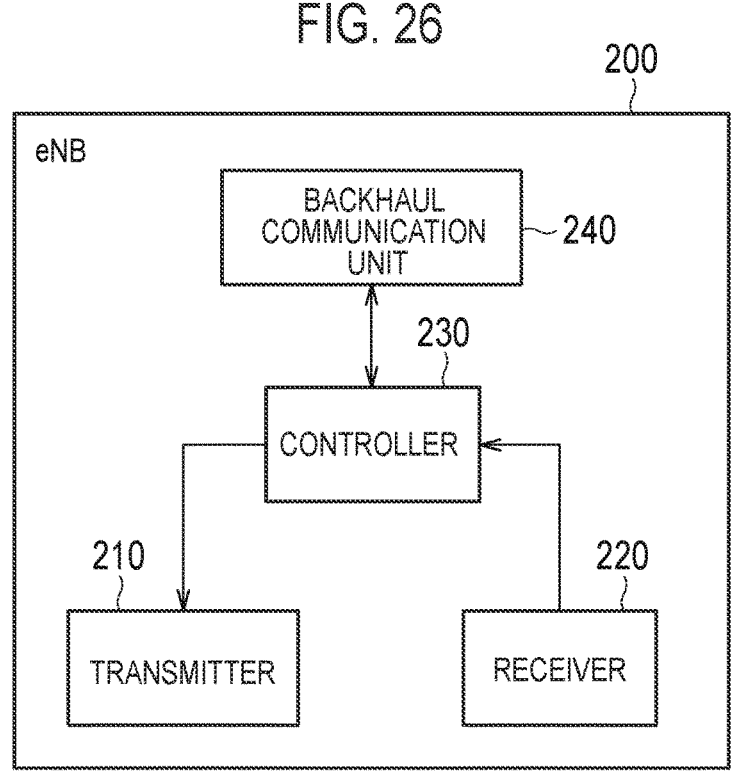
FIG. 26 is a block diagram of an eNB.

A configuration of the eNB 200 (base station) according to the twelfth embodiment will be described below. FIG. 26 is a block diagram of the eNB 200. The eNB 200 includes a transmitter 210, a receiver 220, a controller 230, and a backhaul communication unit 240 as illustrated in FIG. 26.

The transmitter 210 performs various types of transmissions under the control of the controller 230. The transmitter 210 includes an antenna and a transmitting device. The transmitting device converts a baseband signal (transmission signal) output from the controller 230 into a radio signal and transmits the radio signal from the antenna.

The receiver 220 performs various types of receptions under the control of the controller 230. The receiver 220 includes an antenna and a receiving device. The receiving device converts a radio signal received by the antenna into a baseband signal (reception signal) and outputs the baseband signal to the controller 230.

The controller 230 performs various kinds of controls in the eNB 200. The controller 230 includes a processor (not illustrated) and a memory. The memory stores programs executed by the processor and information used for processes performed by the processor. The processor includes a DSP that performs modulation/demodulation, encoding/decoding, and the like of the baseband signal and a CPU that executes a program stored in the memory and performs various kinds of processes. The processor executes various kinds of processes and various kinds of communication protocols.

The backhaul communication unit 240 is connected to a neighbor eNB 200 via the X2 interface and connected to the MME/S-GW 300 via the S1 interface. The backhaul communication unit 240 is used for communication performed via the X2 interface, communication to be performed via the S1 interface, and the like.

In the twelfth embodiment, the transmitter 210 transmits a threshold value (time threshold value) for setting a predetermined condition to the UE 100. As described above, the predetermined condition is a condition for releasing the prohibition state in which the transmission of the profile change request is prohibited in the UE 100. Specifically, the predetermined condition is a condition that the elapsed time after the last transmission of the profile change request exceeds the time threshold value.

The receiver 220 receives the profile change request for changing the profile to the "suggested profile" from the UE 100. The controller 230 decides the profile to be configured in the UE 100 on the basis of the "suggested profile." The transmitter 210 transmits the configuration information (configuration) related to the decided profile to the UE 100 through an individual RRC message or the like.

The controller 230 may notify the target eNB of the "suggested profile" of the UE 100 through the backhaul communication unit 240 during the handover of the UE 100. Further, the controller 230 may notify the target eNB of the time threshold value (specified timer value) set in the UE 100 through the backhaul communication unit 240 during the handover of the UE 100. Accordingly, the target eNB is able to perform an appropriate setting in the UE 100 from its own eNB.

(Operation Flow of Radio Terminal)

Next, an operation flow of the UE 100 (radio terminal) according to the twelfth embodiment will be described. FIG. 27 is a diagram illustrating the operation flow of the UE 100 (radio terminal) according to the twelfth embodiment.

As illustrated in FIG. 27, in step S101, the UE 100 selects the "suggested profile" and transmits the "suggested profile" to the eNB 200.

In step S102, when the "suggested profile" is transmitted, the UE 100 starts (activates) a "prohibit timer." The above-mentioned specified timer value is set in the "prohibit timer." The "prohibit timer" is a timer that counts the elapsed time after the "suggested profile" is transmitted.

In step S103, the UE 100 reselects the "suggested profile."

In step S104, the UE 100 checks whether or not the "prohibit timer" expires.

In a case in which the "prohibit timer" expires (Yes in step S104), in step S105, the UE 100 transmits the reselected "suggested profile" to the eNB 200.

Modified Example of Twelfth Example

In the twelfth embodiment, the UE 100 maintains the prohibition state in which the transmission of the profile change request is prohibited until the predetermined condition is satisfied, and releases the prohibition state if the predetermined condition is satisfied. Here, the predetermined condition is a condition that the elapsed time after the last transmission of the profile change request exceeds the time threshold value.

In the present modified example, the predetermined condition is a condition that the load state of the UE 100 exceeds or falls below a load state threshold value. In other words, the UE 100 maintains the prohibition state in which the transmission of the profile change request is prohibited until the load state of the UE 100 exceeds or falls below the load state threshold value, and releases the prohibition state if the load state of the UE 100 exceeds or falls below the load state threshold value. The load state threshold value is designated by the eNB 200. A method of dealing with the threshold value is similar to that in the twelfth embodiment. In the modified example, a profile is assumed to be changed to a profile having a low load (low performance) if the load state of the UE 100 increases. Alternatively, the profile is assumed to be changed to a profile having a high load (high performance) if the load state of the UE 100 decreases. For example, the load state of the UE 100 refers to the load state of the processor 131. The load state may be indicated by a percentage (proportion). For example, the load state is a percentage of the operation process resources (that is, the processing load) being used or a percentage of the operation process resources being used.

Alternatively, in the present modified example, the predetermined condition is a condition that the radio state of the UE 100 exceeds or falls below a radio state threshold value. In other words, the UE 100 maintains the prohibition state in which the transmission of the profile change request is prohibited until the radio state of the UE 100 exceeds or falls below the radio state threshold value, and releases the prohibition state if the radio state of the UE 100 exceeds or falls below the radio state threshold value. The radio state threshold value is specified by the eNB 200. A method of dealing with the threshold value is similar to that in the twelfth embodiment. In the modified example, a profile is assumed to be changed to a profile having a low load (low power consumption) if the radio state of the UE 100 is satisfactory. Alternatively, the profile is assumed to be changed to a profile having a high error tolerance if the radio state of the UE 100 gets worse. For example, the radio state of the UE 100 is reception power (RSRP) of a reference signal, a reception quality (RSRQ) of the reference signal, a data error rate, or the like.

A radio state threshold value compared with the radio state when the radio state of the UE 100 gets better may be differentiated from a radio state threshold value compared when the radio state of the UE 100 gets worse. It is possible to prevent a ping-pong phenomenon by giving a margin (hysteresis) between both threshold values. Similarly, the hysteresis may be given even to the radio state threshold value.

FIG. 28 is a diagram illustrating an operation sequence according to the modified example.

As illustrated in FIG. 28, in step S151, the eNB 200 transmits a "threshold configuration" which is configuration information of the threshold value (the load state threshold value and the load state threshold value) to the UE 100. The UE 100 sets the threshold value (the load state threshold value and the load state threshold value) in accordance with the "threshold configuration."

In step S152, the UE 100 detects that the state (the load state and the radio state) of its own UE 100 satisfies a threshold value (the load state threshold value and the load state threshold value) condition.

In step S153, the UE 100 selects the "suggested profile" according to the situation of the UE 100.

In step S154, the UE 100 transmits the selected "suggested profile" to the eNB 200.

According to the present modified example, it is possible to limit the condition that enables the profile change request to be transmitted and changes a profile to a profile optimum for the state of the UE 100 while prohibiting the frequent transmission of the profile change request.

Thirteenth Embodiment

The thirteenth example will be described focusing on a difference with the twelfth example. The thirteenth embodiment relates to limitation of a profile change timing.

(Radio Terminal)

A UE 100 (radio terminal) according to thirteenth embodiment will be described below. A block configuration of the UE 100 is similar to that of the twelfth embodiment.

In a case in which a first profile is configured, the transmitter 120 transmits a change request for changing the profile to a second profile to the eNB 200. Alternatively, in a case in which the first profile is configured, the receiver 110 receives the change request for changing the profile to the second profile from the eNB 200. In the thirteenth embodiment, the receiver 110 and the transmitter 120 constitute a communication unit.

The controller 130 changes a profile to the second profile at a second timing after a specified time elapses after a first timing at which the change request is transmitted or received. For example, the specified time is a time specified in a specification. Alternatively, the specified time may be designated from the eNB 200 to the UE 100 or from the UE 100 to the eNB 200. It is possible to match timings at which the UE 100 and the eNB 200 perform the profile change by introducing the specified time.

The controller 130 performs a necessary process to change a profile to the second profile within a specified time from the first timing. For example, the necessary process is a parameter change of changing a parameter to a configuration parameter of the second profile. The controller 130 changes the parameter to the configuration parameter of the second profile even although a notification of the parameter change is given from the eNB 200. Specifically, the necessary process (the process related to the configuration parameter change) is regarded as being performed in the eNB 200, and the parameter is changed to the configuration parameter of the second profile.

For example, in a case in which the number of set secondary cells is larger than the number of secondary cells allowed in the changed profile at a profile change timing (second timing) at which the number of secondary cells (configuration parameters) is reduced in the carrier aggregation, it is regarded as being changed to the number of secondary cells allowed in the changed profile. Alternatively, all the secondary cells are regarded as being released.

In this case, for example, packets being retransmitted are discarded, secondary cell monitoring is stopped, or PDCCH monitoring for cross-carrier scheduling for the secondary cells is stopped. The same applies in a case in which the "dual connectivity" is set at the profile change timing at which the "dual connectivity" is not allowed.

Alternatively, in a case in which all the secondary cells are released or in a case in which a setting in which there is a carrier indicator field (CIF) in the PDCCH is performed, it is changed to a setting in which there is no CIF. Specifically, it corresponds to changing it to false in a case in which "cif-Presence" in "CrossCarrierSchedulingConfig" is true. Alternatively, in a broader sense, it corresponds to discarding all settings in "Cross Carrier Scheduling Configuration." These operations may be performed with no re-notification of "CrossCarrierSchedulingConfig."

In a case in which some secondary cells are released, an "other-r10" setting of the released secondary cell in "Cross Carrier Scheduling Configuration" may be released, and the "other-r10" setting of the remaining secondary cell may be handed over without change. Accordingly, it is possible to operate with no notification of "CrossCarrierSchedulingConfig." In the case of an operation associated with addition of a new secondary cell, it is necessary to notify of "CrossCarrierSchedulingConfig" again.

Alternatively, the function related to this setting may be stopped (deactivated) in a state in which the configuration parameter is held. For example, in a case in which a changed profile does not designate the D2D function in a state in which a setting of D2D is performed, the UE 100 stops the D2D function in accordance with the profile but holds (does not discard) the setting. Thereafter, in a case in which the changed profile is received, and the D2D function is designated, it is possible to resume the D2D function using the held setting. With this control, it is possible to reduce an unnecessary signaling overhead.

The controller 130 may notify the eNB 200 of a mismatch between the configuration parameter of the first profile and the configuration parameter of the second profile. For example, the "RRC Connection Reestablishment Request" message is transmitted to the eNB 200, and information indicating "configuration mismatch with profile" is included in the Cause field.

Further, in the thirteenth embodiment, the controller 130 may stop transmission/reception of data with the eNB 200 (at least the secondary cell) until the specified time elapses from the first timing. In this case, only signaling for changing the configuration parameter may be transmitted and received.

(Base Station)

Next, the eNB 200 (base station) according to the thirteenth embodiment will be described. A block configuration of the eNB 200 is similar to that of the twelfth embodiment. Description of operations overlapping with the description of the UE 100 will be omitted.

The transmitter 210 transmits the change request for changing the profile to the second profile to the UE 100 in which the first profile is configured. Alternatively, the receiver 220 receives the change request for changing the profile to the second profile from the UE 100 in which the first profile is set.

The controller 230 changes the profile to the second profile at the second timing after the specified time elapses from the first timing at which the change request is transmitted or received.

The controller 230 performs a necessary process to change the profile to the second profile within the specified time from the first timing. For example, the necessary process is a parameter change of changing the parameter to the configuration parameter of the second profile. The controller 230 changes the parameter to the configuration parameter of the second profile without giving a notification the UE 100.

Further, in the thirteenth embodiment, the controller 230 may stop transmission/reception of data with the UE 100 at least in the secondary cell until the specified time elapses from the first timing. In this case, only signaling for changing the configuration parameter may be transmitted and received.

(Example of Operation Sequence)

Next, an example of an operation sequence according to the thirteenth embodiment will be described. FIG. 29 is a diagram illustrating an example of the operation sequence according to the thirteenth embodiment. In the initial state of the present sequence, the UE 100 and the eNB 200 perform communication according to the first profile.

As illustrated in FIG. 29, in step S300, the change request for changing the profile to the second profile is transmitted from the eNB 200 to the UE 100. Alternatively, the change request for changing the profile to the second profile is transmitted from the UE 100 to the eNB 200. The UE 100 and the eNB 200 start to count the specified time.

In step S301 (S301A and, S301B), the UE 100 and the eNB 200 stop transmission/reception of data.

In step S302 (5302A and 5302B), the UE 100 and the eNB 200 perform the necessary process for the profile change. For example, the UE 100 and the eNB 200 change the parameter to the configuration parameter of the second profile.

In step S303 (S303A and S303B), the UE 100 and the eNB 200 start communication (transmission/reception of data) according to the second profile at the timing at which the specified time elapses (expires).

Modified Example of Thirteenth Example

In the thirteenth embodiment, the timing for the profile change request is a timing at which the "specified time" starts (the first timing). However, in a case in which there is a response to the profile change request, the timing of the response may be set as the timing at which the specified time starts.

For example, the profile change request from the UE 100 to the eNB 200 is the "suggested profile" (UL Indication message), and the response from the eNB 200 to the UE 100 is the "selected profile" (RRC Connection Reconfiguration).

Alternatively, the profile change request from the eNB 200 to the UE 100 is the "selected profile" (RRC Connection Reconfiguration), and the response from the UE 100 to the eNB 200 is "RRC Connection Reconfiguration Complete."

The modified example of the thirteenth embodiment is basically similar to the thirteenth embodiment except that the timing of the response to the profile change request is the timing at which the specified time starts.

However, in the modified example of the thirteenth embodiment, since the notification of the parameter change is given from the eNB 200 to the UE 100, it is unnecessary to consider that the necessary process is performed on a counterpart side.

Fourteenth Embodiment

The fourteenth embodiment will be described focusing on a difference with the twelfth and thirteenth embodiments. The fourteenth embodiment relates to profile change content limitation.

Next, the UE 100 (radio terminal) according to the fourteenth embodiment will be described. A block configuration of the UE 100 is similar to that of the twelfth embodiment.

In a case in which the first profile is configured in the UE 100 according to the fourteenth embodiment, the controller 130 selects the second profile different from the first profile.

The transmitter 120 transmits the profile change request (suggested profile) for changing the profile to the second profile to the eNB 200.

On the basis of the first profile, the controller 130 selects the second profile so that at least some communication states are maintained. For example, when the first profile including the support frequency band (Support Band Combination) to which the primary cell of its own UE 100 belongs is configured, the controller 130 selects the profile including the support frequency band (Support Band Combination) to which the primary cell belongs as the second profile. In other words, the controller 130 is allowed to change the profile to only the profile including the support frequency band (Support Band Combination) to which the primary cell of its own UE 100 belongs.

The primary cell is not limited to a normal primary cell (PCell) but may be a primary secondary cell (PSCell) which is a primary cell of the SeNB in the "dual connectivity." The primary cell is an important cell having the PUCCH of the UE 100.

According to the fourteenth embodiment, although the profile is changed, since it is possible to maintain the primary cell before and after the profile change, it is possible to prevent communication interruption.

Modified Example of Fourteenth Embodiment

In the modified example of the fourteenth embodiment, the first profile includes a first terminal category (UE category) having a predetermined buffer size (soft buffer size). The controller 130 of the UE 100 selects a profile including the "UE category" having a "soft buffer size" equal to or larger than the predetermined "soft buffer size" as the second profile.

In a case in which the "UE category" is changed by the profile change, it is possible to change the profile while maintaining the HARQ context without change by changing so that the "soft buffer size" is not reduced.

In the case of a change in which the "soft buffer size" is reduced, the HARQ context is discarded (all data being retransmitted is discarded). Although the "soft buffer size" is reduced, it is possible to hold the context of HARQ unless the "soft buffer" is actually used up, but since it is required that there is no discrepancy in recognition between the eNB 200 and the UE 100 related to the state of the "soft buffer," it is necessary to separately exchange a state confirmation message between the B 200 and the UE 100.

There are the following two methods as a method of confirming whether or not it is possible to hold the HARQ context.

1) In a case in which the profile change is transmitted from the eNB 200 to the UE 100:

In a case in which the profile change request is transmitted from the eNB 200 to the UE 100 (only in the case in which all profile change requests or the "UE category" change are associated), the UE 100 notifies the eNB 200 of an index indicating whether or not it is possible to hold the context as a profile change response or a separate message.

Further, during a period until the profile change is applied actually after the profile change request is transmitted from the eNB 200 to the UE 100, DL communication from the eNB 200 to the UE 100 may be prohibited, or DL resource allocation of increasing a "Soft buffer" usage (for example, retransmission allocation of an in-use HARQ process or new allocation of an unused HARQ process) may be prohibited.

2) In a case in which the profile change request is transmitted from the UE 100 to the eNB 200:

In a case in which the profile change request is transmitted from the UE 100 to the eNB 200 (only in the case in which all profile change requests or the "UE category" change are associated), the UE 100 notifies the eNB 200 of an index indicating whether or not it is possible to hold the HARQ context after the profile change response is received from the eNB 200 or after a timing at which the profile change is applied.

Overview of Fifteenth and Sixteenth Embodiments

The radio terminal performs the handover when moving from one cell to another cell. However, in the technique using the profile described above, the mobility of the radio terminal is not considered, and thus the mobility control is unlikely to be able to be appropriately performed.

In this regard, it is an object of the fifteenth and sixteenth embodiments to provide a base station, a mobility management apparatus, and a radio terminal, which are capable of appropriately performing the mobility control in a case in which the profile is dealt with.

A base station according to fifteenth and sixteenth embodiments is used in a mobile communication system in which a plurality of profiles are specified, each of the profile including a plurality of functions related to radio communication. The base station includes: a controller configured to notify another base station of a profile supported by a radio terminal without going through a mobility management apparatus or via the mobility management apparatus in a case in which a handover of the radio terminal is performed from the base station to the another base station.

In the fifteenth embodiment, the controller is configured to notify the another base station of a profile which is supported by the radio terminal and is used for communication between the base station and the radio terminal.

In the fifteenth embodiment, the controller is configured to notify the another base station of all profiles supported by the radio terminal.

In the fifteenth embodiment, the controller is configured to acquire a profile to be used by the another base station for communication with the radio terminal from the another base station without going through the mobility management apparatus or via the mobility management apparatus, and notify the radio terminal of the acquired profile.

In the sixteenth embodiment, in a case in which the another base station is a non-profile-supported base station, the controller is configured to notify the another base station of functions included in the profile supported by the radio terminal.

In the sixteenth embodiment, the controller is configured to notify the another base station of functions included in a profile which is supported by the radio terminal and used for communication between the base station and the radio terminal.

A mobility management apparatus according to fifteenth and sixteenth embodiments is used in a mobile communication system in which a plurality of profiles are specified, each of the profile including a plurality of functions related to radio communication. The mobility management apparatus includes: a controller configured to notify a second base station of a profile supported by a radio terminal in a case in which a handover of the radio terminal is performed from a first base station to the second base station.

In the fifteenth embodiment, the controller is configured to notify the second base station of a profile which is supported by the radio terminal and notified from the first base station.

In the fifteenth embodiment, the controller is configured to notify the second base station of a profile which is supported by the radio terminal and used for communication between the first base station and the radio terminal.

In the fifteenth embodiment, the controller is configured to notify the second base station of all profiles supported by the radio terminal.

In the fifteenth embodiment, the controller is configured to acquire a profile to be used for communication with the radio terminal by the second base station from the second base station, and notify the first base station of the acquired profile.

In the sixteenth embodiment, in a case in which the second base station is a non-profile-supported base station, the controller is configured to notify the second base station of functions included in the profile supported by the radio terminal.

In the sixteenth embodiment, the controller is configured to notify the second base station of functions included in a specific profile among profiles supported by the radio terminal. The specific profile is a specified profile selected by the radio terminal or a profile selected by the mobility management apparatus.

A base station according to fifteenth and sixteenth embodiments is used in a mobile communication system in which a plurality of profiles are specified, each of the profile including a plurality of functions related to radio communication. The base station includes: a controller configured to acquire a profile supported by a radio terminal from another base station or a mobility management apparatus in a case in which a handover of the radio terminal is performed from the another base station to the base station.

In the fifteenth embodiment, the controller is configured to acquire a profile which is supported by the radio terminal and is used in communication between the another base station and the radio terminal, from the another base station or the mobility management apparatus.

In the fifteenth embodiment, the controller is configured to acquire all profiles supported by the radio terminal, from the another base station or the mobility management apparatus.

In the fifteenth embodiment, the controller is configured to determine a profile to be used for communication with the radio terminal by the base station from among profiles supported by the radio terminal, and notify the another base station or the mobility management apparatus of the determined profile.

In the sixteenth embodiment, in a case in which the base station is a non-profile-supported base station, the controller is configured to acquire each function included in a profile supported by the radio terminal from the another base station or the mobility management apparatus.

A radio terminal according to the fifteenth embodiment is used in a mobile communication system in which a plurality of profiles are specified, each of the profile including a plurality of functions related to radio communication. The radio terminal includes: a controller configured to acquire a profile used by a second base station to communicate with the radio terminal, from the first base station, in a case in which a handover of the radio terminal is performed from the first base station to the second base station.

A base station according to the sixteenth embodiment is used in a mobile communication system in which a plurality of profiles are specified, each of the profile including a plurality of functions related to radio communication. The base station includes: a transmitter configured to transmit information indicating whether or not the base station supports a profile, to a radio terminal in a broadcast manner.

A radio terminal according to the sixteenth embodiment is used in a mobile communication system in which a plurality of profiles are specified, each of the profile including a plurality of functions related to radio communication. The radio terminal includes: a controller configured to notify a non-profile-supported base station of only some functions among functions supported by the radio terminal when the radio terminal is connected with the non-profile-supported base station.

A radio terminal according to the sixteenth embodiment is used in a mobile communication system in which a plurality of profiles are specified, each of the profile including a plurality of functions related to radio communication. The radio terminal includes: a controller configured to be detached from a network and attached to the network before establishing a connection with a non-profile-supported base station.

A radio terminal according to the sixteenth embodiment is used in a mobile communication system in which a plurality of profiles are specified, each of the profile including a plurality of functions related to radio communication. The radio terminal includes: a controller configured to notify a mobility management apparatus of any one of profiles supported by the radio terminal as a specified profile.

Fifteenth Embodiment (Multiple Profiles UE Capability)

The UE 100 supports a plurality of functions related to radio communication. The functions related to the radio communication refer to functions specified in a specification such as the "dual connectivity," device to device (D2D), and Network-Assisted Interference Cancellation and Suppression (NAICS). The functions related to the radio communication may include "UE category." Further, the functions related to the radio communication may include "Support Band Combination." Hereinafter, the functions related to the radio communication are referred to appropriately as "features."

In the fifteenth embodiment, in order to use the processing performance of the UE 100 maximally, it is assumed that a combination of functions that are able to be executed practically at the same time is specified as a "profile" in a specification, and a function to be executed by the UE 100 is able to be switched flexibly. For example, a profile #1 is configured with a combination of "Category 6" and NAICS, a profile #2 is configured with a combination of "Category 7" and the "dual connectivity," and a profile #3 is configured with a combination of "Category 10" and D2D.

FIG. 30 is a diagram illustrating an example of an operation sequence related to the initial profile acquisition. In the initial information of the present sequence, the UE 100 is in the connected mode.

As illustrated in FIG. 30, in step S11, the eNB 200 transmits a "UE Capability Enquiry" message to the UE 100.

In step S12, the UE 100 transmits a "UE Capability information" message including a plurality of profiles (multiple profiles) supported by the UE 100 to the eNB 200 in response to reception of the "UE Capability Enquiry" message.

In step S13, the eNB 200 transmits a "UE Capability info Indication" message including a plurality of profiles (multiple profiles) supported by the UE 100 to the MME 300 in response to reception of the "UE Capability information" message. The MME 300 holds information of a plurality of profiles (multiple profiles) supported by the UE 100 until the UE 100 is detached from the network. Further, if the UE 100 is detached from the network, the MME 300 discards the information of a plurality of profiles (multiple profiles) supported by the UE 100.

Figure 31:
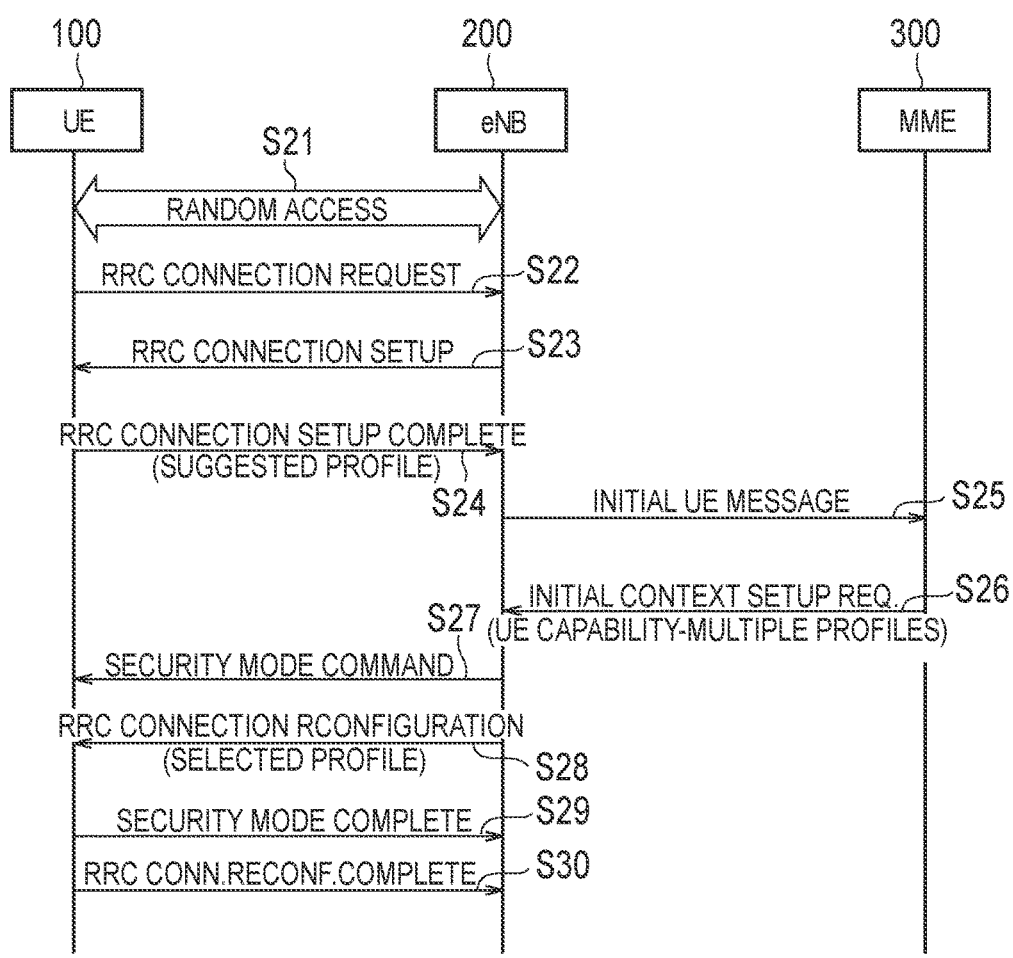
FIG. 31 is a diagram illustrating an example of an initial profile setting sequence.

FIG. 31 is a diagram illustrating an example of the initial profile setting sequence. In the initial state of the present sequence, the UE 100 is in the idle mode.

As illustrated in FIG. 31, in step S21, the UE 100 performs random access to the eNB 200.

In step S22, the UE 100 transmits the "RRC Connection Request" message to the eNB 200.

In step S23, the eNB 200 transmits the "RRC Connection Setup" message to the UE 100 in response to reception of the "RRC Connection Request" message.

In step S24, the UE 100 transmits the "RRC Connection Setup Complete" message to the eNB 200 in response to reception of the "RRC Connection Setup" message. Here, the UE 100 selects one profile from a plurality of profiles (multiple profiles) supported by the UE 100 as the suggested profile, and includes the "suggested profile" in the "RRC Connection Setup Complete" message. As a result of step S24, the UE 100 transits from the idle mode to the connected mode.

In step S25, the eNB 200 transmits the "INITIAL UE MESSAGE" to the MME 300 in response to reception of the "RRC Connection Setup Complete" message.

In step S26, the MME 300 transmits the "INITIAL CONTEXT SETUP REQ." message to the eNB 200 in response to reception of the "INITIAL UE MESSAGE." Here, the MME 300 includes information of a plurality of profiles (multiple profiles) supported by the UE 100 in the "INITIAL CONTEXT SETUP REQ." message. The eNB 200 holds the information of a plurality of profiles (multiple profiles) supported by the UE 100.

In step S27, the eNB 200 transmits a "Security Mode Command" message to the UE 100.

In step S28, the eNB 200 transmits the "RRC Connection Reconfiguration" message to the UE 100. Here, the eNB 200 includes the configuration information (Configuration) of the profile (selected profile) selected from a plurality of profiles (multiple profiles) supported by the UE 100 in the "RRC Connection Reconfiguration" message. The UE 100 holds the configuration information (Configuration) of the "selected profile," and then starts the radio communication according to the "selected profile."

In step S29, the UE 100 transmits a "Security Mode Complete" message to the eNB 200.

In step S30, the UE 100 transmits an "RRC Conn. Reconf. Complete" message to the eNB 200.

Figure 32A:
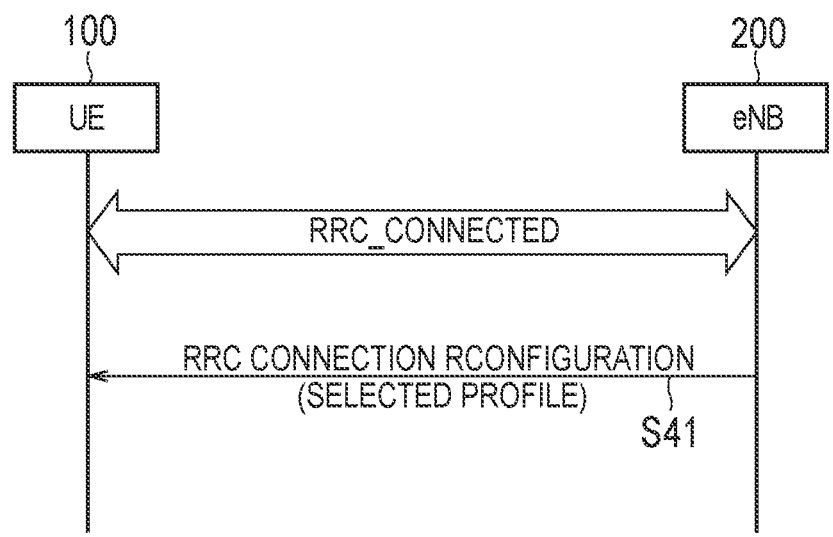
FIGS. 32A and 32B are diagrams illustrating an example of an operation sequence related to a profile change during an RRC connection.
Figure 32B:
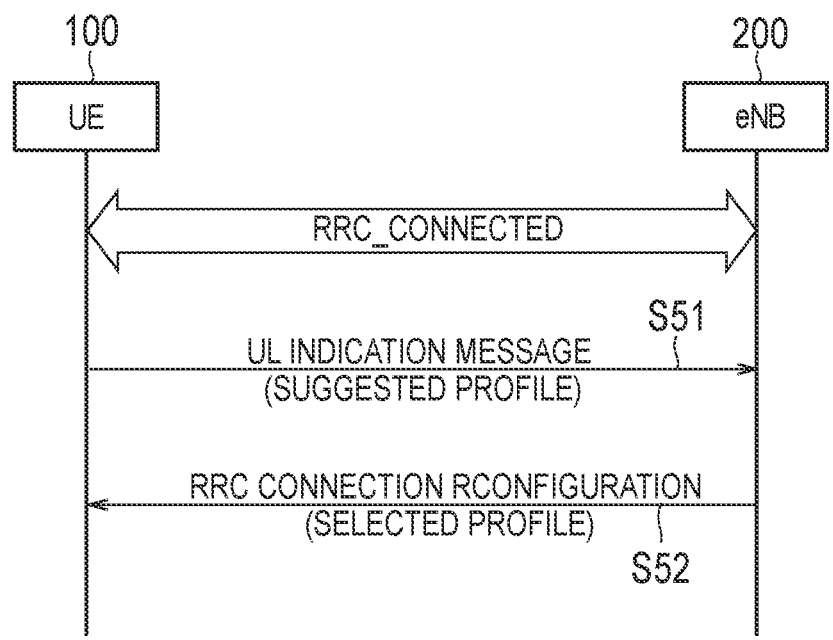

FIGS. 32A and 32B are diagrams illustrating an example of an operation sequence related to a profile change during the RRC connection. FIG. 32A illustrates a profile change sequence initiated by the eNB 200, and FIG. 32B illustrates a profile change sequence initiated by the UE 100.

As illustrated in FIG. 32A, in step S41, the eNB 200 selects one profile from a plurality of profiles (multiple profiles) supported by the UE 100. Then, the eNB 200 transmits the configuration information (Configuration) of the selected profile to the UE 100 through the "RRC Connection Reconfiguration" message. The UE 100 changes the profile on the basis of the Configuration of the "selected profile."

As illustrated in FIG. 32B, in step S51, the UE 100 transmits an "UL Indication" message including the profile selected by the UE 100 as the suggested profile to the eNB 200.

In step S52, the eNB 200 transmits the configuration information (configuration) of the profile (selected profile) selected on the basis of the "suggested profile" to the UE 100 through the "RRC Connection Reconfiguration" message. The UE 100 changes the profile on the basis of the Configuration of the "selected profile."

(Handover Sequence)

The UE 100 in the connected mode performs the handover when moving from one cell to another cell. In the fifteenth embodiment, the description will proceed with an inter-base station (inter-eNB) handover.

In the inter-eNB handover, the handover of the UE 100 from the source eNB to the target eNB is performed. The inter-eNB handover includes an X2 handover and an S1 handover. The X2 handover is a handover sequence in which the MME 300 is not involved in signaling between the source eNB and the target eNB. On the other hand, the S1 handover is a handover sequence in which the MME 300 is involved in the signaling between the source eNB and the target eNB.

(Base Station)

Figure 33:
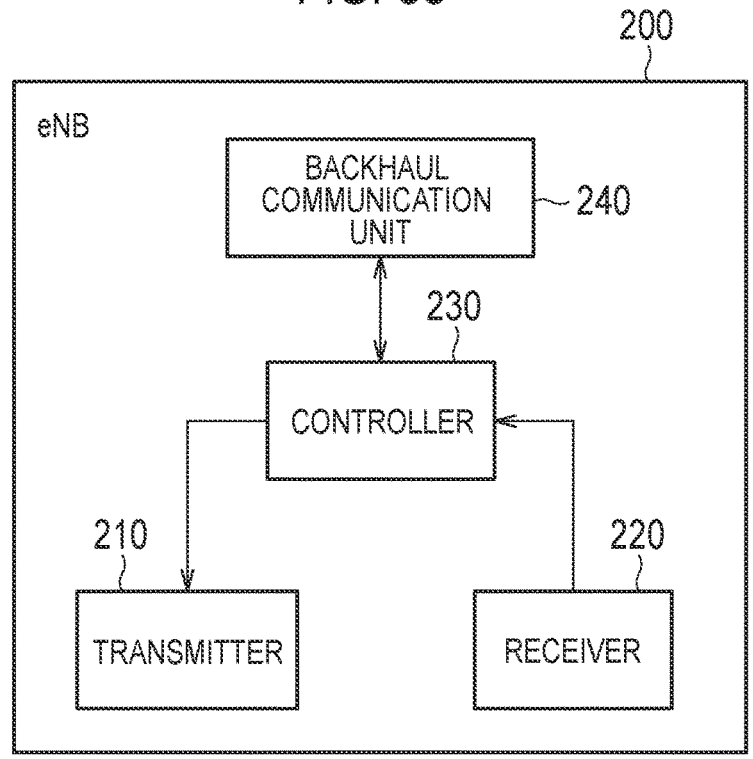
FIG. 33 is a block diagram of an eNB (base station).

A configuration of the eNB 200 (base station) according to the fifteenth embodiment will be described below. FIG. 33 is a block diagram of the eNB 200. The eNB 200 includes a transmitter 210, a receiver 220, a controller 230, and a backhaul communication unit 240 as illustrated in FIG. 33.

The transmitter 210 performs various types of transmissions under the control of the controller 230. The transmitter 210 includes an antenna and a transmitting device. The transmitting device converts a baseband signal (transmission signal) output from the controller 230 into a radio signal and transmits the radio signal from the antenna.

The receiver 220 performs various types of receptions under the control of the controller 230. The receiver 220 includes an antenna and a receiving device. The receiving device converts a radio signal received by the antenna into a baseband signal (reception signal) and outputs the baseband signal to the controller 230.

The controller 230 performs various kinds of controls in the eNB 200. The controller 230 includes a processor (not illustrated) and a memory. The memory stores programs executed by the processor and information used for processes performed by the processor. The processor includes a DSP that performs modulation/demodulation, encoding/decoding, and the like of the baseband signal and a CPU that executes a program stored in the memory and performs various kinds of processes. The processor executes various kinds of processes and various kinds of communication protocols.

The backhaul communication unit 240 is connected to a neighbor eNB 200 via the X2 interface and connected to the MME/S-GW 300 via the S1 interface. The backhaul communication unit 240 is used for communication performed via the X2 interface, communication to be performed via the S1 interface, and the like.

The eNB 200 having the above configuration is used in an LTE system in which a plurality of profiles are specified. As described above, each profile includes a plurality of functions related to the radio communication.

Firstly, an operation in a case in which the eNB 200 is a source eNB will be described. In the following description, the source eNB is indicated by an eNB 200S, and a target eNB is indicated by an eNB 200T.

In the source eNB 200S, in a case in which the handover of the UE 100 from the own eNB to the target eNB 200T is performed, the controller 230 notifies the target eNB 200T of the profile supported by the UE 100 without going through the MME 300 (in the case of the X2 handover) or via the MME 300 (in the case of the S1 handover).

In the fifteenth embodiment, the controller 230 notifies the target eNB 200T of the profile (selected profile) which is supported by the UE 100 and used for communication between its own eNB and the UE 100. Alternatively, the controller 230 notifies the target eNB 200T of all the profiles (multiple profiles) supported by the UE 100.

Further, the controller 230 acquires the profile to be used for communication with the UE 100 by the target eNB 200T from the target eNB 200T without going through the MME 300 (in the case of the X2 handover) or via the MME 300 (in the case of the S1 handover) and notifies the UE 100 of the acquired profile.

Secondly, an operation in a case in which the eNB 200 is the target eNB 200T will be described.

In the target eNB 200T, in a case in which the handover of the UE 100 from the source eNB 200S to its own eNB is performed, the controller 230 acquires the profile supported by the UE 100 from the source eNB 200S (in the case of the X2 handover) or the MME 300 (in the case of the S1 handover).

In the fifteenth embodiment, the controller 230 acquires the profile (selected profile) which is supported by the UE 100 and used for communication between the source eNB 200S and the UE 100 from the source eNB 200S or the MME 300. Alternatively, the controller 230 acquires all the profiles (multiple profiles) supported by the UE 100 from the source eNB 200S or the MME 300.

The controller 230 decides the profile to be used for communication with the UE 100 by the own eNB among the profiles supported by the UE 100 and notifies the source eNB 200S (in the case of the X2 handover) or the MME 300 (in the case of the S1 handover) of the decided profile.

(Mobility Management Apparatus)

Figure 34:
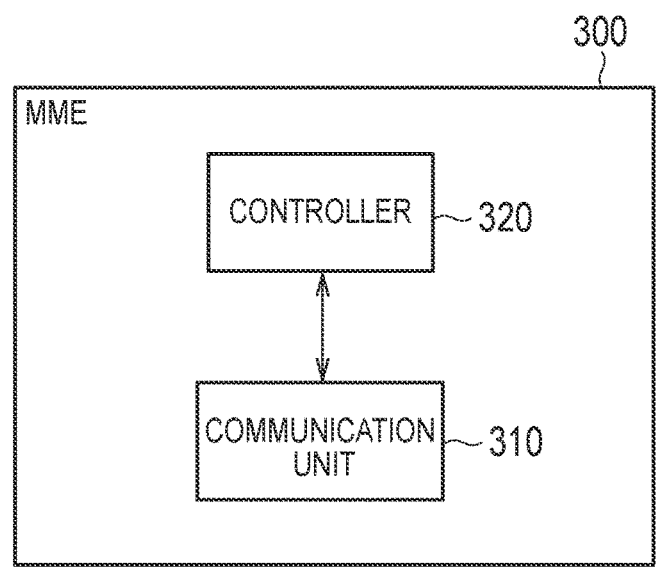
FIG. 34 is a block diagram of a mobility management apparatus (MME).

Next, the MME 300 (mobility management apparatus) according to the fifteenth embodiment will be described. FIG. 34 is a block diagram of the MME 300. As illustrated in FIG. 34, the MME 300 includes a communication unit 310 and a controller 320.

The communication unit 310 is connected to the eNB 200 via the S1 interface. The communication unit 310 is used for communication or the like to be performed on the S1 interface.

The controller 320 performs various kinds of control in the MME 300. The controller 320 includes a processor and a memory (not illustrated). The memory stores programs executed by the processor and information used for processes performed by the processor. The controller 320 executes various kinds of processes and various kinds of communication protocols.

The MME 300 having the above configuration is used in an LTE system in which a plurality of profiles are specified.

In the case of the S1 handover, when the handover of the UE 100 from the source eNB 200S (first eNB) to the target eNB 200T (second eNB) is performed, the controller 320 notifies the target eNB 200T of the profile supported by the UE 100. Specifically, the controller 320 notifies the target eNB 200T of the profile reported from the source eNB 200S.

The controller 320 notifies the target eNB 200T of the profile (selected profile) used for communication between the source eNB 200S and the UE 100. Alternatively, the controller 320 notifies the target eNB 200T of all the profiles (multiple profiles) supported by the UE 100.

(Radio Terminal)

Figure 35:
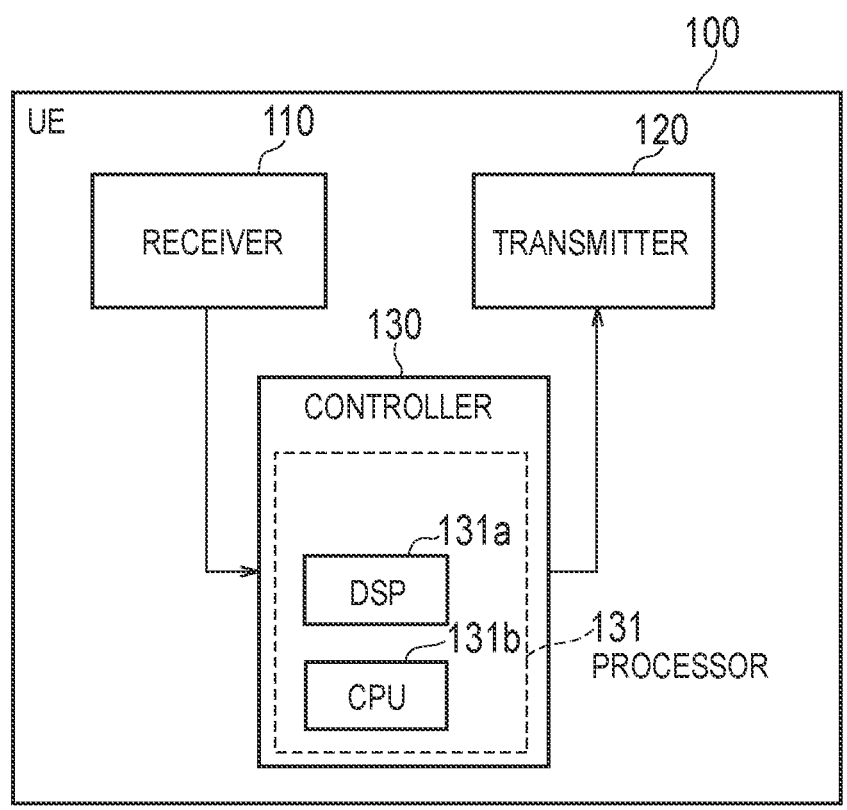
FIG. 35 is a block diagram of a UE (radio terminal).

A UE 100 (radio terminal) according to the fifteenth embodiment will be described below. FIG. 35 is a block diagram of the UE 100. The UE 100 includes a receiver 110, a transmitter 120, and a controller 130 as illustrated in FIG. 35.

The receiver 110 performs various types of receptions under the control of the controller 130. The receiver 110 includes an antenna and a receiving device. The receiving device converts a radio signal received through the antenna into a baseband signal (reception signal) and outputs the baseband signal to the controller 130.

The transmitter 120 performs various kinds of transmissions under the control of the controller 130. The transmitter 120 includes an antenna and a transmitting device. The transmitting device converts a baseband signal (transmission signal) output from the controller 130 into a radio signal and transmits the radio signal through the antenna.

The controller 130 performs various kinds of controls in the UE 100. The controller 130 includes a processor 131. The controller 130 further includes a memory (not illustrated). The processor 131 includes a digital signal processor (DSP) 131*a* that perform modulation/demodulation, encoding/decoding, and the like of the baseband signal and a central processing unit (CPU) 131*b* that executes a program stored in the memory and performs various kinds of processes. The processor 131 may further include a codec that encodes and decodes audio/video signals. The controller 130 executes various kinds of processes and various kinds of communication protocols.

The MME 300 having the above configuration is used in an LTE system in which a plurality of profiles are specified.

In the UE 100, in the case in which the handover of the self UE 100 from the source eNB 200S (first eNB) to the target eNB 200T (second eNB) is performed, the controller 130 acquires the profile which is used for communication with the UE 100 by the target eNB 200T from the source eNB 200S.

(Example of Operation Sequence)

An example of an operation sequence according to the fifteenth embodiment will be described below.

(1) X2 Handover

Figure 36:
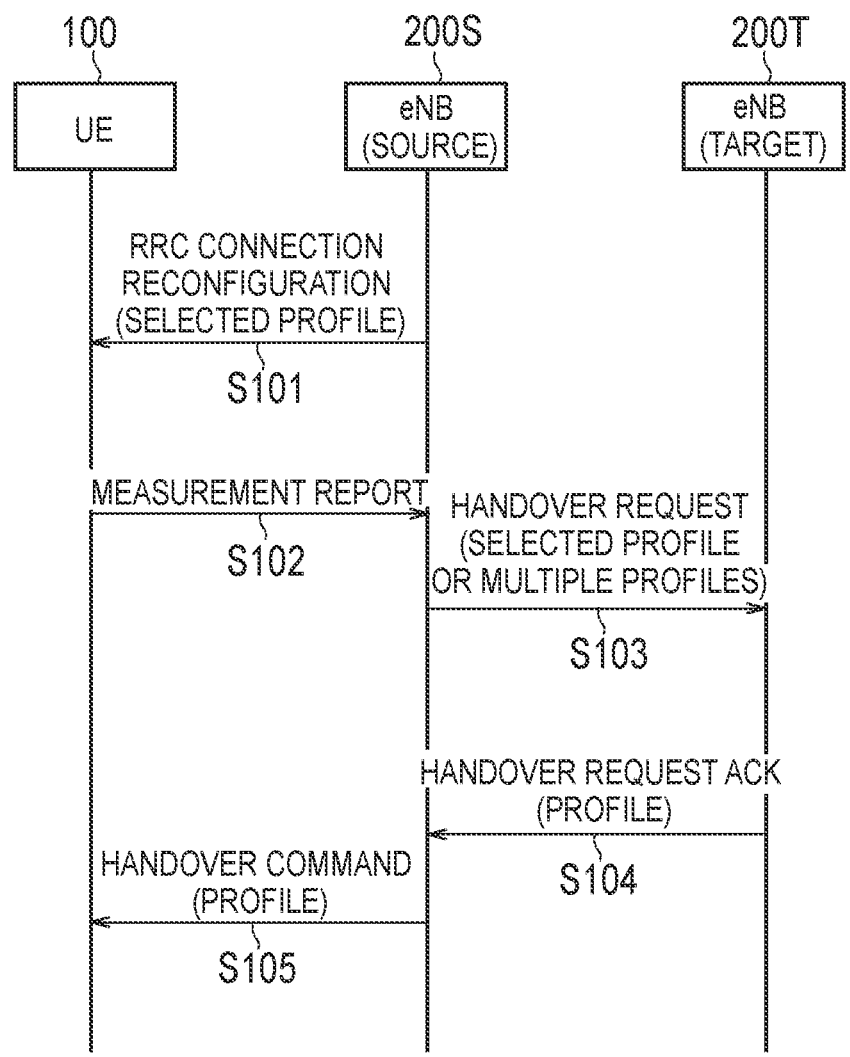
FIG. 36 is a diagram illustrating an X2 handover sequence according to a fifteenth embodiment.

FIG. 36 is a diagram illustrating an X2 handover sequence according to the fifteenth embodiment. In the initial state of the present sequence, UE 100 is in connected mode.

As illustrated in FIG. 36, in step S101, the source eNB 200S transmits the configuration information (configuration) of the profile (selected profile) selected on the basis of the "multiple profiles" or the "suggested profile" to the UE 100 through the "RRC Connection Reconfiguration" message. The UE 100 communicates with the source eNB 200S using the "selected profile."

In step S102, the UE 100 transmits a "Measurement Report" message to the source eNB 200S. The source eNB 200S decides the handover to the target eNB 200T on the basis of the "Measurement Report" message.

In step S103, the source eNB 200S transmits a "Handover Request" message to the target eNB 200T. Here, the source eNB 200S includes the "selected profile" or the "multiple profiles" in the "Handover Request" message. The target eNB 200T determines whether or not the "Handover Request" message is approved. Here, the description will proceed under the assumption that the "Handover Request" message is approved.

In step S104, the target eNB 200T transmits a "Handover Request ACK" message to the source eNB 200S. Here, the target eNB 200T includes the profile selected on the basis of the "multiple profiles" or the "selected profile" included in the "Handover Request" message in the "Handover Request ACK" message.

As a method of selecting the profile in the target eNB 200T, any one of the following first to third methods may be used.

In the first method, the target eNB 200T checks its own processing load, and in a case in which the process is determined to be possible using the "selected profile," the target eNB 200T includes the "selected profile" in the "Handover Request ACK" message. On the other hand, in the case in which the process is unable to be performed using the "selected profile," a profile within a range in which the process is possible is selected from the "multiple profiles," and the selected profile is included in the "Handover Request ACK" message.

In the second method, the communication state with the other UEs in the target eNB 200T is checked, and, for example, in a case in which it is desired to process the UE in accordance with MU-MIMO, a profile including MU-MIMO among the "multiple profiles" is included in the "Handover Request ACK Message. Alternatively, in a case in which the "selected profile" includes MU-MIMO, the "selected profile" may be included in the "Handover Request ACK" message. On the other hand, in a case in which it is desired to process in accordance with NAICS or the "dual connectivity," a profile including "NAICS" or the "dual connectivity" among the "multiple profiles" is included in the "Handover Request ACK" message. Alternatively, in a case in which the "selected profile" includes NAICS or the "dual connectivity," the "selected profile" may be included in the "Handover Request ACK" message.

In the third method, a profile including only the functions supported by the target eNB 200T among the "multiple profiles" is included in the "Handover Request ACK" message with reference to the capability in the target eNB 200T. Alternatively, in a case in which the "selected profile" includes only the functions supported by target eNB 200T, the "selected profile" may be included in the "Handover Request ACK" message.

In step S105, the source eNB 200S transmits a "Handover Command" message to the UE 100 in response to reception of the "Handover Request ACK." Here, the source eNB 200S includes the profile selected by the target eNB 200T in the "Handover Command" message.

The UE 100 performs the handover to the target eNB 200T in response to reception of the "Handover Command" message. The UE 100 uses the profile included in the "Handover Command" message for communication with the target eNB 200T after the handover.

(2) S1 Handover

Figure 37:
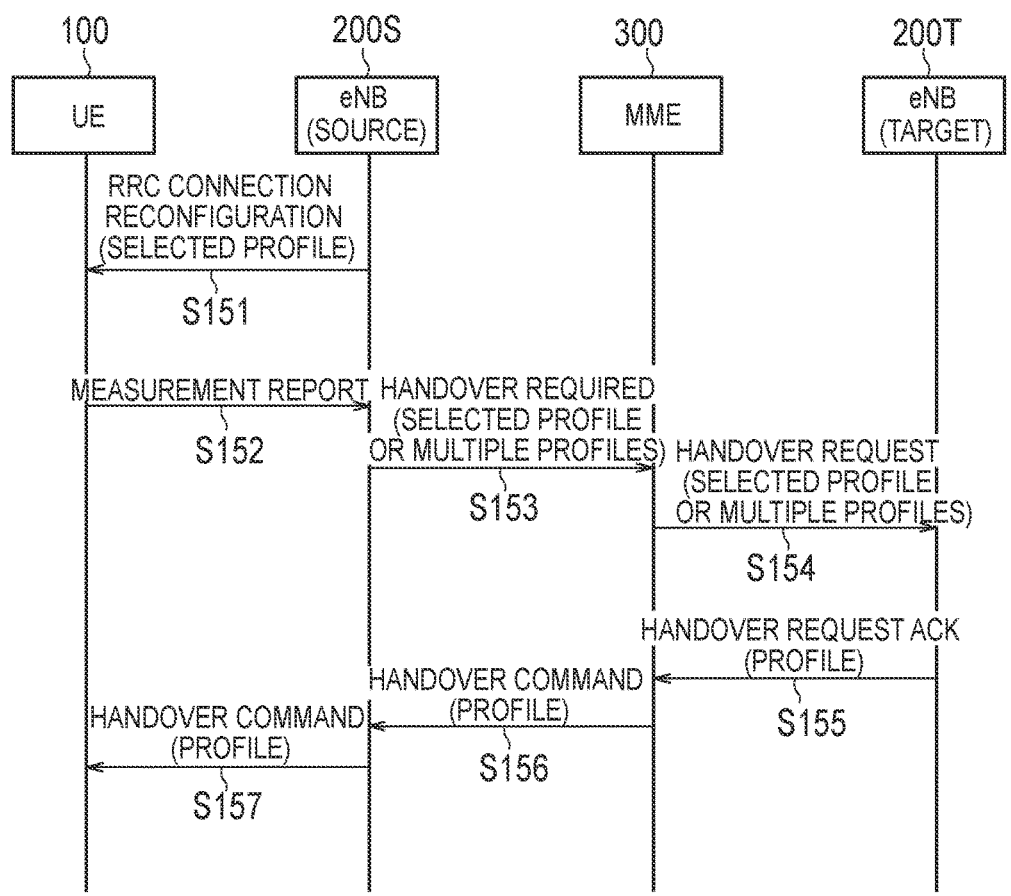
FIG. 37 is a diagram illustrating an S1 handover sequence according to the fifteenth embodiment.

FIG. 37 is a diagram illustrating an S1 handover sequence according to the fifteenth embodiment. In the initial state of the present sequence, UE 100 is in connected mode.

As illustrated in FIG. 37, in step S151, the source eNB 200S transmits the configuration information (configuration) of the profile (selected profile) selected on the basis of the "multiple profiles" or the "suggested profile" to the UE 100 through the "RRC Connection Reconfiguration" message. The UE 100 communicates with the source eNB 200S using the "selected profile."

In step S152, the UE 100 transmits a "Measurement Report" message to the source eNB 200S. The source eNB 200S decides the handover to the target eNB 200T on the basis of the "Measurement Report" message.

In step S153, the source eNB 200S transmits a "Handover Required" message to the MME 300. Here, the source eNB 200S includes the "selected profile" or the "multiple profiles" in the "Handover Required" message.

In step S154, the MME 300 transmits a "Handover Request" message to the target eNB 200T. Here, the MME 300 includes the "selected profile" or the "multiple profiles" included in the "Handover Required" message in the "Handover Request" message. Further, the MME 300 may include the profile selected by the MME 300 from the "multiple profiles" in the "Handover Request" message on the basis of, for example, the subscriber information of the UE 100 or the like. Alternatively, the MME 300 may include a specified profile (default profile) to be described later in the "Handover Request" message.

The target eNB 200T determines whether or not the "Handover Request" message is approved. Here, the description will proceed under the assumption that the "Handover Request" message is approved.

In step S155, the target eNB 200T transmits a "Handover Request ACK" message to the MME 300. Here, the target eNB 200T includes the profile selected on the basis of the "multiple profiles" or the "selected profile" included in the "Handover Request" message in the "Handover Request ACK" message.

In step S156, the MME 300 transmits a "Handover Command" message to the source eNB 200S. Here, the MME 300 includes the profile selected by the target eNB 200T in the "Handover Command" message.

In step S157, the source eNB 200S transmits the "Handover Command" message to the UE 100 in response to reception of the "Handover Command" message from the MME 300. [

Here, the source eNB 200S includes the profile selected by the target eNB 200T in the "Handover Command" message.

The UE 100 performs the handover to the target eNB 200T in response to reception of the "Handover Command" message. The UE 100 uses the profile included in the "Handover Command" message for communication with the target eNB 200T after the handover.

Sixteenth Embodiment

The sixteenth embodiment will be described focusing on a difference with the fifteenth embodiment. In the above embodiment, the target eNB 200T is assumed to be a profile-supported eNB and be able to deal with the profile.

However, the target eNB 200T may be a non-profile-supported eNB and unable to deal with the profile. Further, the present disclosure is not limited to the handover, and the UE 100 may be connected to a non-profile-supported eNB and communicate with a non-profile-supported eNB. The sixteenth embodiment relates to an operation in the case in which there is a non-profile-supported eNB.

(1) First Operation Pattern

In the first operation pattern of the sixteenth embodiment, the target eNB 200T is assumed to be a non-profile-supported eNB in the X2 handover (see FIG. 36).

In this case, the source eNB 200S notifies the target eNB 200T of the functions included in the profile supported by the UE 100. For example, the source eNB 200S notifies the target eNB 200T of the functions included in the profile (selected profile) used for communication between its own eNB and the UE 100.

As described above, since the target eNB 200T is unable to be interpreted by the profile format, for example, the functions included in the profile are included in the "Handover Request" message as UE context information. Accordingly, content of the profile may be notified of as information which can be interpreted by the target eNB 200T. In this case, a similar sequence to the normal X2 handover sequence may be used.

Further, the first operation pattern is based on the premise that the source eNB 200S holds information indicating whether or not the target eNB 200T is a profile-supported eNB. The information may be set in advance or may be set autonomously using a SON function. Alternatively, the target eNB 200T may notify the source eNB 200S of information indicating whether or not the profile is supported in advance. Further, the information may be included in a neighbor cell list (neighbor list) held in the source eNB 200S.

(2) Second Operation Pattern

In a second operation pattern of the sixteenth embodiment, the target eNB 200T is assumed to be a non-profile-supported eNB in the S1 handover (see FIG. 37).

In this case, the MME 300 notifies the target eNB 200T of the functions included in the profile supported by the UE 100. For example, the MME 300 notifies the target eNB 200T of the functions included in the profile (selected profile) used for communication between the source eNB 200S and the UE 100.

For example, the MME 300 may include the functions included in the profile in the "Handover Request" message as the UE context information. Accordingly, content of the profile may be notified of as information which can be interpreted by the target eNB 200T. In this case, a similar sequence to the normal S1 handover sequence may be used.

Further, the second operation pattern is based on the premise that the MME 300 holds information indicating whether or not the target eNB 200T is a profile-supported eNB. The information may be set in advance, or the target eNB 200T may notify the MME 300 of information indicating whether or not the profile is supported in advance.

Alternatively, the MME 300 may notify the target eNB 200T of the functions included in the specified profile (default profile) without notifying the target eNB 200T of the functions included in the "selected profile."

The "default profile" is reported from the UE 100 to the MME 300 in the initial profile setting sequence (see FIG. 30). As illustrated in FIG. 30, the UE 100 transmits the "UE Capability information" message including a plurality of profiles (multiple profiles) supported by the UE 100 (step S12).

Here, the UE 100 selects any one profile of the "multiple profiles" as the "default profile" and sets the "multiple profiles" so that the "Default profile" can be identified. For example, in a case in which a first profile of the "multiple profiles" is specified as the "default profile," the UE 100 arranges the profile selected by the UE 100 at the head of the "multiple profiles." Alternatively, in a case in which an identifier indicating the "default profile" is specified, the identifier is allocated to the profile selected by the UE 100 and arranged in the "multiple profiles."

(3) Third Operation Pattern

In a third operation pattern of the sixteenth embodiment, the target eNB 200T is assumed to be a non-profile-supported eNB in the X2 handover or the S1 handover. Alternatively, the UE 100 may be connected to the non-profile-supported eNB and communicate with the non-profile-supported eNB.

In the third operation pattern, the eNB 200 transmits information indicating whether its own eNB supports the profile to the UE 100. Specifically, the eNB 200 includes a flag indicating whether or not its own cell supports the profile in the system information block (SIB) to be transmitted in the own cell. Alternatively, information indicating profiles which are supported or not supported by its own cell may be included in the system information block (SIB) to be transmitted in its own cell.

Accordingly, the UE 100 is able to detect a profile support situation in a cell of a movement destination (or a connection destination candidate).

In the third operation pattern, the UE 100 may be detached from the network and attached to the network in the case of establishing a connection with the non-profile-supported eNB (cell). As described above, the information of a plurality of profiles (multiple profiles) supported by the UE 100 is held in the MME 300 until the UE 100 is detached. Therefore, if the UE 100 is connected to the non-profile-supported eNB (cell) in this state, an unexpected error is likely to occur. For this reason, the UE 100 is detached from the network, the "multiple profiles" held in the MME 300 are discarded, and thus it is possible to prevent the occurrence of an unexpected error.

In the third operation pattern, in the case in which the UE 100 is connected to the non-profile-supported eNB (cell), the UE 100 may notify the eNB (cell) of only some functions supported by the UE 100. Originally, the UE 100 includes all the functions supported by the UE 100 in the "UE Capability information" message for the non-profile-supported eNB (cell). However, if a plurality of functions are configured at the same time, the UE 100 which is under the assumption that the profile is used is poor in the operation processing capability, and thus an unexpected error is likely to occur. In this regard, in a case in which the UE 100 is connected to the non-profile-supported eNB (cell), the UE 100 includes only functions which do not exceed the operation processing capability of its own UE in the "UE Capability information" message.

Other Embodiments

In the above embodiments, the LTE system has been described as the mobile communication system. However, the present disclosure is not limited to the LTE system. The present disclosure may be applied to systems other than the LTE system.

The invention claimed is:

1. A radio terminal used in a mobile communication system in which at least one profile including a plurality of functions related to radio communication is specified, comprising:
  a controller configured to select a profile among a plurality of profiles supported by the radio terminal; and
  a transmitter configured to transmit a profile change request for changing a profile to a profile selected by the radio terminal, to the base station, wherein
  the controller is further configured to:
    maintain a prohibition state in which transmission of the profile change request is prohibited until a predetermined condition is satisfied, the predetermined condition being a condition that an elapsed time after last transmission of the profile change request exceeds a time threshold value designated by the base station; and
    release the prohibition state if the predetermined condition is satisfied.

2. A radio terminal used in a mobile communication system in which at least one profile including a plurality of functions related to radio communication is specified, comprising:
  a controller configured to:
    select a first profile among a plurality of profiles supported by the radio terminal; and
    select a second profile different from the first profile in a case in which the first profile is configured, and
  a transmitter configured to transmit a profile change request for changing the first profile to the second profile, to the base station, wherein
  the controller is further configured to select the second profile so that at least some communication states are maintained on the basis of the first profile,
  the first profile includes a support frequency band to which a primary cell of the radio terminal belongs, and
  the controller is configured to select a profile including the support frequency band to which the primary cell of the radio terminal belongs as the second profile.

3. A radio terminal used in a mobile communication system in which at least one profile including a plurality of functions related to radio communication is specified, comprising:
  a controller configured to:
    select a first profile among a plurality of profiles supported by the radio terminal; and
    select a second profile different from the first profile in a case in which the first profile is configured, and
  a transmitter configured to transmit a profile change request for changing the first profile to the second profile, to the base station, wherein
  the controller is further configured to select the second profile so that at least some communication states are maintained on the basis of the first profile,
  the first profile includes a first terminal category having a predetermined buffer size, and
  the controller is configured to select a profile including a terminal category having a buffer size equal to or larger than the predetermined buffer size as the second profile.

* * * * *